United States Patent
Nirenberg et al.

(10) Patent No.: US 9,547,804 B2
(45) Date of Patent: Jan. 17, 2017

(54) RETINAL ENCODER FOR MACHINE VISION

(75) Inventors: Sheila Nirenberg, New York, NY (US); Illya Bomash, Brooklyn, NY (US)

(73) Assignee: Cornell University, Ithaca, NY (US)

( * ) Notice: Subject to any disclaimer, the term of this patent is extended or adjusted under 35 U.S.C. 154(b) by 0 days.

(21) Appl. No.: 14/239,828

(22) PCT Filed: Aug. 24, 2012

(86) PCT No.: PCT/US2012/052348
§ 371 (c)(1),
(2), (4) Date: Jul. 15, 2014

(87) PCT Pub. No.: WO2013/029008
PCT Pub. Date: Feb. 28, 2013

(65) Prior Publication Data
US 2014/0355861 A1    Dec. 4, 2014

Related U.S. Application Data

(60) Provisional application No. 61/527,493, filed on Aug. 25, 2011, provisional application No. 61/657,406, filed on Jun. 8, 2012.

(51) Int. Cl.
*G06T 7/00* (2006.01)
*G06K 9/46* (2006.01)
(Continued)

(52) U.S. Cl.
CPC ........... *G06K 9/4619* (2013.01); *G06K 9/4628* (2013.01); *G06N 3/049* (2013.01); *G06T 7/0012* (2013.01);
(Continued)

(58) Field of Classification Search
CPC ...... G06K 9/4619; H04N 19/60; H04N 19/62; H04N 19/85; G06N 3/049
(Continued)

(56) References Cited

U.S. PATENT DOCUMENTS 5,103,306 A * 4/1992 Weiman .................. G01S 5/163
348/400.1
5,815,608 A     9/1998 Lange et al.
(Continued)

FOREIGN PATENT DOCUMENTS

CN    101239008 A    8/2008
CN    101336856 A    1/2009
(Continued)

OTHER PUBLICATIONS

Piedade, Moises, Gerald, Jose, Sousa, Leonel Augusto, Tavares, Goncalo, Tomas, Pedro. "Visual Neuroprothesis: A Non Invasive System for Stimulating the Cortex"IEEE Transactions on Circuits and Systems-I: Regular Papers, vol. 53 No. 12, Dec. 2005.*
(Continued)

*Primary Examiner* — Kim Vu
*Assistant Examiner* — Molly Delaney
(74) *Attorney, Agent, or Firm* — Foley & Lardner LLP

(57) ABSTRACT

A method is disclosed including: receiving raw image data corresponding to a series of raw images; processing the raw image data with an encoder to generate encoded data, where the encoder is characterized by an input/output transformation that substantially mimics the input/output transformation of one or more retinal cells of a vertebrate retina; and applying a first machine vision algorithm to data generated based at least in part on the encoded data.

28 Claims, 30 Drawing Sheets

(51) Int. Cl.
*G06T 9/00* (2006.01)
*G06N 3/04* (2006.01)
*H04N 19/62* (2014.01)
*H04N 19/85* (2014.01)
*H04N 19/60* (2014.01)

(52) U.S. Cl.
CPC .............. *G06T 9/00* (2013.01); *G06T 9/002* (2013.01); *G06T 9/007* (2013.01); *H04N 19/60* (2014.11); *H04N 19/62* (2014.11); *H04N 19/85* (2014.11); *G06K 2209/05* (2013.01); *G06T 2207/20024* (2013.01); *G06T 2207/20048* (2013.01); *G06T 2207/20084* (2013.01); *G06T 2207/30041* (2013.01)

(58) Field of Classification Search
USPC ........................................................ 382/133
See application file for complete search history.

(56) References Cited

U.S. PATENT DOCUMENTS

| | | | |
|---|---|---|---|
| 5,836,996 A | 11/1998 | Doorish | |
| 5,856,152 A | 1/1999 | Wilson et al. | |
| 5,871,982 A | 2/1999 | Wilson et al. | |
| 5,974,159 A | 10/1999 | Lubin et al. | |
| 6,400,989 B1* | 6/2002 | Eckmiller | A61N 1/36046 607/54 |
| 6,458,157 B1* | 10/2002 | Suaning | A61N 1/0543 623/6.63 |
| 6,530,954 B1 | 3/2003 | Eckmiller | |
| 6,533,798 B2 | 3/2003 | Greenberg et al. | |
| 6,801,655 B2 | 10/2004 | Woodall | |
| 7,149,586 B2 | 12/2006 | Greenberg et al. | |
| 8,103,352 B2 | 1/2012 | Fried et al. | |
| 8,108,147 B1* | 1/2012 | Blackburn | G08G 1/166 235/454 |
| 8,467,623 B2* | 6/2013 | Izhikevich | G06K 9/46 348/471 |
| 8,956,396 B1 | 2/2015 | Friend et al. | |
| 9,302,103 B1 | 4/2016 | Nirenberg | |
| 2002/0111655 A1 | 8/2002 | Scribner | |
| 2002/0161417 A1 | 10/2002 | Scribner | |
| 2002/0168100 A1* | 11/2002 | Woodall | G06K 9/66 382/156 |
| 2003/0088081 A1 | 5/2003 | Maliga et al. | |
| 2003/0093129 A1 | 5/2003 | Nicolelis et al. | |
| 2003/0105409 A1 | 6/2003 | Donoghue et al. | |
| 2004/0147975 A1 | 7/2004 | Popovic et al. | |
| 2004/0176821 A1 | 9/2004 | Delbeke et al. | |
| 2005/0015120 A1 | 1/2005 | Seibel et al. | |
| 2006/0005160 A1* | 1/2006 | Schultz | G06F 8/34 717/105 |
| 2006/0129207 A1 | 6/2006 | Fried et al. | |
| 2006/0184062 A1 | 8/2006 | Greenberg et al. | |
| 2006/0251621 A1 | 11/2006 | Campochiaro et al. | |
| 2007/0050046 A1 | 3/2007 | Georgopoulos | |
| 2007/0198066 A1 | 8/2007 | Greenberg et al. | |
| 2007/0261127 A1 | 11/2007 | Boyden et al. | |
| 2008/0021515 A1 | 1/2008 | Horsager et al. | |
| 2008/0086206 A1 | 4/2008 | Nasiatka et al. | |
| 2008/0221653 A1 | 9/2008 | Agrawal et al. | |
| 2008/0234781 A1 | 9/2008 | Einav et al. | |
| 2008/0249588 A1 | 10/2008 | Greenberg et al. | |
| 2008/0294217 A1 | 11/2008 | Lian et al. | |
| 2009/0088399 A1 | 4/2009 | Balya et al. | |
| 2009/0105786 A1 | 4/2009 | Fetz et al. | |
| 2009/0118793 A1 | 5/2009 | McClure et al. | |
| 2009/0118794 A1 | 5/2009 | McClure et al. | |
| 2009/0326623 A1 | 12/2009 | Greenberg et al. | |
| 2010/0015095 A1 | 1/2010 | Pan et al. | |
| 2010/0016732 A1 | 1/2010 | Wells et al. | |
| 2010/0036457 A1* | 2/2010 | Sarpeshkar | G09B 21/008 607/53 |
| 2010/0135591 A1 | 6/2010 | Zador | |
| 2010/0152849 A1 | 6/2010 | Degenaar et al. | |
| 2010/0234273 A1 | 9/2010 | Boyden et al. | |
| 2010/0262212 A1 | 10/2010 | Shoham et al. | |
| 2010/0272688 A1 | 10/2010 | Acland et al. | |
| 2010/0286748 A1 | 11/2010 | Midani et al. | |
| 2011/0091102 A1* | 4/2011 | Cimbalista, Jr. | H04N 5/33 382/167 |
| 2011/0213266 A1 | 9/2011 | Williams et al. | |
| 2011/0270352 A1 | 11/2011 | Nanduri et al. | |
| 2011/0307079 A1 | 12/2011 | Oweiss et al. | |
| 2012/0123293 A1 | 5/2012 | Shah et al. | |
| 2012/0303091 A1* | 11/2012 | Izhikevich | G06N 3/049 607/54 |
| 2014/0364796 A1* | 12/2014 | Fridman | A61N 1/44 604/20 |

FOREIGN PATENT DOCUMENTS

| | | |
|---|---|---|
| CN | 101393789 A | 3/2009 |
| EP | 1 864 690 A2 | 12/2007 |
| EP | 1 891 976 A1 | 2/2008 |
| WO | WO-96/13598 | 5/1996 |
| WO | WO-98/48027 | 10/1998 |
| WO | WO-00/15822 | 3/2000 |
| WO | WO-01/94605 A2 | 12/2001 |
| WO | WO-02/082904 A2 | 10/2002 |
| WO | WO-03/047525 A2 | 6/2003 |
| WO | WO-03/080648 A2 | 10/2003 |
| WO | WO-03/093479 A1 | 11/2003 |
| WO | WO-03/104413 A2 | 12/2003 |
| WO | WO-2005/080573 A1 | 9/2005 |
| WO | WO-2007/127428 A2 | 11/2007 |
| WO | WO2007/148038 | 12/2007 |
| WO | WO-2009/126112 | 10/2009 |
| WO | WO-2010/011404 A2 | 1/2010 |

OTHER PUBLICATIONS

Wohrer, Adrien, Kornpobst, Pierre. "Virtual Retinal: A biological retina model and simulator with contrast gain control". Journal of Computational Neuroscience. Aug. 1, 2008.*

Ahuja, A.K. et. al., "Blind subjects implanted with the Argus II retinal prosthesis are able to improve performance in a spatial-motor task," Br J Ophthalmol, (2011), vol. 95, pp. 539-543.

Arenkiel, Benjamin R. et al., "In vivo light-induced activation of neural circuitry in transgenic mice expressing channelrhodopsin-2," Neuron, (Apr. 19, 2007), vol. 54(2), pp. 205-218.

Ausubel, Frederick M. et al., "Current Protocols in Molecular Biology," (2003), John Wiley & Sons, New York, Chapter 1 Only, 7 pages.

Bach, M. et al., "Visual evoked potential-based acuity assessment in normal vision, artificially degraded vision, and in patients," Br J Ophthalmol, (2008), vol. 92, pp. 396-403.

Barnstable, C.J. et al., "Thy-1 antigen: a ganglion cell specific marker in rodent retina," Neuroscience, (1984), vol. 11, No. 4, pp. 847-855.

Bi, Anding et al., "Ectopic expression of a microbial-type rhodopsin restores visual responses in mice with photoreceptor degeneration," Neuron, (Apr. 6, 2006), vol. 50, pp. 23-33.

Bomash I. et al., "A virtual retina that works on a broad array of stimuli including natural scenes: A tool to simplify the problem of population coding," 40th Annual Neuroscience Presentation, Society for Neuroscience (2010) Program No. 891.5, 2 pages.

Bookstein, Robert et al., "Promoter deletion and loss of retinoblastoma gene expression in human prostate carcinoma," Proc. Natl. Acad. Sci. USA, (Oct. 1990), vol. 87, pp. 7762-7766.

Busskamp, Volker et al., "Genetic reactivation of cone photoreceptors restores visual responses in retinitis pigmentosa," Science, (Jul. 2010), vol. 329, pp. 413-417.

Cai, Xue et al., "Gene delivery to mitotic and postmitotic photoreceptors via compacted DNA nanoparticles results in improved phenotype in a mouse model of retinitis pigmentosa," FASEB J., (Apr. 2010), vol. 24, pp. 1178-1191.

(56) References Cited

OTHER PUBLICATIONS

Campagnola, Luke et al., "Fiber-coupled light-emitting diode for localized photostimulation of neurons expressing channelrhodopsin-2," Journal of Neuroscience Methods, (2008), vol. 169, pp. 27-33.
Cardin, Jesicca A. et al., "Targeted optogenetic stimulation and recording of neurons in vivo using cell-type-specific expression of Channelrhodopsin-2," Nat Protoc, (2010), vol. 5, No. 2, pp. 247-254.
Chader, Gerald J. et al., "Artificial vision: needs, functioning, and testing of a retinal electronic prosthesis," Prog Brain Res, (2009), vol. 175, pp. 317-332.
Chiappa, K., "Principals of Evoked Potentials," Evoked Responses in Clinical Medicine, Third Edition, Lippincott-Raven Publishers, (1997), pp. 1-30.
Chichilnisky, E.J., "A simple white noise analysis of neuronal light responses," Network: Comput. Neural Syst., (2001), vol. 12, pp. 199-213.
Chopdar, Amresh et al., "Age related macular degeneration," BMJ, (Mar. 2003), vol. 326, pp. 485-488.
Cover, Thomas M. et al., "Elements of Information Theory," 2nd Edition, John Wiley & Sons, Inc., Hoboken, NJ, Wiley (2006), 4 pages.
Dann, Joan F. et al., "Retinal ganglion cells projecting to the accessory optic system in the rat," J Comp Neurol, (1987), vol. 262, pp. 141-158.
Dedek, Karin et al., "Ganglion cell adaptability: does the coupling of horizontal cells play a role?" PLoS One, (Mar. 2008), vol. 3, Issue 3, pp. e1714, 10 pages.
Douglas, R.M. et al., "Independent visual threshold measurements in the two eyes of freely moving rats and mice using a virtual-reality optokinetic system," Vis Neurosci., (2005), vol. 22, pp. 677-684.
Duda, R.O. et al., "Multilayer Neural Networks," Pattern Classification (2nd Edition) Chapter 6, Wiley, NY (2001), 78 pages.
Enroth-Cugell, Christina et al., "The contrast sensitivity of retinal ganglion cells of the cat," J Physiol, (1966), vol. 187, pp. 517-552.
Famulare, Michael et al., "Feature selection in simple neurons: how coding depends on spiking dynamics," Neural Comput, (2010), vol. 22, pp. 581-598.
Field, G.D. et al., "Information processing in the primate retina: circuitry and coding," Annu Rev Neurosci, (2007), vol. 30, pp. 1-30.
Fitzgerald, Kathleen M. et al., "Retinal Signal Transmission in Duchenne Muscular Dystrophy: Evidence for Dysfunction in the Photoreceptor/Depolarizing Bipolar Cell Pathway," J Clin Invest, (Jun. 1994), vol. 93, pp. 2425-2430.
Foley, John M. et al., "Contrast Detection and Near-Threshold Discrimination in Human Vision," Vision Res., (1981), vol. 21, pp. 1041-1053.
Freund, Y. et al., "A Decision-Theoretic Generalization of on-Line Learning and an Application to Boosting," Journal of Computer and System Sciences (1997) 55, 119-139.
Friedman, David S. et al., Eye Diseases Prevalence Research Group, "Prevalence of age-related macular degeneration in the United States," Arch Ophthalmol, (Apr. 2004), vol. 122, No. 4, pp. 564-572.
Geisler, Wilson S., "Visual perception and the statistical properties of natural scenes" Annu. Rev. Psychol., (2008), vol. 59, pp. 167-192.
Gerding, H. et al., "Experimental implantation of epiretinal retina implants (EPI-RET) with an IOL-type receiver unit," J Neural Eng, (2007), vol. 4, pp. S38-S49.
Giolli, Roland A. et al., "The accessory optic system: basic organization with an update on connectivity, neurochemistry, and function," Prog Brain Res, (2005), vol. 151, pp. 407-440.
Golan, L. et al., "Design and characteristics of holographic neural photo-stimulation systems," Journal of Neural Engineering, (2009), vol. 6, 14 pages.
Graham-Rowe, Duncan, "A Brighter Future for Retinal Implants: Implants may be common place in only a couple of years," MIT Technology Review, http://www.technologyreview.com/biomedicine/23539/. Boston, MA: MIT (2009), 2 pages.
Greenberg, Kenneth P. et al., "Differential Targeting of Optical Neuromodulators to Ganglion Cell Soma and Dendrites Allows Dynamic Control of Center-Surround Antagonism," Neuron, (Feb. 2011), vol. 69, pp. 713-720.
Grinstead, Charles M. et al., "Introduction to Probability," American Mathematical Society, 2nd Revised Edition, Chapter 1 only,(1997), 7 pages.
Grossman, Nir et al., "Multi-site optical excitation using ChR2 and micro-LED array," J. Neural Eng., (2010), vol. 7, pp. 1-13.
Han, Xue et al., "Millisecond-Timescale Optical Control of Neural Dynamics in the Nonhuman Primate Brain," Neuron, (Apr. 2009), vol. 62, pp. 191-198.
Huberman, A. et al., "Architecture and Activity-Mediated Refinement of Axonal Projections from a Mosaic of Genetically Identified Retinal Ganglion Cells." Neuron. (2008) 59(3):425-38.
Huberman, A. et al., "Genetic Identification of an On-Off Direction-Selective Retinal Ganglion Cell Subtype Reveals a Layer-Specific Subcortical Map of Posterior Motion." Neuron (2009) 62(3):327-334.
International Search Report and Written Opinion from PCT/US2012/052348 dated Nov. 2, 2012, 9 pages.
IPRP (Chapter I) from PCT/US2012/052348 dated Mar. 6, 2014, 7 pages.
Ivanova, E., Pan, Z-H, "Evaluation of the adeno-associated virus mediated long-term expression of channelrhodopsin-2 in the mouse retina." Molecular Vision (2009) 15:1680-1689.
Izhikevich, E.M., "Dynamical Systems in Neuroscience: The Geometry of Excitability and Bursting." Cambridge, MA: MIT Press (2007), 210 pages.
Izhikevich, E.M., "Hybrid spiking models." Phil. Trans. R. Soc. A (2010) 368, 5061-5070.
Jacobs, A.L. et al., "Ruling out and ruling in neural codes." Proc Natl Acad Sci U.S.A. (2009), 106(14):5936-41.
Kass, R.E. et al., "Statistical Issues in the Analysis of Neuronal Data," J Neurophysiol (2005) 94(1): 8-25.
Kawasaki et al., "Variability of the Relative Afferent Pupillary Defect," Am J Ophthalmol (1995) 120: 622-633.
Kay, M.A. et al., "Viral vectors for gene therapy: the art of turning infectious agents into vehicles of therapeutics," Nat Med. (2001) 7(1):33-40.
Kelly, S. et al., "Realization of a 15-Channel, Hermetically-Encased Wireless Subretinal Prosthesis for the Blind," 31st Annual International Conf of the IEEE EMBS, Minneapolis, MN (2009), pp. 200-203.
Kibbel, S. et al. "Design and Performance of an improved active subretinal chip." World Congress on Medical Physics and Biomedical Engineering, Sep. 7-12, 2009, Münich, Germany, IFMBE Proceedings vol. 25/8, 2010, pp. 192-195.
Koilkonda, R.D. et al., "Efficient expression of self-complementary AAV in ganglion cells of the ex vivo primate retina," Molecular Vision (2009) 15:2796-2802.
Kuffler, S.W., "Discharge patterns and functional organization of mammalian retina," J Neurophysiol (1953) 16(1): 37-68.
Lagali, P.S. et al., "Light-activated channels targeted to ON bipolar cells restore visual function in retinal degeneration," Nature Neuroscience (2008) 11:667-675.
Lesica, N.A. et al., "Adaptation to Stimulus Contrast and Correlations during Natural Visual Stimulation." Neuron (2007) 55(3): 479-491.
Lettvin et al., "What the frog's eye tells the frog's brain." Proceedings of the Institute of Radio Engineers (1959) 47(11): 1940-51.
Liao et al., "In vivo gene delivery in the retina using polyethylenimine." BioTechniques (2007) 42:285-288.
Loewenstein, J.I. et al., "Outer Retinal Degeneration: An Electronic Retinal Prosthesis as a Treatment Strategy," Arch Ophthalmol (2004) 122:587-596.
Maguire et al., "Safety and efficacy of gene transfer for Leber's congenital amaurosis," N Eng J Med (2008) 358: 2240-2248.
Mancuso et al., "Gene therapy for red-green colour blindness in adult primates." Nature (2009) 461(7265): 784-787.

(56) References Cited

OTHER PUBLICATIONS

Martin et al., "Gene delivery to the eye using adeno-associated viral vectors." Methods (2002) 28:267-275.
McGowan, M.H. et al.,"Characterization of the Mouse Aldose Reductase Gene and Promoter in a Lens Epithelial Cell Line." Mol Vis (1998); 4:2, 8 pages.
McLaughlin, S.K. et al., "Adeno-associated virus general transduction vectors: analysis of proviral structures," J Virol. (1988) 62(6):1963-73.
Meytlis, et al. "Determining the role of correlated firing in large populations of neurons using white noise and natural scene stimuli", Vision Research, 2012, vol. 70, pp. 44-53.
Meytlis, M. et al., "Assessing the importance of correlated firing using large populations of neurons," Society for Neuroscience (2009) Program No. 165.3, 2 pages.
Morgans, C.W. et al., "TRPM1 is required for the depolarizing light response in retinal ON-bipolar cells," Proc Natl Acad Sci U.S.A. (2009) 106(45): 19174-8.
Nanduri, D. et al., "Retinal prosthesis phosphene shape analysis," 30th Annual International Conference of the IEEE, Engineering in Medicine and Biology Society, Vancouver, BC,(2008) pp. 1785-1788.
Nichols Z, Meytlis M, Nirenberg S., Correlations play a negligible role in coding white noise and natural scene stimuli in complete retinal populations. (2010), 3 pages, Submitted. Abstract only. http://physiology.med.cornell.edu/faculty/nirenberg/lab/marsha/papers.html.
Nirenberg, S. and Cepko, C., Targeted Ablation of Diverse Cell Classes in the Nervous System in vivo. J Neurosci. (1993) 13(8):3238-3251.
Nirenberg, S. and Latham, P.E., "Population coding in the retina," Curr. Opin. Neurobiol. (1998) 8(4):488-493.
Nirenberg, S. and Meister, M., "The Light Response of Retinal Ganglion Cells is Truncated by a Displaced Amacrine Circuit," Neuron (1997) 18:637-650.
Nirenberg, S. et al., "Heterogeneous response dynamics in retinal ganglion cells: the interplay of predictive coding and adaptation," J Neurophysiol (2010) 103(6): 3184-94.
Nirenberg, S. et al., "Retinal ganglion cells act largely as independent encoders," Nature (2001) 411(6838):698-701.
Nirenberg, S., "Photoablation of cells expressing beta-galactosidase," Methods Mol Biol. (2000) 135:475-80.
Norcia, A.M., and Tyler, C.W., "Spatial frequency sweep VEP: visual acuity during the first year of life," Vision Res. (1985) 25(10):1399-408.
Norcia, A.M., et al., "Measurement of spatial contrast sensitivity with the swept contrast VEP," Vision Res. (1989), 29(5):627-637.
Okuyama et al., "Binocular infrared optometer for measuring accommodation in both eyes simultaneously in natural-viewing conditions," Applied Optics, (1993) vol. 32. No. 22, pp. 4147-4154.
Pandarinath et al., "A novel mechanism for switching a neural system from one state to another," Front Comput Neurosci. (2010) 4:2, pp. 1-18.
Pandarinath et al., "Symmetry breakdown in the on and off pathways of the retina at night: functional implications," J Neurosci (2010) 30(30): 10006-10014.
Paninski, L. et al., "Statistical models for neural encoding, decoding, and optimal stimulus design," Prog Brain Res. (2007) 165:493-507.
Paninski, L., "Maximum likelihood estimation of cascade point-process neural encoding models," Network: Comput Neural Syst. 15(2004), pp. 243-262.
Panzeri, S. et al., "Correcting for the Sampling Bias Problem in Spike Train Information Measures," J Neurophysiol. (2007) 98:1064-1072.
Pelli, D.G. et al., "The design of a new letter chart for measuring contrast sensitivity," Clinical Vision Sciences (1988) 2, 187-199.
Perry, V.H. and Silveira, L.C., "Functional lamination in the ganglion cell layer of the macaque's retina," Neuroscience (1988) 25(1):217-223.
Petersen-Jones et al., "AAV retinal transduction in a large animal model species: comparison of a self-complementary AAV2/5 with a single-stranded AAV2/5 vector," Mol Vis (2009) 15: 1835-1842.
Petrs-Silva et al., "High-efficiency transduction of the mouse retina by tyrosine-mutant AAV serotype vectors," Mol Therapy (2009) 17(3): 463-471.
Pillow, J.W. et al., "Spatio-temporal correlations and visual signalling in a complete neuronal population," Nature (2008) 454(7207): 995-999.
Prusky, G.T. et al., "Rapid Quantification of Adult and Developing Mouse Spatial Vision Using a Virtual Optomotor System," Invest Ophthalmol Vis Sci. (2004) 45(12):4611-4616.
Purpura, K. et al., "Light adaptation in the primate retina: analysis of changes in gain and dynamics of monkey retinal ganglion cells," Vis Neurosci (1990) 4(1): 75-93.
Rolls, E.T. et al., "Role of low and high spatial frequencies in the face-selective responses of neurons in the cortex in the superior temporal sulcus in the monkey," Vision Res. (1985) 25(8):1021-1035.
Sauer B., "Functional expression of the cre-lox site-specific recombination system in the yeast *Saccharomyces cerevisiae*," Mol Cell Biol. (1987) 7(6):2087-96.
Shapley, R.M. and Victor, J.D., "How the contrast gain control modifies the frequency responses of cat retinal ganglion cells." J Physiol. (1981) 318:161-79.
Sharpee, T.O. et al., "On the Importance of Static Nonlinearity in Estimating Spatiotemporal Neural Filters With Natural Stimuli," J Neurophysiol (2008) 99(5): 2496-509.
Sheridan, C., "Gene Therapy finds its niche," Nature Biotechnology (2011) 29(2):121-128.
Siegert, S., "Genetic address book for retinal cell types," Nature Neuroscience (2009) 12(9):1197-1204.
Simoncelli et al., "Characterization of neural responses with stochastic stimuli," The Cognitive Neurosciences, 3rd edition (2004), 20 pages.
Simonelli et al., "Gene Therapy for Leber's Congenital Amaurosis is Safe and Effective Through 1.5 Years After Vector Administration," Molecular Therapy (2010) 18(3), pp. 643-650.
Sinclair, J.R. et al., "Selective ablation of a class of amacrine cells alters spatial processing in the retina," J Neurosci. (2004) 24(6):1459-67.
Sjostrand et al., "Morphometric study of the displacement of retinal ganglion cells subserving cones within the human fovea," Graefe's Arch Clin Exp Ophthalmol (1999) 237:1014-1023.
Soucy, E.R. et al., "A novel signaling pathway from rod photoreceptors to ganglion cells in mammalian retina," Neuron (1998) 21:481-493.
Stone et al., "Response properties of ganglion cells in the isolated mouse retina," Vis Neurosci (1993) 10(1): 31-39.
Strong, S.P. et al., "On the application of information theory to neural spike trains," Pac Symp Biocomput (1998) 621-32.
Thyagarajan, S. et al., "Visual function in mice with photoreceptor degeneration and transgenic expression of channelrhodopsin 2 in ganglion cells," J Neurosci (2010) 30(26):8745-8758.
Tomita, H. et al., "Channelrhodopsin-2 gene transduced into retinal ganglion cells restores functional vision in genetically blind rats," Exp Eye Res (2010) 90:429-436.
Troy, J.B. et al., "Spatial properties of the cat X-cell receptive field as a function of mean light level," Vis Neurosci (1999) 16(6): 1089-1104.
Troy, J.B. et al., "Spatiotemporal integration of light by the cat X-cell center under photopic and scotopic conditions," Vis Neurosci (2005) 22(4): 493-500.
Turchinovich et al., "Non-viral siRNA delivery into the mouse retina in vivo," BMC Ophthalmology (2010) 10:25.
Ueda et al., "The mGluR6 5' upstream transgene sequence directs a cell-specific and developmentally regulated expression in retinal rod and ON-type cone bipolar cells," J Neurosci. (1997) 17(9):3014-3023.
van Adel et al., "Delivery of ciliary neurotrophic factor via lentiviral-mediated transfer protects axotomized retinal ganglion cells for an extended period of time," Hum. Gene Ther. (2003) 14:103-115.

(56) References Cited

OTHER PUBLICATIONS

Victor, J.D., "The dynamics of the cat retinal X cell centre," The Journal of Physiology (1987) 386(1):219-246.
Victor, J.D., Shapley R.M., "The nonlinear pathway of Y ganglion cells in the cat retina," J Gen Physiol. (1979) 74(6):671-689.
Volgyi, B., "Convergence and Segregation of the Multiple Rod Pathways in Mammalian Retina," J Neurosci (2004) 24(49):11182-11192.
Walther, W., Stein, U., "Viral vectors for gene transfer: a review of their use in the treatment of human diseases," Drugs (2000) 60(2):249-271.
Wassle H., "Parallel processing in the mammalian retina," Nat Rev Neurosci (2004) 5(10): 747-57.
Wells et al., "Optical stimulation of neural tissue in vivo," Optics Letters (2005) 30(5):504-506.
Winter, J.O. et al., "Retinal prostheses: current challenges and future outlook," J Biomater Sci Polym Ed (2007) 18(8):1031-1055.
Wright, A.F., "Gene therapy for the eye," Br J Ophthalmol (1997) 81(8): 620-623.
Yonehara, K. et al., "Expression of SPIG1 Reveals Development of a Retinal Ganglion Cell Subtype Projecting to the Medial Terminal Nucleus in the Mouse," PLoS One (2008) 3(2): e1533, 18 pages.
Yonehara, K. et al., "Identification of Retinal Ganglion Cells and Their Projections Involved in Central Transmission of Information about Upward and Downward Image Motion," PLoS One (2009) 4(1): e4320, 14 pages.
Zhang, Y. et al., "Ectopic expression of multiple microbial rhodopsins restores on and off light responses in retinas with photoreceptor degeneration," J Neurosci (2009) 29(29):9186-9196.
Zrenner, E., et al., "Subretinal Microelectrode Arrays Allow Blind Retinitis Pigmentosa Patients to Recognize Letters and Combine them to Words," BMEI '09. 2nd International Conference on Biomedical Engineering and Informatics. Issue Date: Oct. 17-19, 2009. ISBN: 978-1-4244-4132-7. pp. 1-4.
Eckmiller, Rolf et al., "Tunable Retina Encoders for Retina Implants: Why and How," Journal of Nueral Engineering, (2005) 2(1), pp. S91-S104.
Extended Search Report received for European Patent Application No. 12825425.7 dated May 23, 2016, 10 pages.
Huang, Yan et al., "An Optoelectronic Platform for Retinal Prosthesis," Biomedical Circuits and Systems Conference, (2006), pp. 110-113.
Novin, Shabnam et al., "Transforming of images information to the implant part of retinal prosthesis, by converting of images to bit formats," Proceedings of the 17th Iranian Conference of Biomedical Engineering, (Nov. 3-4, 2010), 4 pages.
Zou, Yuexian et al., "Extraocular Image Processing for Retinal Prothesis Based on DSP," Nano/Micro Engineered and Molecular Systems (NEMS 2009), 4th IEEE International Conference on IEEE, (Jan. 2009), pp. 563-566.
Ausubel et al., Current Protocols in Molecular Biology, "Overview of the HIV-1 Lentivivral Vector System", John Wiley & Sons, New York, (1989), Unit 16.21, 15 pgs.
Ausubel et al., Current Protocols in Molecular Biology, "Production of Recombinant Adeno-Associated Viral Vectors for In Vitro and In Vivo Use", John Wiley & Sons, New York, (1989), Unit 16.25, 24 pgs.
Averback et al., Effects of Noise Correlations on Information Encoding and Decoding, J Neurophysiol, vol. 95, 2006, pp. 3633-3644.
Brown CJ et al., The Relationship Between EAP and EABR Thresholds and Levels Used to Program the Nucleus 24 Speech Processor: Data from Adults, Ear and Hearing, vol. 21, No. 2, 2000, pp. 151-163.
Cescon C. et al., "Non-invasive characterization of single motor unit electromyographic and mechanomyographic activities in the biceps brachii muscle", J Electromyogr Kinesiol, vol. 16, No. 1, Epub Aug. 19, 2005, pp. 17-24.

Chen, Xiaowei et al., "HSV amplicon-mediated neurotrophin-3 expression protects murine spiral ganglion neurons from cisplatin-induced damage", Mol Ther., (Jun. 2001), vol. 3, No. 6, pp. 958-963.
Chestek, Cynthia A. et al., "HermesC: Low-Power Wireless Neural Recording System for Freely Moving Primates" IEEE, (Aug. 2009), vol. 17, No. 4, pp. 268-275.
Chiappa, "Evoked Potentials in Clinical Medicine", Third Edition, Lippincott Raven (1997).
Eckmiller, R. et al., "Dialog Concepts for Learning Retina Encoders," IEEE International Conference on Neural Networks Proceedings, (Jun. 1, 1997), vol. 4, pp. 2315-2320.
Examination Report received in European Patent Application 11748237.2 issued Sep. 3, 2014, 5 pages.
Examination Report received in European Patent Application No. 11748237.2 dated Apr. 16, 2014, 6 pages.
Examination Report received in European Patent Application No. 11822382.5 mailed Oct. 27, 2014, 6 pages.
Extended Search Report and Search Opinion for European Application No. 11748237.2, mailed Jul. 19, 2013.
Extended Search Report received in European Patent Application No. 11822382 dated Feb. 17, 2014, 8 pages.
Final Office Action issued in U.S. Appl. No. 15/073,002 mailed Aug. 9, 2016, 27 pages.
Final Office Action received in U.S. Appl. No. 13/230,488 issued Nov. 26, 2014, 24 pages.
First Examination Report received in Australian Patent Application No. 2011220367 issued Jul. 13, 2015, 5 pages.
First Office Action from Chinese Application No. 201180021117.2 dated May 6 2014, 15 pages—with English Translation.
First Office Action received in Chinese Patent Application No. 201180051504.0 issued Oct. 10, 2014, first received Nov. 25, 2014, 16 pages with English translation.
Franck KH., "A model of a nucleus 24 cochlear implant fitting protocol based on the electrically evoked whole nerve action potential", Ear & Hearing, vol. 23, No. 18, 2002, pp. 67S-71S.
Guiraud D. et al., "An implantable neuroprosthesis for standing and walking in paraplegia: 5-year patient follow-up", Journal of Neural Engineering, 2006, vol. 3, pp. 268-275.
Hochberg LR, et al., "Neuronal ensemble control of prosthetic devices by a human with tetraplegia", Nature, Jul. 13, 2006, vol. 442, pp. 164-171.
Huang et al., "An Optoelectronic Platform for Retinal Prosthesis," Biomedical Circuits and Systems Conference (BIOCAS 2006), IEEE, pp. 110-113, Nov. 29, 2006.
International Search Report in PCT/US2011/026526 dated Apr. 22, 2011.
Kim RH et al., "Waterproof AlInGaP optoelectronics on stretchable substrates with applications in biomedicine and robotics", Nature Materials, 2010, vol. 9, pp. 929-937.
Lee et al., "Variability and Correlated Noise in the Discharge of Neurons in Motor and Parietal Areas of the Primate Cortex", The Journal of Neuroscience, Feb. 1, 1998, vol. 18, No. 3, pp. 1161-1170.
Lei L. et al., "Efficient transduction of spiral ganglion cells using adenovirus type 5 vector in the rat , Acta Oto-Laryngologica", 2010, vol. 130, pp. 810-814.
Liu Y. et al., "Promoter effects of adeno-associated viral vector for transgene expression in the cochlea in vivo", Experimental and Molecular Medicine, Apr. 2007, vol. 38, No. 2, pp. 170-175.
Luebke AE et al., "Adenoviral and AAV-mediated gene transfer to the inner ear: role of serotype, promoter, and viral load on in vivo and in vitro infection efficiencies", Adv. Otorhinolaryngol.Basel, Karger, 2009, vol. 66, pp. 87-98.
Moritz CT et al., "Direct control of paralysed muscles by cortical neurons", Nature, Dec. 2008, vol. 456, vol. 456, pp. 639-643.
New Zealand IPO First Examination Report dated Sep. 20, 2013 for New Zealand patent application 608804.
Non-Final Office Action in U.S. Appl. No. 13/230,488 dated Feb. 3, 2014.
Non-Final Office Action received in U.S. Appl. No. 13/230,488 mailed Jul. 2, 2015, 15 pages.

(56) References Cited

OTHER PUBLICATIONS

Non-Final Office Action received in U.S. Appl. No. 13/821,187 mailed Jul. 30, 2014, 20 pages.
Notice of Allowance received for U.S. Appl. No. 13/230,488 mailed Nov. 24, 2015, 10 pages.
Notice of Allowance received for U.S. Appl. No. 13/595,812 mailed Aug. 13, 2015, 37 pages.
Notice of Allowance received in U.S. Appl. No. 13/821,187 issued Jul. 8, 2015, 23 pages.
Novin et al., "Transforming of Images Information to the Implant Part of Retinal Prothesis, by Converting of Images to Bit Formats," Biomedical Engineering (ICBME), 2010 17th Iranian Conference of IEEE, pp. 1-4, Nov. 3, 2010.
Office Action received in Japanese Patent Application No. 2012-555211 mailed Nov. 5, 2014, 9 pages—with English translation.
Pandarinath et al., "A Novel Mechanism for Switching a Neural System From One State to Another," Frontiers in Computational Neuroscience, 31(4):2 (2010), p. 1-18.
Paninski, et al. "Statistical models for neural encoding, decoding, and optimal stimulus design", Progress in Brain Research, vol. 165, 2007, pp. 493-507.
Rubinstein JT et al., "How do cochlear prostheses work?", Current Opinion in Neurobiology, 1999, vol. 9, pp. 399-404.
Second Office Action received for Chinese Patent Application No. 201180021117.2 mailed Feb. 2, 2015, 9 pages—with English translation.
Sellick PM et al., "Modulation of responses of spiral ganglion cells in the guinea pig cochlea by low frequency sound", Hearing Research, 1982, vol. 7, pp. 199-221.
Third Office Action received in Chinese Patent Application No. 201180021117.2 mailed Aug. 3, 2015, 8 pages with English translation.
Wang H. et al., "Efficient cochlear gene transfection in guinea-pigs with adeno-associated viral vectors by partial digestion of round window membrane", Gene Therapy, 2012, vol. 19, pp. 255-263.
Zeng, et al. "Cochlear Damage Changes the Distribution of Vesicular Glutamate Transporters Associated with Auditory and Nonauditory Inputs to the Cochlear Nucleus", The Journal of Neuroscience, Apr. 1, 2009, vol. 29, No. 13, pp. 4210-4217.
Zierhofer CM et al., "Electronic Design of a Cochlear Implant for Multichannel High-Rate Pulsatile Stimulation Strategies", IEEE, Transactions on Rehabilitation Engineering, Mar. 1995, vol. 3, No. 1, pp. 112-116.
Office Action received for Japanese Patent Application No. 2014-527338 English translation only.
Search Report issued on EP Application 15201184.7, mailed Sep. 29, 2016.
Office Action issued on Chinese Application201280052177.5, mailed Sep. 12, 2016, English translation only.
Qinghua et al., "Algorithms of Path Guidance Line Based on Computer Vision and Their Applications in Agriculture and Forestry Environment," Journal of Agricultural Machinery, Issue 3, vol. 4, Mar. 31, 2009, pp. 147-151 Abstract only.
Wohrer et al., "Virtual Retina: A biological retina model and simulator, with contrast gain control," J Comput Neurosci, vol. 26, 2009, pp. 219-249.
Office Action issued on Japanese Application 2015-238731, mailed Nov. 21, 2016, English translation not available (109691-1090).

\* cited by examiner

First five frames or training sequence

Subsequent frames sampled more sparsely to cover the rest of the movie

Testing set 1: First four frames of rural sequence
(intentionally different from the training sequence)

Subsequent frames sampled more sparsely to cover the rest of the movie

Testing set 2: First four frames of suburban sequence

Subsequent frames sampled more sparsely to cover the rest of the movie

Testing set 3: First four frames of playground sequence

Subsequent frames sampled more sparsely to cover the rest of the movie

RETINAL ENCODER FOR MACHINE VISION

CROSS REFERENCE TO RELATED APPLICATION

This application is a national stage of International Application No. PCT/US2012/052348 (filed Aug. 24, 2012), which claims the benefit of U.S. Provisional Application Nos. 61/527,493 (filed Aug. 25, 2011) and 61/657,406 (filed Jun. 8, 2012). The contents of each of the forgoing applications are incorporated by reference in their entirety.

This application is also related to U.S. Provisional Application Nos. 61/308,681 (filed on Feb. 26, 2010), 61/359,188 (filed on Jun. 28, 2010), 61/378,793 (filed on Aug. 31, 2010), and 61/382,280 (filed on Sep. 13, 2010); to U.S. patent application Ser. No. 13/230,488, (filed on Sep. 12, 2011); and to International Patent Application Nos. PCT/US2011/026526 (filed on Feb. 28, 2011) and PCT/US2011/049188 (filed Aug. 25, 2011). The contents of each of the forgoing applications are incorporated by reference in their entirety.

STATEMENT REGARDING FEDERALLY SPONSORED RESEARCH OR DEVELOPMENT

This invention was made with U.S. Government support under is R01 EY12978 awarded by the National Eye Institute of the National Institute of Health (NIH). The U.S. Government has certain rights in the invention.

FIELD

The present disclosure relates to methods and devices for use in machine vision. In particular, the present disclosure relates to methods and devices for processing images using encoders that mimic the performance of an animal retina, and using the processed images in machine vision applications.

BACKGROUND

Machine vision (or computer vision) refers to technology that allows a computer to use visual information, e.g., to extract information from an image, to solve some task, or perhaps "understand" the scene in either a broad or limited sense. In general, machine vision is concerned with the extraction of information from image data. The image data can take many forms, such as single images, video sequences, views from multiple cameras, or higher dimensional data (e.g., three dimensional images from a medical scanner).

Machine vision has numerous applications, ranging from relatively simple tasks, such as industrial systems used to count objects passing by on a production line, to more complicated tasks such as facial recognition, and perceptual tasks (e.g., to allow robots to navigate complex environments). A non-limiting list of examples of applications of machine vision include systems for controlling processes (e.g., an industrial robot or an autonomous vehicle), detecting events (e.g., for visual surveillance or people counting), organizing information (e.g., for indexing databases of images and image sequences), modeling objects or environments (e.g., industrial inspection, medical image analysis or topographical modeling), and interaction (e.g., as the input to a device for computer-human interaction).

In many applications, machine vision involves highly computationally expensive tasks. A single color digital image may be composed of millions of pixels or more, each pixel having an associate value, such as a multiple (e.g., 8 or 24) bit value defining the coordinates of the pixel in a color space (e.g., the familiar RGB color space, the YCbCr space, the HSV space, etc.). Video streams may include sequences of such images at frame rates of, e.g., dozens of frames per second, corresponding to bit rates of hundreds of megabits per second or more. Many machine vision applications require quick processing of such images or video streams (e.g., to track and react to the motion of an object, to identify or classify an object as it moves along an assembly line, to allow a robot to react in real time to its environment, etc.).

Processing such a large volume of data under such time constraints can be extremely challenging. Accordingly, it would be desirable to find techniques for processing image data to reduce the raw amount of information while retaining (or even accentuating) the features of the image data that are salient for the machine vision task at hand. This preprocessed image data, rather than the raw data, could then be input to a machine vision system, reducing the processing burden on the system and allowing for sufficiently speedy response and potentially improved performance.

It has been recognized that the retina of the vertebrate eye provides image processing of this just this nature, taking in a visual stimulus and converting the stimulus into a form that can be understood by the brain. This system (developed over the course of millions of years of evolution) is remarkably efficient and effective, as evidenced by high level of complex visual perception in mammals (particularly monkeys and humans).

Several approaches have been proposed for developing image data pre-processing schemes for machine vision based on abstract models of the operations of the retina. However, these models have been based on rough approximations to the actual performance of the retina.

SUMMARY

Embodiments described in the present disclosure utilize an encoder that provides a near-complete replication of the operations performed by the retina. As described in detail in International Patent Applications, incorporated by reference above (henceforth the "Prosthesis Applications") this encoder may be used to develop a highly effective retinal prosthetic. In the present disclosure, the encoder is applied to machine vision.

When used as a preprocessing step (in particular, a dimension-reduction step), the encoder substantially enhances the performance of machine vision algorithms. In some embodiments, the encoder allows the machine vision algorithm to extract information very effectively in a broad range of environments and lighting conditions, including information that could not be extracted by other methods. In cases where existing machine vision algorithms are in part effective, this dimension reduction may serve as a strong enhancer. The encoder may allow the extraction to be carried out more effectively (higher performance), as well as faster and more efficiently.

As described in detail in the Prosthesis Applications the applicants have developed a prosthetic device that receives a stimulus, and transforms the stimulus into a set of codes with a set of encoders, transforms the codes into signals with an interface, which then activate a plurality of retinal cells with a high resolution transducer driven by the signals from the interface. Activation of the plurality of retinal cells results in retinal ganglion cell responses, to a broad range of stimuli, which are substantially similar to the time dependent responses of retinal ganglion cells from a normal retina to the same stimuli. The applicants have realized that the encoders used in such devices may be adapted to process image data for use in machine vision applications.

The retina prosthesis described in the Prosthesis Applications, like the normal retina, is an image processor—it extracts essential information from the stimuli it receives, and reformats the information into patterns of action potentials the brain can understand. The patterns of action potentials produced by the normal retinal are in what is referred to as the retina's code or the ganglion cell's code. The retina prosthesis converts visual stimuli into this same code, or a close proxy of it, so that the damaged or degenerated retina can produce normal or near-normal output. Because the retina prosthesis uses the same code as the normal retina or a close proxy of it, the firing patterns of the ganglion cells in the damaged or degenerated retina, that is, their patterns of action potentials are the same, or substantially similar, to those produced by normal ganglion cells. Thus, this prosthetic allows the retina to send to the brain the same signals about the visual world as the normal retina.

As detailed in the Prosthesis Application, the encoders use input/output models for retinal cells which were generated using data obtained from studies of the input/output response of actual retinal cells to a variety of stimuli, e.g., both white noise (WN) and natural scene (NS) movies. In some embodiments, the encoders are based on a linear nonlinear cascade model that includes a spatiotemporal transformation characterized by a number of parameters. These parameters are optimized based on data obtained through experiments in the real retina, resulting in transformation that closely mimics the response of the actual cells to a broad range of stimuli. The result is a model that captures the input/output relations for natural images (static or spatiotemporally-varying), such as faces, landscapes, people walking, children playing, etc., not just for white noise stimuli or stimuli with Gaussian statistics. The effectiveness on a broad range of stimuli is shown in the Prosthesis Applications, and in FIGS. 18A-18F discussed in detail below.

Because this approach leverages data obtained through experiments, the generated encoders can accurately simulate retinal processing, without requiring a detailed abstract understanding of the retina's underlying processing schemes. For example, it is believed that retinal processing in primates and humans highlights features in the visual stimulus useful for pattern recognition tasks (e.g., facial recognition) while de-emphasizing or eliminating other features (e.g., redundant information or noise) to allow for efficient processing in the brain. As of yet, there is no complete abstract understanding of the details of this processing scheme, which developed as the result natural selection over the course of eons. However, despite this lack of abstract understanding, the devices and techniques described herein can capture the benefit of this processing, by accurately mimicking the retinal response.

In other words, in various embodiments described herein, the approach is data-driven—that is, it uses a data-driven model of retinal input/output relations, and thus provide realistic image pre-processing. This gives downstream machine vision algorithms a pre-processing step that accomplishes the same kind and the same magnitude of dimension reduction as the biological retina, and, therefore, offers the same array of advantages as the biological retina.

Note that in general, the approaches described herein differ from previous preprocessors that filter image data with, for example, a difference-of-Gaussians type filter, because they may provide a complete or near complete mimicking of the retina. Similarly, it differs from other linear-nonlinear cascade models in that it is effective on a broad range of stimuli, not just white noise stimuli or stimuli with Gaussian statistics. Thus, the filtering is much more complete, and it greatly enhances the power of current machine vision algorithms. Most importantly, it allows current machine vision algorithms to generalize, i.e., to be trained in one setting (one environment or lighting condition) and generalize to other environments, which has been a long-standing challenge (see e.g., FIGS. 10, 11, and 15 as described in detail below).

Moreover, in some embodiments, because the retinal processing is accurately modeled for a broad range of stimuli (e.g., as a result of optimization using both WN- and NS-generated data), the pre-processing for the machine vision system works well over a broad range of conditions (similar to the way the retina works over a broad range of conditions). Advantageously, this allows the retinal preprocessing techniques to be used in machine vision applications that require robust performance under a variety of conditions (e.g., lighting changes, complex, changing visual scenes, many different environments, etc.).

In one aspect, a method is disclosed including: receiving raw image data corresponding to a series of raw images; processing the raw image data with an encoder to generate encoded data, where the encoder is characterized by an input/output transformation that substantially mimics the input/output transformation of one or more retinal cells of a vertebrate retina; and applying a first machine vision algorithm to data generated based at least in part on the encoded data.

Some embodiments include generating a series of retinal images based on the encoded data. Some embodiments include determining pixel values in the retinal images based on the encoded data. In some embodiments, determining pixel values in the retinal images based on the encoded data includes determining a pixel intensity or color based on encoded data indicative of a retinal cell response.

In some embodiments, the data indicative of a retinal cell response is indicative of at least one from the list consisting of: a retinal cell firing rate, a retinal cell output pulse train, and a generator potential.

Some embodiments include applying the first machine vision algorithm to the series of retinal images.

In some embodiments, the machine vision algorithm includes at least one select from the list consisting of: an object recognition algorithm, an image classification algorithm, a facial recognition algorithm, an optical character recognition algorithm, a content-based image retrieval algorithm, a pose estimation algorithm, a motion analysis algorithm, an egomotion determination algorithm, a movement tracking algorithm, an optical flow determination algorithm, a scene reconstruction algorithm, a 3D volume recognition algorithm, and a navigation algorithm.

In some embodiments, the machine vision algorithm exhibits better performance when applied to the series of retinal images than when applied to a corresponding set of raw images that have not been processed using the encoder.

In some embodiments, the machine vision algorithm exhibits better performance when applied to a series of retinal images including natural scenes than when applied to a corresponding series of raw images that have not been processed using the encoder.

In some embodiments, the machine vision algorithm includes an algorithm for the detection or identification of a human within a series of images; and where the machine vision algorithm exhibits better detection or identification accuracy when applied to a range of retinal images including the human than when applied to a corresponding set of raw images that have not been processed using the encoder.

In some embodiments, the series of images includes the human includes images of the human located in a natural scene.

In some embodiments, the series of images including the human includes images of the human located in a natural scene that is different from natural scenes used to train the machine vision algorithm.

In some embodiments, the machine vision algorithm includes an algorithm for navigation through a real or virtual environment, and where the machine vision algorithm exhibits better navigation performance when applied to a series of retinal images including a natural scene than when applied to a corresponding set of raw images that have not been processed using the encoder.

In some embodiments, the machine vision algorithm exhibits fewer unwanted collision events during navigation when applied to a series of retinal images including a natural scene than when applied to a corresponding set of raw images that have not been processed using the encoder.

In some embodiments, the series of retinal images correspond to an environment that was not used to train the machine vision algorithm.

Some embodiments include applying a machine imaging algorithm to the series of retinal images to identify one or more retinal images of interest; and identifying one or more raw images of interest corresponding to the retinal images of interest. Some embodiments include processing the raw images of interest. In some embodiments, processing the raw images of interest includes applying a second machine vision algorithm to the raw images of interest. In some embodiments, the first machine vision algorithm includes an algorithm that has been trained on a set of retinal images; and the second machine vision algorithm includes an algorithm that has been trained on a set of raw images.

In some embodiments, applying the first machine vision algorithm includes applying a navigation algorithm. In some embodiments, applying the navigation algorithm includes: processing the series of retinal images to determine motion information indicative of motion at a plurality of image locations in the series of images; classifying spatial regions in the series of images based on the motion information; and generating a navigation decision based on the classification of the spatial regions. In some embodiments, the motion information is indicative of an optical flow in the series of images. Some embodiments include using a convolutional neural network to classify the spatial regions.

Some embodiments include controlling the motion of a robotic apparatus based on results from navigation algorithm.

Some embodiments include controlling the motion of a virtual object in a virtual space based on results from navigation algorithm.

Some embodiments include training a machine vision algorithm based on the retinal images. In some embodiments, training the machine vision algorithm includes: (i) applying the machine vision algorithm to a set of retinal images to generate an output; (ii) determining performance information indicative of the performance of the machine vision algorithm based on the output; and (iii) modifying one or more characteristics of the machine vision algorithm based on the performance information. Some embodiments include iteratively repeating steps (i) through (iii) until a selected performance criteria is reached.

In some embodiments, the trained machine vision algorithm is characterized by a set of parameters, and where the parameters differ from the corresponding parameters that would be obtained by equivalent training of the machine vision algorithm using raw images corresponding to the retinal images.

In some embodiments, processing the raw image data with an encoder to generate encoded data includes generating encoded data that contains a reduced amount of information relative to the corresponding raw image data. In some such embodiments, the machine vision algorithm exhibits better performance when applied to the series of retinal images than when applied to a corresponding set of raw images that have not been processed using the encoder.

In some embodiments, the amount of information contained in the encoded data is compressed by a factor of at least about 1.5, 2, 3, 4, 5, 6, 7, 8, 9, 10, or more, e.g. in the range of 1.1-1,000 or any subrange thereof, relative to the corresponding raw image data.

In some embodiments, the vertebrate includes at least one selected from the list consisting of: a mouse, and a monkey.

In some embodiments, the retinal cells include ganglion cells. In some embodiments, the retinal cells include at least two classes of cells. In some embodiments, the at least two classes of cells includes ON cells and OFF cells.

In some embodiments, the encoder is characterized by an input/output transformation that substantially mimics the input/output transformation of one or more retinal cells of a vertebrate retina over a range of input that includes natural scene images, including spatio-temporally varying images.

In some embodiments, processing the raw image data with an encoder to generate encoded data includes: processing the raw image data to generate a plurality of values, X, transforming the plurality of X values into a plurality of response values, $\lambda_m$, indicative of a corresponding response of a retinal cell in the retina, m, and generating the encoded data based on the response values. In some embodiments, the response values correspond to retinal cell firing rates. In some embodiments, the response values correspond to a function of the retinal cell firing rates. In some embodiments, the response values correspond to retinal cell output pulses. In some embodiments, the response values correspond to retinal cell generator potential, i.e., the output of the convolution of the image with the spatiotemporal filter(s).

In some embodiments, processing the raw image data with an encoder to generate encoded data includes: receiving images from the raw image data and, for each image, rescaling the luminance or contrast to generate a rescaled image stream; receiving a set of N rescaled images from the rescaled image stream and applying a spatiotemporal transformation to the set of N images to generate a set of retinal response values, each value in the set corresponding to a respective one of the retinal cells; generating the encoded data based on the retinal response values.

In some embodiments, the response values include retina cell firing rates. In some embodiments N is at least 5, at least about 20, at least about 100 or more, e.g., in the range of 1-1,000 or any subrange thereof.

In some embodiments, applying a spatiotemporal transformation includes: convolving of the N rescaled images with a spatiotemporal kernel to generate one or more spatially-temporally transformed images; and applying a non-linear function to the spatially-temporally transformed images to generate the set of response values.

In some embodiments, applying a spatiotemporal transformation includes: convolving the N rescaled images with a spatial kernel to generate N spatially transformed images;

convolving the N spatially transformed images with a temporal kernel to generate a temporal transformation output; and applying a nonlinear function to the temporal transformation output to generate the set of response values.

In some embodiments, the encoder is characterized by a set of parameters, and where the values of the parameters are determined using response data obtained experimentally from a vertebrate retina while said retina is exposed to white noise and natural scene stimuli.

In some embodiments, the encoder is configured such that the Pearson's correlation coefficient between a test input stimulus and a corresponding stimulus reconstructed from the encoded data that would be generated by the encoder in response to the test input stimulus is at least about 0.35, 0.65, at least about 0.95, or more, e.g., in the range of 0.35-1.0 or any subrange thereof. In some embodiments, the test input stimulus includes a series of natural scenes.

In another aspect, an apparatus is disclosed including: at least one memory storage device configured to store raw image data; at least one processor operably coupled with the memory and programmed to execute one or more of the methods described herein.

In some embodiments, a non-transitory computer-readable medium having computer-executable instructions for implementing the steps of one or more of the methods described herein.

In another aspect, a system is disclosed including: at least one memory storage device storing encoded data corresponding to a series of images, where the encoded data has been generated by: receiving raw image data corresponding to a series of raw images; and processing the raw image data with an encoder to generate encoded data, where the encoder is characterized by an input/output transformation that substantially mimics the input/output transformation of one or more retinal cells of a vertebrate retina. In some embodiments, the at least one storage device stores database information indicative of a correspondence between the encoded data and the raw image data.

Some embodiments include a processor configured to: receive query image data corresponding to a series of query images; process the query image data with an encoder to generate encoded data, where the encoder is characterized by an input/output transformation that substantially mimics the input/output transformation of one or more retinal cells of a vertebrate retina; compare the encoded query image data to the encoded data on the memory storage device; and based on (a) the comparison of the encoded query data to the encoded data on the memory storage device, and (b) the database information indicative of a correspondence between the encoded data and the raw image data, determine a correspondence between the query image data and the raw image data.

In another aspect, a method is disclosed including: receiving raw image data corresponding to a series of raw images; processing at least a first portion of the raw image data with an encoder to generate first encoded data, where the encoder is characterized by an input/output transformation that substantially mimics the input/output transformation of one or more retinal cells of a first vertebrate retina from a first vertebrate type; and processing at least a second portion of the raw image data with an encoder to generate encoded data, where the encoder is characterized by an input/output transformation that substantially mimics the input/output transformation of one or more retinal cells of a second vertebrate retina from a second vertebrate type different from the first vertebrate type.

Some embodiments include based on the first encoded data, selecting the second portion of the raw image data for processing.

In various embodiments, the raw image data is received in substantially real time from an image detector or from a memory that stores the raw image data, or from a combination thereof.

In another aspect, an apparatus is disclosed including: at least one memory storage device configured to store raw image data; at least one processor operably coupled with the memory and programmed to execute one or more of the methods described herein.

In another aspect, a non-transitory computer-readable medium having computer-executable instructions for implementing the steps of one or more of the methods described herein.

In another aspect, a system is disclosed including: at least one memory storage device storing encoded data corresponding to a series of images, where the encoded data has been generated by: receiving raw image data corresponding to a series of raw images; and processing the raw image data with an encoder to generate encoded data, where the encoder is characterized by an input/output transformation that substantially mimics the input/output transformation of one or more retinal cells of a vertebrate retina. In some embodiments, the at least one storage device stores database information indicative of a correspondence between the encoded data and the raw image data.

Various embodiments may include any of the above described elements, alone or in any suitable combination.

DETAILED DESCRIPTION

Figure 1:
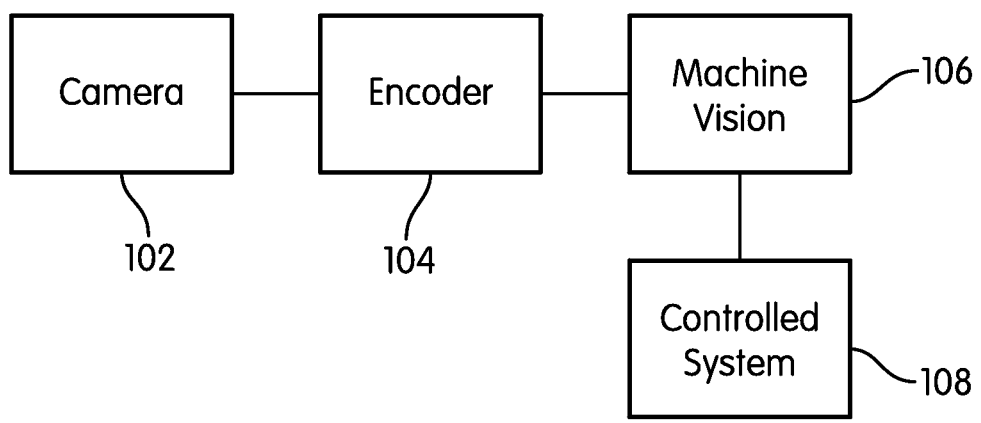
FIG. 1 is a block diagram showing an exemplary machine vision system.

FIG. 1 shows an exemplary machine vision system 100 featuring a camera 102, an encoder module 104, a machine vision module 106, and a system 108 controlled by the machine vision module. The camera 102 receives visual stimulus and converts it to digital image data e.g., a stream of digital images. This digital image data may be referred to herein as a "raw" image data. It is to be understood that raw image data may include any image data prior to processing by a retinal encoder.

The encoder module 104 receives the image data and processes the data using one or more retinal encoders of the type described herein and/or in the Prosthesis Applications. The output of the encoder module, referred to as "retinal image data" is passed to the machine vision module, which processes the retinal image data, e.g., using one or more machine vision techniques know in the art and/or described herein. Based on the machine vision processing, the machine vision module 106 generates output that that may be used for any suitable purpose. As shown, the output controls one or more systems 108, e.g., a robotic system. In some embodiments the image processing and/or control may be performed in real time or near real time.

It is to be understood that the system shown in FIG. 1 is exemplary only, and various other types of machine vision systems may be used. For example, in some embodiments, the controlled system 108 may be absent, e.g., where the output of the machine vision module is stored, output for further processing, etc., rather than used for control. In some embodiments, the camera 102 may be replaced, e.g., by a source of stored image data. In some embodiments additional elements may be included, e.g., various processors or controller, user controls, input or output devices, etc.

In various embodiments, the camera 102 may be any device capable of converting visual stimulus to a digital form, e.g., a stream of digital images. Various embodiments may include devices based on charge-coupled devices (CCDs); active pixel sensors (APS) such as complimentary metal-oxide-semiconductor (CMOS) sensors, thin-film transistors (TFTs), arrays of photodiodes; and the combinations thereof.

The digital images generated by the camera 102 may each include at least 0.01 megapixels, at least 0.1 megapixels, at least 1 megapixel, at least 2 megapixels, or more, e.g., in the range of 0.01-1000 megapixels or any subrange thereof. The stream of digital images may be characterized by a frame rate (i.e., the number of image frames per second) of at least 10 Hz, at least 50 Hz, at least 100 Hz, or more, e.g., in the range of 1-1000 Hz or any subrange thereof. The digital images may be color, grayscale, black and white, or other suitable types of images.

In some embodiments, the camera is based around a charge-coupled device (CCD). In one embodiment, the camera 100 is a Point Grey Firefly MV device (capable of 752×480 pixels, 8 bits/pixel, at 60 frames per second) (Point Grey Research, Richmond, BC, Canada). In another embodiment, the camera 100 is an E-consystems e-CAM50_OMAP_GSTIX, which integrates an Omnivision OV5642 camera module, capable of 1280×720 pixels, 8 bits/pixel, at 30 frames per second).

In some embodiments, images are acquired by the camera 102 and transmitted to the encoder module 104 with sufficient speed to allow the device 100 to operate without undesirable lag times. To accomplish this, in some embodiments, a high bandwidth connection is provided between the camera 102 and the encoder module 104. For example, a data transfer of greater than 20 MB/sec can be achieved using a USB 2.0 interface between the camera and the processing device. In other embodiments, a parallel interface is used between the camera and the processing device, such as the parallel interface integrated into the Camera Image Signal Processor on the OMAP 3530 processor (Texas Instruments, Dallas, Tex.). In various embodiments, other suitable connections may be used, including wired or wireless connections. The camera 102 can be interfaced with the encoder module 104 using any connection capable of high speed data transfer, including, but not limited to, serial interfaces, such as IEEE 1394 or USB 2.0; parallel interfaces; analog interfaces, such as NTSC or PAL; a wireless interface. In some embodiments, the camera could be integrated onto the same board as the encoder module.

The encoder module 104 implements processing of the image stream using the techniques described herein, including, e.g., implementing encoders perform a conversion from images to codes, mimicking the operation of retinal circuitry The transformations specified by the encoders are applied to the series of input images, producing encoded output. For example, the encoded output may be in the form of values indicative of the firing rates of retinal cells that would have been generated had the images been received by a retina. The output can also be, for example, information indicative of the retinal cells "generator potential", i.e., the output of the linear component of the retinal model (the output of the convolution of the image with the linear filters). The encoded output may be indicative of the pulse train of "spikes" generated by the retinal cells.

In some embodiments, sets of different encoders may be used to better mimic the processing of a normal retina, since there are different types of retinal output cells. Differences may correspond to a particular cell type (e.g, ON cell or OFF cell) or to the cell position on the retina (e.g., ON cell in central retina versus periphery). When the encoder module 104 has more than one encoder, the encoders may operate in parallel, either independently or through at least one or more coupling mechanisms.

Figure 2:
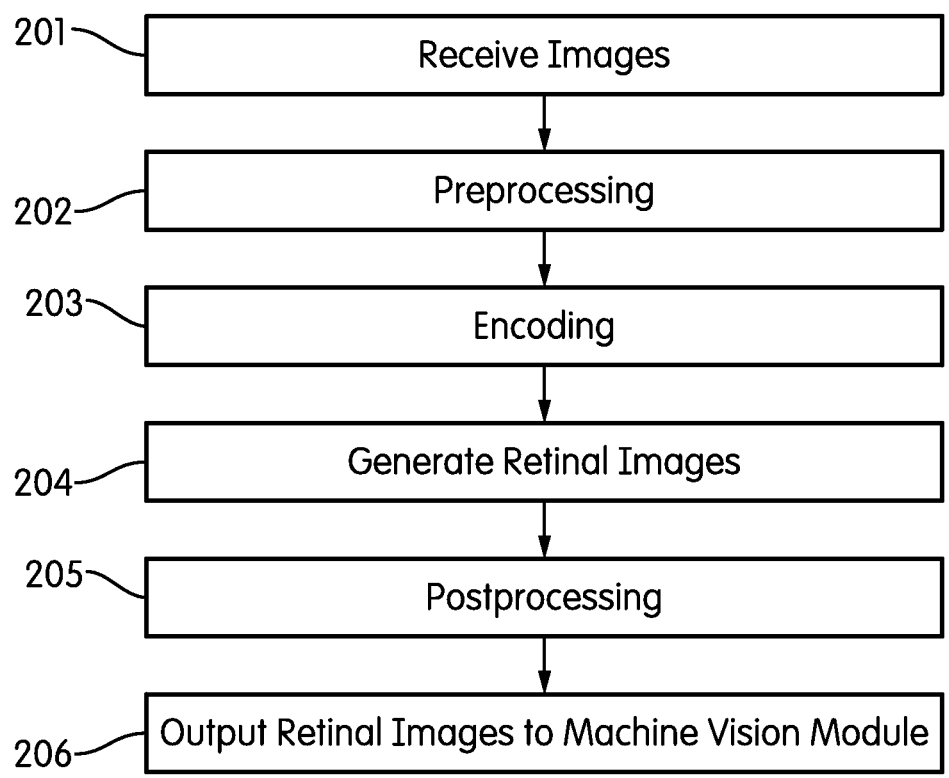
FIG. 2 is a flow chart illustrating the operation of an encoder module.

FIG. 2 is a flow chart illustrating the operation of an exemplary embodiment of the encoder module 104. In step 201, the encoder module 104 receives a series of images from the camera 102 (or some other suitable source). In optional step 202, these raw images undergo pre-processing, e.g., to rescale the contrast/intensity of the images, to apply a noise filter to the images, to crop the images, etc.

In step 203 the raw images are processed to determine information indicative of the retinal cell response to the images. For example, in one embodiment, for various positions in the image field, the encoders process the image stream and output a time dependent value corresponding to the firing rate that would be generated by a retinal cell (or group of cells) if the image stream were to impinge on a retina. In one embodiment, the firing rate output is formatted as follows: for a given time t, the output is a matrix of bits where the element at position (x,y) corresponds to the firing rate of the retinal cell at position (x,y).

Note that in some embodiments, the encoders may generate information indicative of the response of the retinal cell using a metric other than firing rate. For example, the output of the encoders could correspond to the activation state of the cell, the intracellular potential, the generator potential mentioned above, etc.

In step 204, the encoded information from step 203 is used to generate images (referred to herein as "retinal images" or when referring to time-varying images, the "retinal image stream" or the "retinal image data stream") suitable for processing by the machine vision module 106. For example, where the encoded information is output as a matrix of firing rates, as described above, a firing rate retinal image may be generated, where the intensity of each pixel in the "retinal image" is determined by the firing rate value of a corresponding element in the matrix (see FIG. 3 for an example). Any suitable relationship between firing rate and pixel intensity may be used, including a linear relationship, a non-linear relationship, a polynomial relationship, a logarithmic relationship, etc. The conversion between firing rate and pixel intensity may be implement using any suitable technique including the use of a look-up table. In some embodiments, the firing rate may be represented in the retinal image using an image characteristic other than intensity. For example, in embodiment where the retinal images are color images, a color space coordinate of each pixel could correspond to the firing rate.

In optional step 205 the retinal images undergo post-processing. Any suitable processing technique may be used, including, e.g., rescaling, filtering, cropping, smoothing, etc. In step 206, the retinal images are output to the machine vision module 106.

Note that in some embodiments, step 204 and step 205 may be omitted. In this case, the output of the encoder may be sent directly to a machine vision algorithm for processing. As will be apparent to one skilled in the art, in some cases this may require the modification of known machine vision algorithms to accept input data that is not formatted as traditional image data. However, in many embodiments, this can be accomplished in a straightforward fashion, without the need for modification of the core concepts of the particular algorithm.

In some embodiments, each encoder performs a preprocessing step, followed by a spatiotemporal transformation step. The preprocessing step is a rescaling step, which may be performed in a preprocessor module of the processing device, that maps the real world image, I, into quantities, X, that are in the operating range of the spatiotemporal transformation. Note that I and X are time-varying quantities, that is, I(j,t) represents the intensity of the real image at each location j and time t, and X(j,t) represents the corresponding output of the preprocessing step. The preprocessing step may map as follows: I(j,t) is mapped to X(j,t) by X(j,t)=a+bI(j,t), where a and b are constants chosen to map the range of real world image intensities into the operating range of the spatiotemporal transformation.

The rescaling can also be done using a variable history to determine the quantities a and b, and a switch can be used to set the values of these quantities under different conditions (e.g., different lighting or different contrast).

For grayscale images, both I(j,t) and X(j,t) have one value for each location j and time t.

For color images, the same strategy is used, but it is applied separately to each color channel, red, green, and blue. In one embodiment, the intensity I(j,t) has three values ($I_1$, $I_2$, $I_3$) for each location j and time t, where the three values $I_1$, $I_2$, $I_3$ represent the red, green, and blue intensities, respectively. Each intensity value is then rescaled into its corresponding X value ($X_1$, $X_2$, $X_3$) by the above transformation.

In one embodiment, the spatiotemporal transformation step is carried out using a linear-nonlinear cascade (reviewed in Chichilnisky E J 2001; Simoncelli et al 2004), where the firing rate, $\lambda_m$, for each ganglion cell, m, is given by $$\lambda_m(t;X) = N_m((X*L_m)(j,t)) \quad (1)$$

where * denotes spatiotemporal convolution, $L_m$ is a linear filter corresponding to the mth cell's spatiotemporal kernel, and $N_m$ is a function that describes the mth cell's nonlinearity, and, as in the previous section X is the output of the preprocessing step, j is the pixel location, and t is time. The firing rates, $\lambda_m$, may then be used to generate a firing rate retinal image as discussed above.

$L_m$ is parameterized as a product of a spatial function and a temporal function. For example, in one embodiment, the spatial function consists of a weight at each pixel on a grid (e.g., the digitized image in a camera), but other alternatives, such as a sum of orthogonal basis functions on the grid, can be used. In one embodiment, the grid consists of a 10 by 10 array of pixels, subserving a total of 26 by 26 degrees of visual space (where each pixel is 2.6 by 2.6 degrees in visual space), but other alternatives can be used. For example, because the area of visual space that corresponds to a retinal ganglion cell varies with spatial position on the retina and from species to species, the total array size can vary (e.g., from at or around from 0.1 by 0.1 degree to 30 by 30 degrees, which corresponds to at or around 0.01 by 0.01 degree to 3 by 3 degrees in visual space for each pixel in a 10 by 10 array of pixels.) It is appreciated that the angle ranges and size of the pixel array are only provided for illustration of one particular embodiment and that other ranges of degrees or size of pixel arrays are encompassed by the present invention. For any chosen array size, the number of pixels in the array can also vary, depending on the shape of the area in visual space that the cell represents (e.g., an array of at or around from 1 by 1 to 25 by 25 pixels). Similarly, the temporal function consists of a sum of weights at several time bins and raised cosine functions in logarithmic time at other time bins (Nirenberg et al. 2010; Pillow J W et al. 2008). Other alternatives, such as a sum of orthogonal basis functions, can also be used.

In this embodiment, the time samples span 18 time bins, 67 ms each, for a total duration of 1.2 sec, but other alternatives can be used. For example, because different ganglion cells have different temporal properties, the duration spanned by the bins and the number of bins needed to represent the cell's dynamics can vary (e.g., a duration at or around from 0.5 to 2.0 sec and a number of bins at or around from 5 to 20). Temporal properties can also vary across species, but this variation will be encompassed by the above range.

Eq. 1 can also be modified to include terms that modify the encoder's output depending on its past history (i.e., the spike train already produced by cell m), and on the past history of the output of other ganglion cells (Nirenberg et al. 2010; Pillow J W et al. 2008).

In another embodiment, the linear filter $L_m$ is parameterized as the sum of Q terms, where each of the terms is the product of a spatial function and a temporal function.

$$L_m = \sum_k^Q S_k \otimes T_k$$

where $\otimes$ denotes the outer product, and $S_k$ and $T_k$ are the kth spatial and temporal functions, respectively (k ranges from 1 to Q).

In this embodiment, individual spatial functions may be parameterized as described earlier, for example, as weights at each pixel on a grid, or as the sum of orthogonal basis functions on the grid. Individual temporal functions may also be parameterized as before, for example, as the sum of weights at several time bins and raised cosine functions in logarithmic time at other time bins. Other alternatives, such as a sum of orthogonal basis functions, can also be used.

In one embodiment, Q is 2, and $L_m$ may be written as $$L_m = S_1 \otimes T_1 + S_2 \otimes T_2$$

where $\otimes$ denotes the outer product, and $S_1$ and $T_1$ are the first pair of spatial and temporal functions, and $S_2$ and $T_2$ are the second pair of spatial and temporal functions.

For both sets of parameters for L (spatial and temporal), the choice of resolution (pixel size, bin size) and span (number of pixels, number of time bins) may determined by two factors: the need to obtain a reasonably close proxy for the retina's code, and the need to keep the number of parameters small enough so that they can be determined by a practical optimization procedure (e.g., as detailed in the Prosthesis Applications). For example, if the number of parameters is too small or the resolution is too low, then the proxy will not be sufficiently accurate. If the number of parameters is too large, then the optimization procedure will suffer from overfitting, and the resulting transformation (Eq. 1) will not generalize. The use of a suitable set of basis functions is a strategy to reduce the number of parameters and hence avoids overfitting, i.e., a "dimensionality reduction" strategy. For example, the temporal function (that covers 18 time bins, 67 ms each) may be parameterized by a sum of 10 weights and basis functions; see section "Example 1, Method of building the encoder" of the Prosthesis Application and (Nirenberg et al., 2010; Pillow J W et al. 2008)

The nonlinearities $N_m$ are parameterized as cubic splines, but other parameterizations can be used, such as, piecewise linear functions, higher-order splines, Taylor series and quotients of Taylor series. In one embodiment, the nonlinearities $N_m$ are parameterized as cubic spline functions with 7 knots. The number of knots is chosen so that the shape of the nonlinearity is accurately captured, while overfitting is avoided (see above discussion of overfitting). At least two knots are required to control the endpoints, and thus the number of knots can range from about 2 to at least about 12. Knots are spaced to cover the range of values given by the linear filter output of the models.

For the spatiotemporal transformation step, in addition to the linear-nonlinear (LN) cascade described above, alternative mappings are also within the scope of the present invention. Alternative mappings include, but are not limited to, artificial neural networks and other filter combinations, such as linear-nonlinear-linear (LNL) cascades. Additionally, the spatiotemporal transformation can incorporate feedback from the spike generator stage (see below) to provide history-dependence and include correlations among the neurons as in (Pillow J W et al. 2008; Nichols et al, 2010). For example, this can be implemented by convolving additional filter functions with the output of the spike generator and adding the results of these convolutions to the argument of the nonlinearity in Eq. 1.

Other models may also be used for the spatiotemporal transformation step. Non-limiting examples of the models include the model described in Pillow J W et al. 2008, dynamic gain controls, neural networks, models expressed as solutions of systems of integral, differential, and ordinary algebraic equations approximated in discrete time steps, whose form and coefficients are determined by experimental data, models expressed as the result of a sequence of steps consisting of linear projections (convolution of the input with a spatiotemporal kernel), and nonlinear distortions (transformations of the resulting scalar signal by a parameterized nonlinear function, whose form and coefficients are determined by experimental data, models in which the spatiotemporal kernel is a sum of a small number of terms, each of which is a product of a function of the spatial variables and a function of the spatial variables and a function of the temporal variables, determined by experimental data, models in which these spatial and/or temporal functions are expressed as a linear combination of a set of basic functions, with the size of the set of basis function smaller than the number of spatial or temporal samples, with the weights determined by experimental data, models in which the nonlinear functions are composed of one or segments, each of which is a polynomial, whose cut points and/or coefficients are determined by experimental data, and models that combine the outputs of the above models, possibly recursively, via computational steps such as addition, subtraction, multiplication, division, roots, powers, and transcendental functions (e.g., exponentiation, sines, and cosines).

As described in the Prosthesis Applications, encoders of the type descried above can very closely mimic the input/output function of real retinal cells. As detailed therein, in some cases this may be characterized by determining a standard Pearson correlation coefficient between a reconstructed retinal image's values at each pixel, and that of the corresponding raw image. Thus, a correlation coefficient of 1 indicates that all of the original image's information was perfectly retained, while a correlation coefficient of 0 indicates that the resemblance of the reconstruction to the real image was no greater than chance.

For example, in some embodiments, the encoder is configured such that the Pearson's correlation coefficient between a test input stimulus and a corresponding stimulus reconstructed from the encoded data that would be generated by the encoder in response to the test input stimulus is at least about 0.35, 0.65, at least about 0.95, or more, e.g., in the range of 0.35-1.0 or any subrange thereof. In some embodiment, the test input stimulus includes a series of natural scenes (e.g. spatiotemporally changing scenes).

In some embodiments, the retinal encoders of the type described herein mimic the input/output function of real retinal cells for a wide range of inputs, e.g., spatio-temporally varying natural scenes. In typical embodiments, this performance is substantially better that conventional encoders.

FIGS. 18A-F illustrates the performance of retinal encoder models for various cells (cells 1-6, respectively) when tested with movies of natural scenes, including landscapes, people walking, etc. In each figure, the performance of a conventional linear-nonlinear (LN) model is shown on the left, and the performance of the linear-nonlinear (LN) model of the type described in this application is shown on the right. Performance is shown via raster plots and peristimulus time histograms (PSTHs). The conventional (LN) model was developed based only on the experimental response of retinal cells to a white noise stimulus. In contrast, the linear-nonlinear (LN) models of the type described in this application are developed based on recorded cell responses to both white noise and natural scene stimuli.

For the examples shown, the input test stimulus for both types of models is a movie of natural scenes, taken in Central Park in New York City. As shown, the standard LN model is not highly effective on natural scene stimuli: that is, this model, which is built using white noise stimuli, does not produce spike patterns that closely match those of the real cell. In contrast, the LN model described in this application, which is built using white noise and natural scene stimuli, is highly effective. The spike patterns it produces closely match those of the real cell. (Note that the natural scene movie used to test the models is different from that used to train the models, as is required for validating any model. Note also that in each figure, the same real cell is used as the basis for both types of models. Finally, note that performance of the encoder models of the type described herein has been demonstrated with a host of other stimuli, including movies, of faces, people walking, children playing, landscapes, trees, small animals, etc., as shown in the Prosthetic Application, and in Nirenberg, et al. Retinal prosthetic strategy with the capacity to restore normal vision, PNAS 2012 and the accompanying Supplementary Information section available at www.pnas.org/lookup/suppl/doi: 10.1073/pnas.1207035109/-/DCSupplemental).

The same conclusions about performance can be drawn from the PSTHs. The light gray trace shows the average firing rate of the real cell; the dark grey trace shows the average firing rate of the model cell. The standard LN model misses many features of the firing rate; each of the different FIGS. 18A-18F, show examples of the different features missed by the standard model. The model described in this application, though, captures the features of the firing rates reliably and does so for an array of different cells (many other examples are shown in the Prosthetic Application).

Figure 3A:
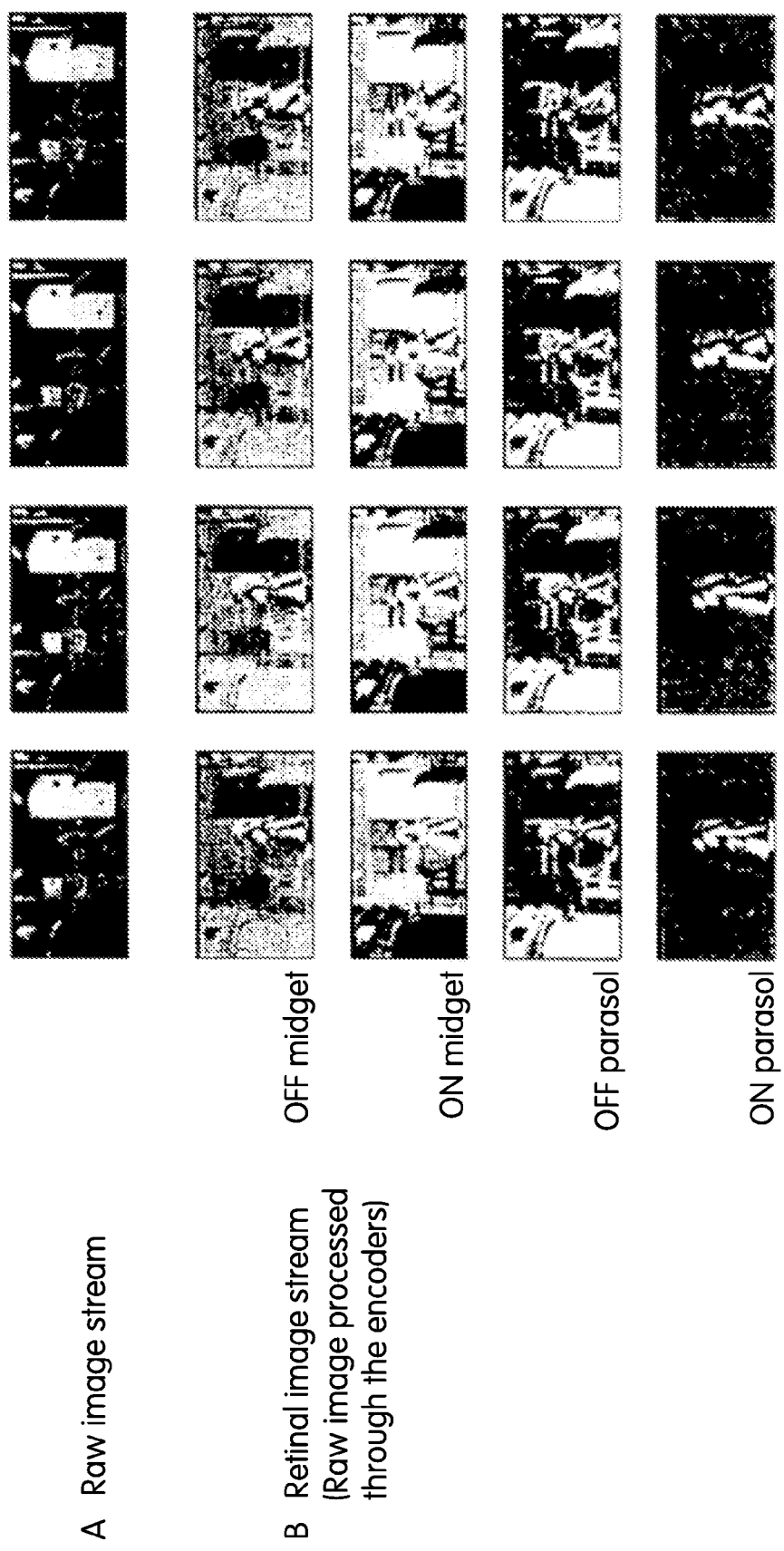
FIG. 3A illustrates the conversion of a raw image stream (a person walking through a complex environment) into a retinal image stream. Panel A shows several frames from the raw image stream, which was acquired by a camera. Panel B shows several frames from the corresponding retinal image stream. Four different retinal image streams are shown, each using a different array of cells (OFF midget cells, ON midget cells, OFF parasol cells, and ON parasol cells, as indicated on figure).
Figure 3B:
FIGS. 3B-3F show enlarged views of the raw image (FIG. 3B) and retinal images FIGS. 3C-3F corresponding to the last column of FIG. 3A.
Figure 3C:
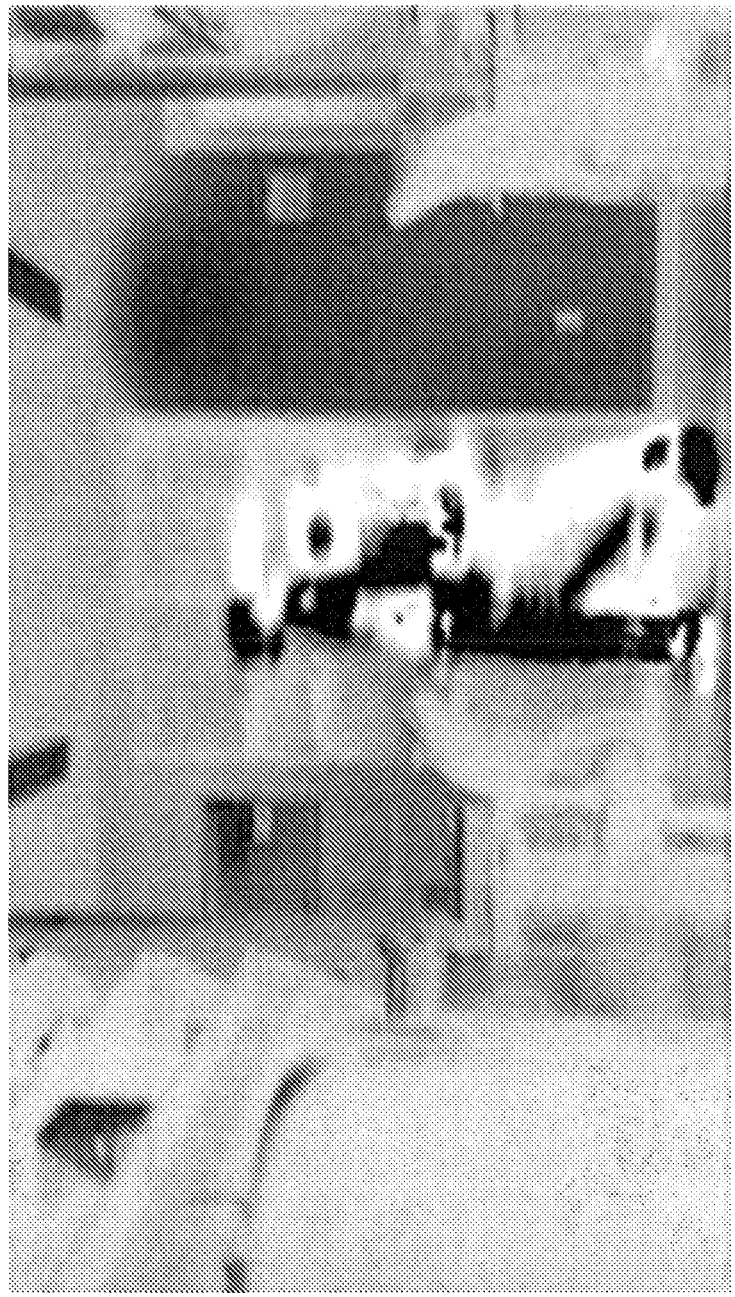
Figure 3D:
Figure 3E:
Figure 3F:

FIG. 3A illustrates the conversion of a raw image into a retinal image. Panel A shows several frames of the raw image stream acquired by camera 102. As shown, the raw image stream includes a person walking through a complex environment. Panel B shows the corresponding retinal image frames, where the retinal image pixel intensities correspond to firing rates generated by the encoders of the encoder module 104. Four different retinal image streams are shown, each using a different array of cells (OFF midget cells, ON midget cells, OFF parasol cells, and ON parasol cells, as indicated on figure). Note that, the retinal image frames shown are produced by the encoder module 104 after a brief time delay, corresponding processing delay time in a natural retina (as show, approximately 80 ms).

Note that it is apparent that the total amount of information contained in the retinal images is less than that of the raw images. This reduction in information can advantageously reduce the processing load on the machine vision. Moreover, because the encoders mimic the behavior of the retina, for some machine vision applications, the information retained in the retinal images will include the salient features required for the machine vision task at hand, allowing for efficient and effective operation of the machine vision module 106.

FIGS. 3B-3F show enlarged views of the raw image (FIG. 3B) and retinal images (FIGS. 3C-3F) corresponding to the last column of FIG. 3A. In the raw image, a human figure is moving from right to left within a relatively static, but complex, environment. Note that in all of retinal images (FIGS. 3C-3F), the static environment has been de-emphasized to vary degrees, while the moving human form has been emphasized. Moreover, in both images, a "motion shadow" type effect is apparent trailing the human figure that provides an indication of the direction of motion. Accordingly, although the overall amount of information contained in the image has been reduced, that which remains emphasizes features important features, i.e., the moving human form.

Note that none of these effects are the result of any intentionally designed programming. That is, the encoder was not intentionally programmed to identify moving features. Instead the emphasis of these features is a result of the fact that the encoder mimics the natural processing that occurs in the retina. Although certain kinds of emphasized features are apparent in the present example (a human form moving against a static background), it is to be understood that for other types of input images the retina may emphasize other types of features. The key concept is that, in general, the features emphasized for any given set of images will be those determined to be salient based on millions of years of evolution of the retina. Accordingly, as described in detail below, the retinal images will be particularly advantageous when used in machine vision applications where it is known that biological vision systems perform well (e.g., certain types of pattern recognition tasks such as facial recognition, identification of human or other living forms against a complicated background, navigation through a complicated environment, rapid tracking of and reaction to moving objects, etc.).

In some embodiments, the encoders encode the image data on about the same time scale as the encoding carried out by the normal or near-normal retina. In various embodiments, the encoder operates with an acceptable processing lag time. As used herein, processing lag time refers to the amount of time between the occurrence of an event in the visual stimuli received by the camera 102, and the delivery of corresponding output code (e.g., the corresponding retinal images) to the machine vision module 106. In some embodiments, encoding module has a lag time of less than about 50 ms, less than about 20 ms, less than about 10 ms, less than about 5 ms, etc., e.g., in the range of 5-50 ms or any subrange thereof.

Referring back to FIG. 1, the machine vision module 106 receives the retinal images from the encoder module 104 and process the image using any suitable machine vision technique. Although a number of such techniques are mentioned herein, it is to be understood that these examples are not limiting, and other techniques may be used. For example, in various embodiments, one or more of the techniques described in D. A. Forsyth, J. Ponce Computer Vision: A Modern Approach, Second edition Prentice Hall, 2011 and/or D. H. Ballard, C. M. Brown; Computer Vision, Prentice-Hall Inc New Jersey, 1982, R. Szeliski, Computer Vision: Algorithms and Applications, Springer 2010; and E. R. Davies, Computer and Machine Vision, Fourth Edition: Theory, Algorithms, Practicalities, Elsevier 2012, may be used.

In various embodiments, the machine vision module 106 may implement one or more available computer vision algorithms or software tools, e.g., any of those included in the OpenCV software package or the Gandalf computer vision software package.

The machine vision module 106 may use the retinal images to perform any suitable task including recognition tasks (e.g., object recognition, image classification, facial recognition, optical character recognition, content-based image retrieval, pose estimation, etc.), motion analysis tasks (e.g., egomotion determination, movement tracking, optical flow determination, etc.), modeling tasks (e.g., scene reconstruction, 3D volume recognition, etc.).

In some embodiments, the machine vision module 106 may divide the visual field into domains, which may be equally or unequally sized. The domains may or may not overlap. The domains may cover a band of the visual field (for instance the entire field of view on a horizontal axis and a limited span on a vertical axis) or may cover the entire field of view.

In some embodiments, the machine vision module 106 may apply boundary edge detection techniques to the retinal images, including, e.g., first order edge detection techniques such as Canny edge detection, second order edge detection techniques, or phase congruency based edge detection techniques. Edge detection may involve the application of one or more transformations to the retinal images, e.g., the Hough transformation.

In some embodiments, the machine vision module 106 may calculate an optical flow based on the stream of retinal images. An optical flow may be indicative of a pattern of apparent motion of objects, surfaces, and edges in a visual scene caused by the relative motion between an observer (an eye or a camera) and the scene. The optical flow may be used for any number of applications including motion detection, object segmentation, time-to-collision and focus of expansion calculations, etc. Method for calculating optical flow may include, phase correlation methods, block-based methods, differential methods (such as the Lucas-Kanade, Horn-Schunck, Buxton-Buxton, and Black-Jepson methods), variational methods, discrete optimization methods, etc.

In some embodiments, the machine vision module 106 may apply one or more image segmentation techniques to segment the retinal images (e.g., to identify areas of interest). Exemplary segmentation techniques include thresholding, clustering methods, compression-based methods, histogram-based methods, edge detection (e.g., using the edge detection techniques described above), region growing methods split-and-merge methods, partial differential equation based methods (e.g., level set methods), graph partitioning methods, watershed transformation based methods, model based segmentation methods, multi-scale segmentation, semi-automatic segmentation, neural network based segmentation, etc.

In various embodiments, the machine vision module 106 may be trained using any computer learning technique known in the art. Computer learning techniques include supervised learning (e.g., including statistical classification techniques), unsupervised learning, reinforcement learning, etc. In some embodiments, machine vision module 106 may include one or more artificial neural networks which may be trained to perform various tasks.

Figure 4:
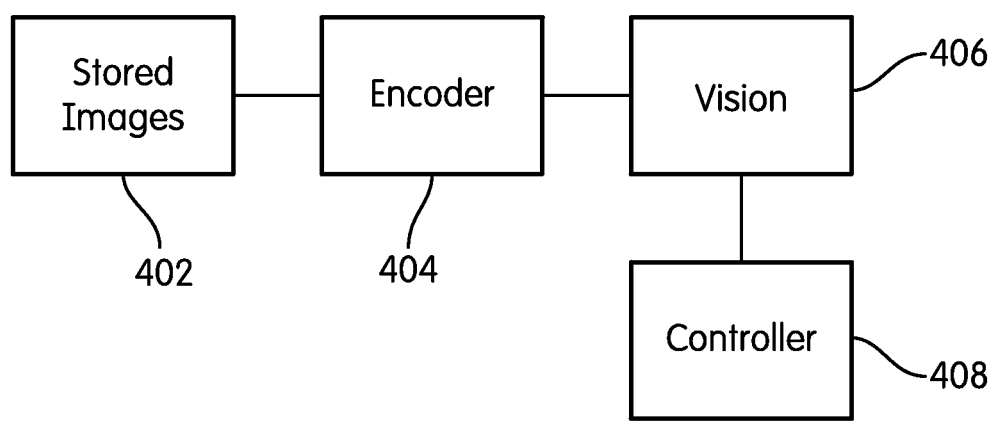
FIG. 4 is a block diagram showing a training system for training the machine vision module of the machine vision system of FIG. 1.

FIG. 4 illustrates an exemplary training system 400 for training the machine vision module 106 of the machine vision system 100. The training system includes a source 402 of raw training images (e.g., a database of stored images), and encoder module 404 that generates retinal images based on the raw training images using the techniques described herein, the machine vision module 108 that receives the retinal images from the encoder, and a controller 406 that monitors and modifies the operation of the machine vision module based on the monitored performance.

Figure 5:
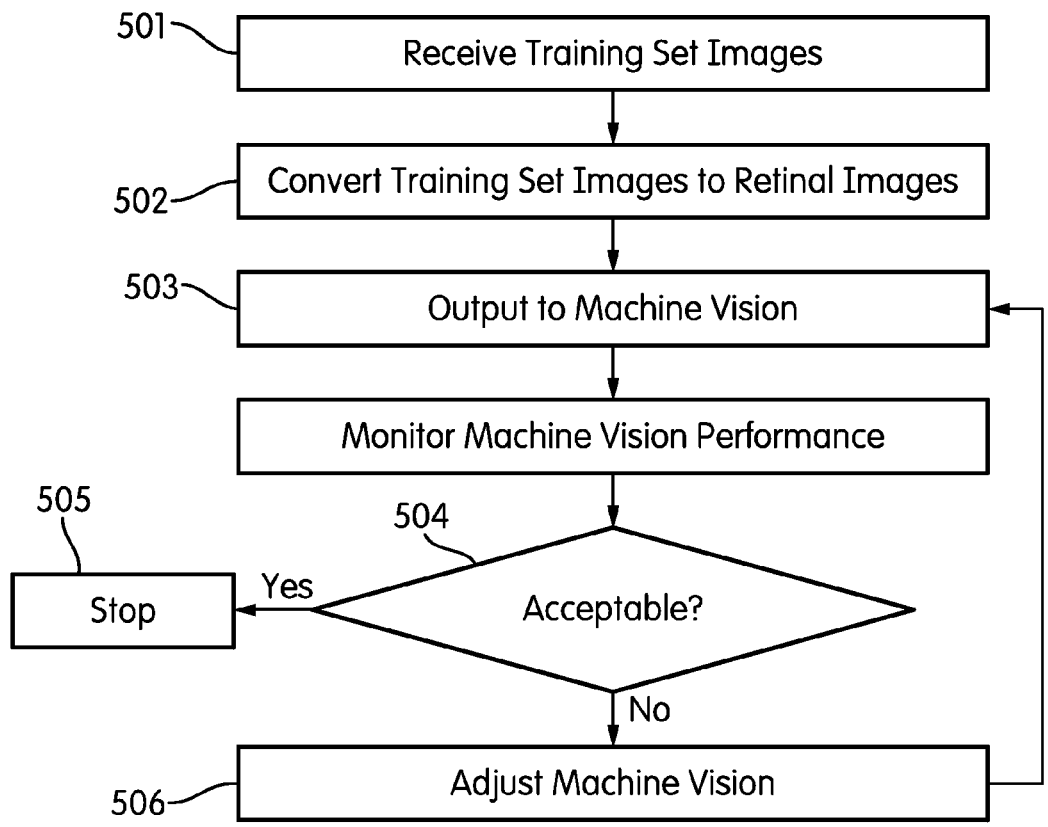
FIG. 5 is a flowchart illustrating the operation of the training system of FIG. 4.

FIG. 5 is a flowchart illustrating the operation of the training system 400. In step 501, the encoder 404 receives the training images from the source 402. For example, the training images may be a series of medical images of tumors, where a first portion of the images are know to correspond to malignant tumors, while a second portion of the training images correspond to benign tumors.

In step 502, the encoder converts the raw training images into retinal images. In step 503, the retinal images are output to the machine vision module 106.

In step 504, the controller 406 monitors the performance of the machine vision module 106 as it processes the retinal images to perform a task. In the case of the medical images, the machine vision module 106 may apply an image recognition technique differentiate the images of malignant tumors from images of benign tumors. The controller monitors the performance of the machine vision module 106 as it performs this task (e.g., calculating the error rate in discriminating malignant tumors). If the performance is acceptable, the process ends in step 505. If the performance is unacceptable (e.g., if the error rate is above a threshold level), in step 506 the controller 406 adjusts the machine vision module 106 (e.g., by modifying one or more parameter, by changing the connections in an artificial neural network, etc.), and the process returns to step 503. Accordingly, the controller 406 iteratively adjusts the machine vision module 106 until its performance reaches an acceptable level (e.g., the error rate is below the threshold level).

Note that in various embodiments, other suitable types of training may be used. For example, in addition or alternative to comparing the performance to a fixed threshold, the training may instead implement a convergence criteria (e.g., where iterative training continues until the incremental increase in performance per iteration falls below a threshold level).

In various embodiments, the machine vision module 106 may include any suitable control techniques, including the use of complicated artificial intelligence based systems. However, for a number of applications, machine vision module 106 may implement a relatively simple control scheme. In some such embodiments, the machine vision 106 controls the some or all of the operation of one or more systems (e.g., the movement trajectory of a robot) based on a relatively simple moment to moment classification of the retinal images received from the encoder module. That is, the control does not depend on complicated planning, but only on temporally localized classifications. Advantageously, learning algorithms know in the art are known to be amenable to the performance of these types of relatively simple classification tasks.

Figure 6:
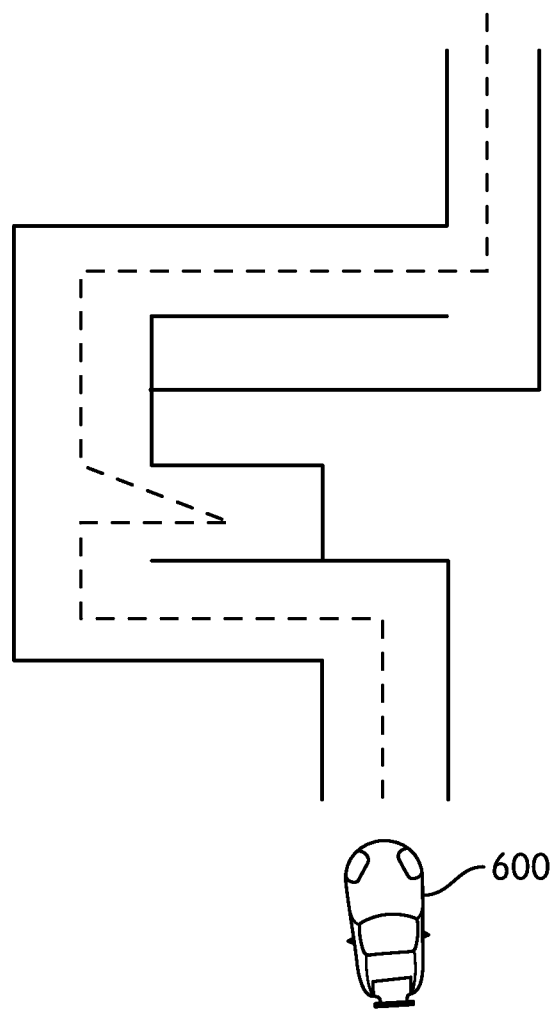
FIG. 6 illustrates a machine vision system used to control the navigation of a robot through a maze. The path traveled by the robot is indicated with a dashed line.

For example, referring to FIG. 6, in one embodiment, the machine vision system 100 is used to control a robot 600 to navigate through an environment featuring obstacles, e.g., a maze, as shown. The camera 102 of the machine vision system is mounted on the robot 600, and has a field of view that captures the scene in front of the robot.

A video stream from the camera 102 is processed by the encoder module 104 to generate a stream of retinal images. In one case, the encoder module may mimic the performance of mouse retinal ganglion cells (e.g., using a encoder characterized by the encoder parameters set forth in the subsection the Prosthesis Applications entitled "Example set of encoder parameters for a mouse ganglion cell"). In another case, the encoder module may mimic the performance of monkey retinal ganglion cells (e.g., using a encoder characterized by the encoder parameters set forth in the subsection of the Prosthesis Applications entitled "Example set of encoder parameters for a monkey ganglion cell").

The stream of retinal images is processed, e.g., using optical flow techniques, to determine the speed of motion at various locations in the images. In general, locations or domains in the image with slower speeds will correspond to objects that are distant from the robot 600, while locations with faster speed will correspond to objects that are close to the robot. To avoid running into obstacles, the machine vision module 106 controls the robot to move in a direction corresponding to the slower moving locations in the image.

For example, in one embodiment (shown in FIG. 7), the visual field (i.e., the retinal image data stream) is divided into N=7 equally-sized regions by an image segmentation step, 702. In this embodiment, the regions do not overlap, and they divide up the camera's horizontal field of view (which is 40°) from left to right, so that each region spans 5.7° horizontally; in the vertical direction, they are limited to the bottom half of the navigator's field of view (which is 27°), so that these regions span 13.5° vertically.) At regular intervals (e.g., every 2 seconds), two consecutive retinal images from the retinal image sequence are taken and sent to the machine vision module 106 for classification. Since each retinal image has been divided into N regions, the machine vision module receives N pairs of regions. Each pair is passed through a convolutional neural network (CNN) 704, which classifies the optical flow speed in that region. The output of this classification may be a speed label $L_i$ for each region i, where $L_i$ is a number between 1 and M, 1 representing a very slow average speed in the region, and M representing a very fast average speed. For example, M can be 8, so that there are 8 different speed classes.

The result is an array of N classifications 706; based on these, a turn decision is made by a turn decision module 708. The "target region" (the region to head towards) is chosen to be the region with the slowest speed classification, that is, the smallest number L. If there are multiple regions that are tied for having the slowest speed classification, the turn decision module 708 may select the region that is closest to center (so as to minimize the amount of turning) or some other region based on the desired use of the system. Once a target region is chosen, the machine vision module 106 (specifically, the turn decision module 708 in machine vision module 106) initiates a turn so that the navigator comes to face the center of the target region.

The example above refers to navigation of a robot. It is to be understood that in various embodiments, the techniques above may be used for other types of navigation, including navigation through a virtual world, as described in the example below.

For example, the machine vision module 106 may identify and avoid obstacles by dividing the image field of the retinal image stream into several regions or domains, and classifying the regions, into speed categories, and controlling the robot 600 to move in the direction corresponding to the image region in the lowest speed category. The machine vision module 106 may be trained to perform this classification task using a relatively simple training algorithm, such as the CNN described above and in the example below or a boosting algorithm (e.g., the AdaBoost algorithm, see Yoav Freund, Robert E. Schapire. "A Decision-Theoretic Generalization of on-Line Learning and an Application to Boosting", 1995).

In general, the devices and techniques may be used for any suitable application including, medical image processing (e.g., automated or computer aided medical diagnosis), robotic control or navigation, industrial process monitoring and control, automated sorting applications, motion tracking based interfaces (e.g., as used with computer gaming systems), etc. The devices and techniques described herein may operate in real time or near real time, e.g., allowing for practical automation of the applications mentioned above.

Example

Virtual World Navigation

In one example assessing the effectiveness of one approach to machine vision, a navigation task was used, as this is particularly challenging (requiring processing in both space and time). This approach applied aspects of several learning algorithms commonly used for navigation, e.g., as described in LeCun, Y. et al. (2010) Convolutional Networks and Applications in Vision. Proc. International Symposium on Circuits and Systems (ISCAS'10), pp. 253-256. IEEE; Szarvas, M. et al. (2005) Pedestrian detection with convolutional neural networks. Proc. Intelligent Vehicles Symposium, pp. 224-229. IEEE; Jackel, L. D. et al. (2006) The DARPA LAGR program: Goals, challenges, methodology, and phase I results. Journal of Field Robotics, 23, 945-973, each incorporated herein in its entirety by reference. Using these techniques a navigator was constructed that learns its environment using a Convolutional Neural Network (CNN)—a learning algorithm. The CNN was constructed using an open-source numerical processing and automatic differentiation package called Theano.

The navigator was designed to learn the speed of things in its training environment. The navigator was given a training environment, and was used it to divide the training environment at each moment in time into n domains. The navigator then learns the speeds in the domains. The speeds provide useful information for navigating. If something is moving very quickly, it means it's very close to the virtual object navigating the environment (it's moving rapidly across your retina). If it is close, the virtual object is likely going to hit it. So the navigator assesses the domains in the environment and then moves toward the domain with the slowest speed (the one with the slowest speed is the furthest away and the safest). In this example, the navigator is not directed to head to a particular end point, but to move forward and not collide with anything.

Figure 7:
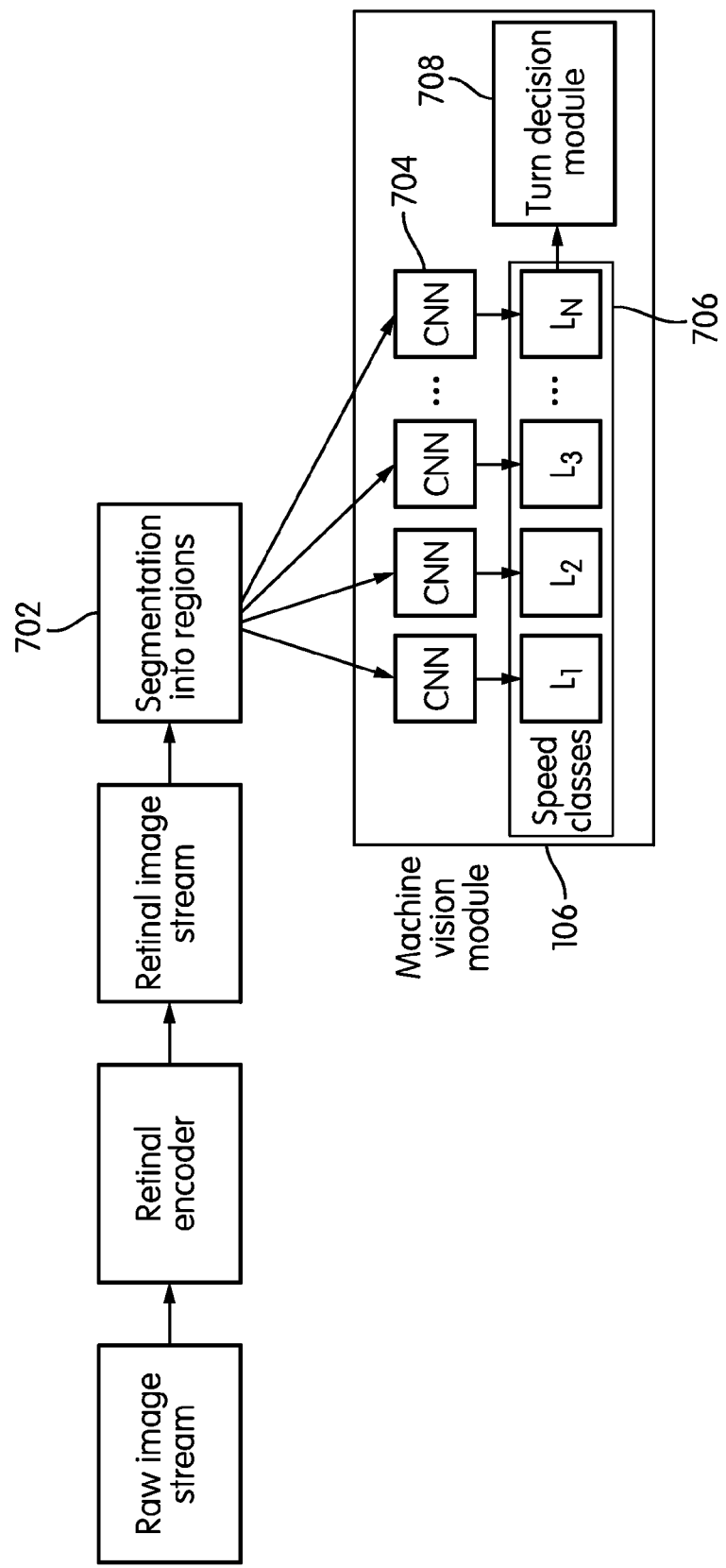
FIG. 7 is a flow chart for one embodiment of a machine vision system used to control a navigation task.

More specifically in this example, using the method show in FIG. 7, as the navigator traverses an environment, its visual field is divided into 7 equally-sized regions by an image segmentation step, 702. In this embodiment, the regions do not overlap, and they divide up the camera's horizontal field of view (which is 40°) from left to right, so that each region spans 5.7° horizontally; in the vertical direction, they are limited to the bottom half of the navigator's field of view (which is 27°), so that these regions span 13.5° vertically.).

At each decision time point, an algorithm based on convolutional neural networks (CNNs) classifies the optical flow speeds in each of the domains (step 704). The output of this classification is a speed label $L_i$ for each domain i (step 706), where $L_i$ is a number between 1 and 8, 1 representing a very slow average speed in the domain, and 8 representing a very fast average speed.

As described earlier, based on these classifications, one for each of the 7 domains, a navigation decision is made by the turn decision module (708). The "target domain" (the domain to head towards) is chosen to be the domain with the slowest speed classification. If there are multiple domains that are tied for having the slowest speed classification, the navigator selects the one that is closest to center (so as to minimize the amount of turning); if there is still a tie, the navigator breaks it by choosing the domain to the left. Once a target region is chosen, the machine vision module (106) initiates a turn so that the navigator comes to face the center of the chosen region.

Figure 8:
FIG. 8 shows frames from the raw image streams (movies) used to train the navigator. These image streams were generated in a virtual environment using a rural environment as indicated in the main text. The top panel shows the first 5 frames in the image stream. The bottom panel shows selected frames from the rest of the image stream; one of every 30 frames (that is, one frame per second) is shown.
Figure 8:
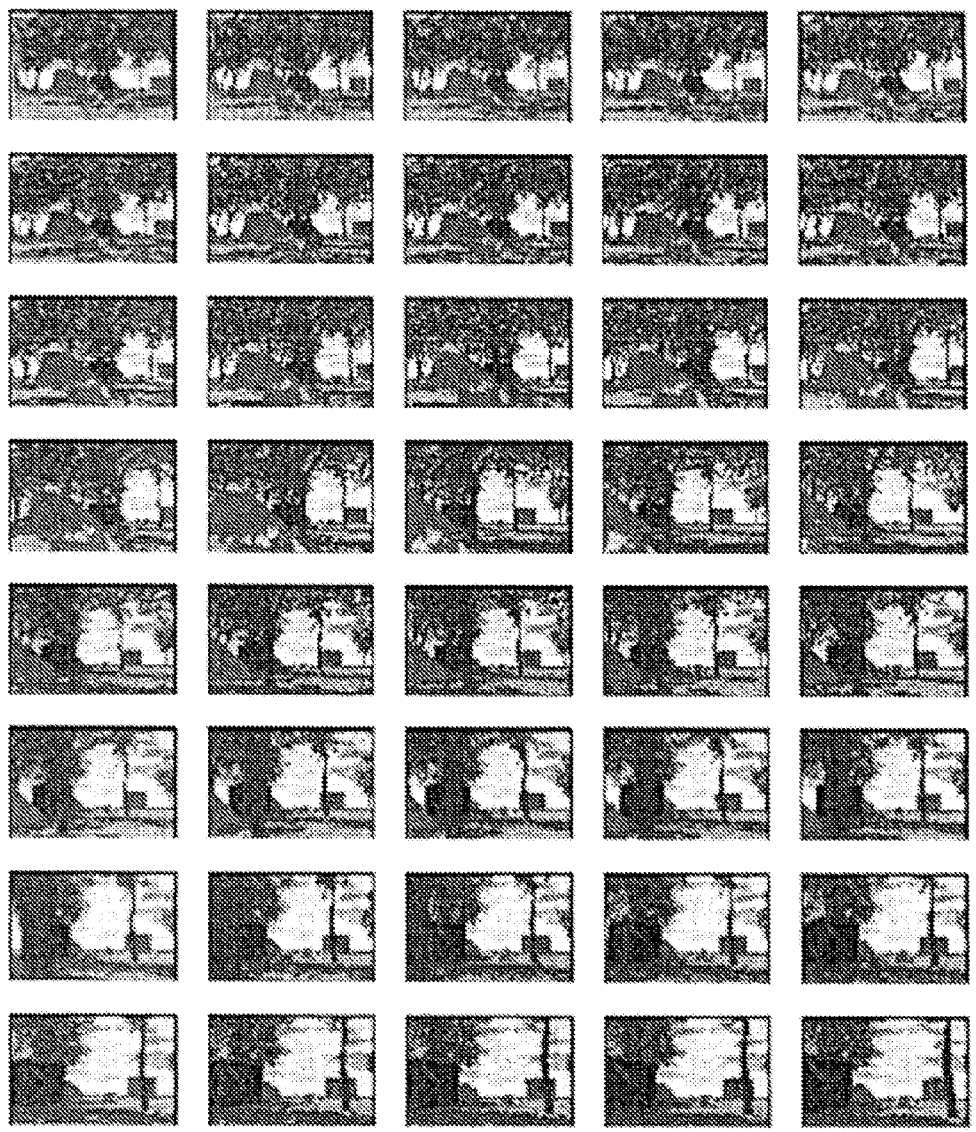
Figure 9A:
FIG. 9 shows frames from the raw image streams (movies) used to test the navigator. Three sets are shown: A, frames from a rural environment (one different from that used to train the navigator); B, a suburban environment; and C, a playground environment (a tire obstacle course). As in FIG. 9, the image streams were generated in a virtual environment, the top panel of each set shows the first four frames, and the bottom panel shows selected frames from the rest of the movies (in this case, one of every 15 frames (that is, one frame every half-second).
Figure 9A:
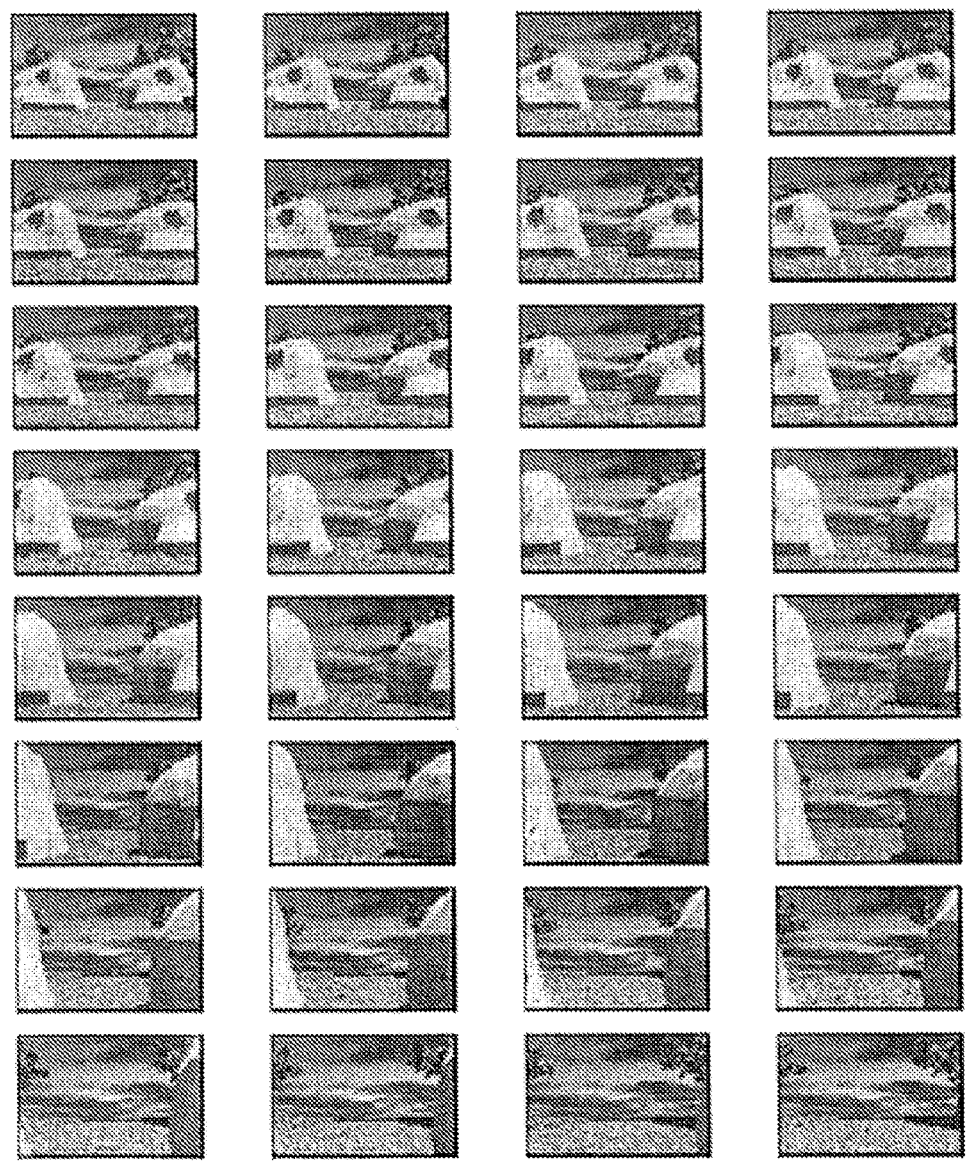
Figure 9B:
Figure 9B:
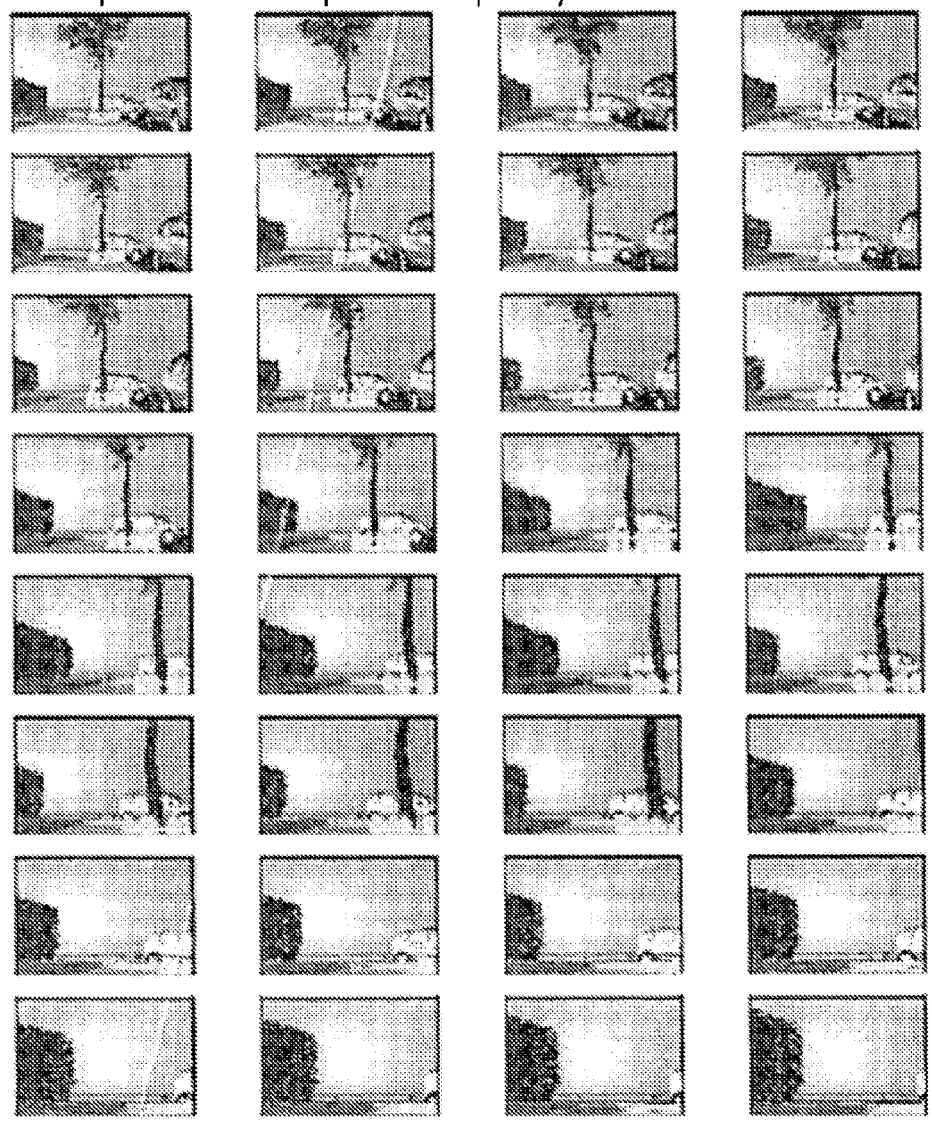
Figure 9C:
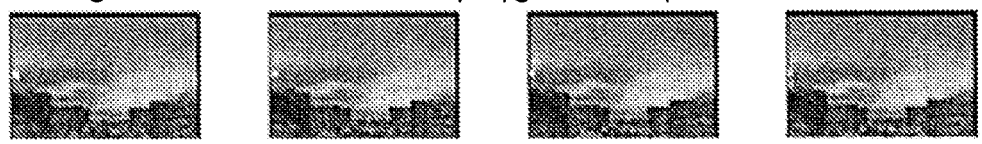
Figure 9C:

Virtual environments were created for training and testing using an open-source 3D rendering framework called Panda3D. Streams of frames from the training set are shown in FIG. 8; streams of frames from the three testing sets are shown in FIG. 9A, B, C. As shown, the training set was a rural environment. The three testing sets were as follows: a rural environment that is different from the one used in the training set, a suburban environment, and a playground.

The performance of the navigator was compared under two conditions: 1) when it was trained the standard way, i.e., using the raw image stream as the input, and 2) when it was trained using the "retinal image stream" as the input—that is, when it used images that were processed through our encoder. In this case, the encoder used was generated using monkey midget and parasol cells as per the methods described in Nirenberg, S. and Pandarinath, C. (2012) A retinal prosthetic with the capacity to restore normal vision. Proc. Natl. Acad., in press; and Nirenberg, S. et al. (2011) Retina prosthesis and the Prosthesis Applications; each incorporated herein in its entirety by reference.

Figure 10:
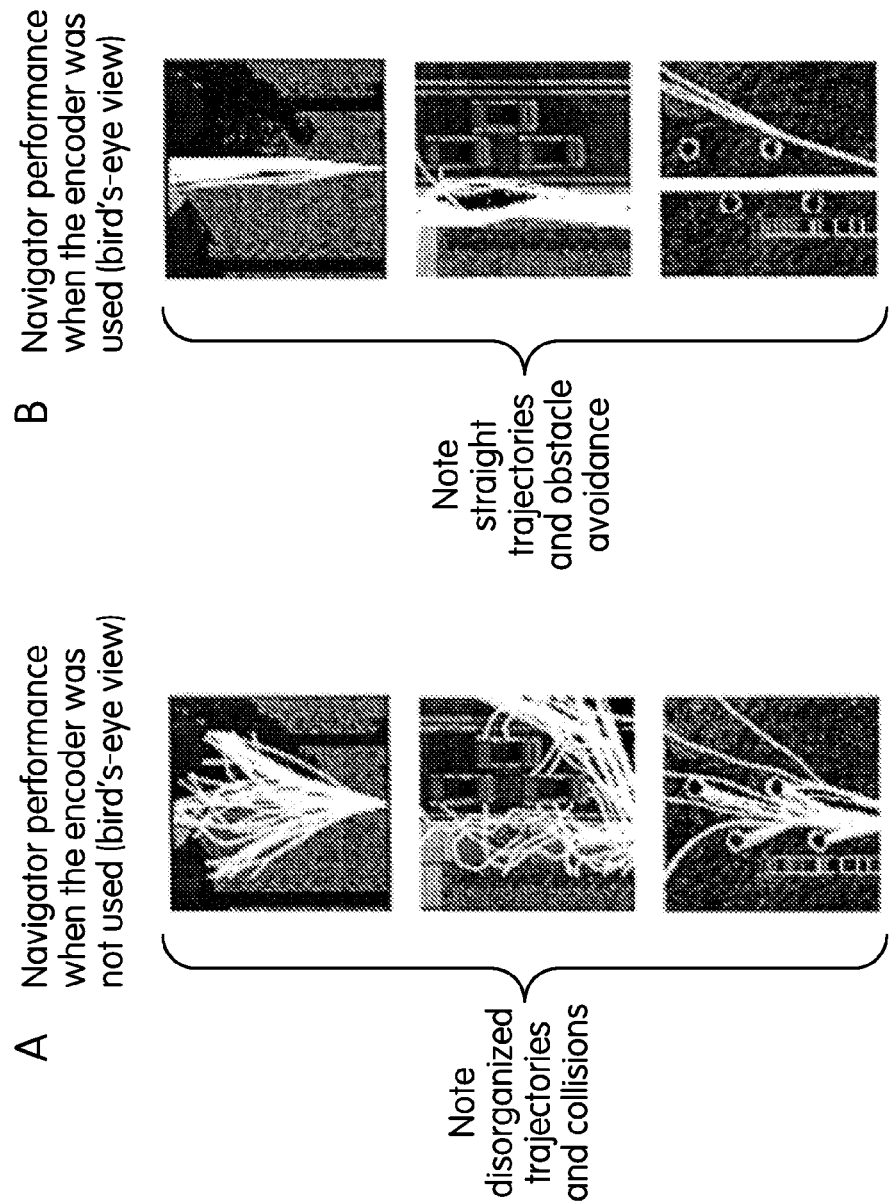
FIG. 10 illustrates trajectories showing the performance of the navigator and its ability to generalize to different environments. As described in the text and in flow chart in FIG. 7, the leading algorithm used to learn navigation tasks, the convolutional neural network (CNN), was trained two ways: 1) the standard way, i.e., using the raw visual environment (the raw image streams), and 2) using the environment after it had its dimension reduced, i.e., after it was processed through the encoder. (The training environment used was a rural environment, as shown in FIG. 8). The performance of the navigator was then tested in 3 new environments: a rural environment that was different from the one used to train the navigator, a suburban environment, and a playground environment. (Samples from each environment are shown in FIG. 9.) A. The navigator's performance when it learned the environment from the raw image stream. Note the disorganized trajectories and collisions. B. The navigator's performance when it learned the environment from the retinal image stream (the image stream produced by the encoder). Note the straight paths and obstacle avoidance.

As shown in FIG. 10A, when the navigator learned its environment from the raw image stream, its performance is low, many collisions occur; what is learned with the training set does not generalize to the new environments. As shown in FIG. 10B, when the navigator learned the environment from the retinal image stream, performance was dramatically better: note the straight paths and the lack of collisions. There is clear generalization to new environments (rural, suburban, playground)—issues that have been highly problematic for artificial navigation systems, and machine learning algorithms in general.

Figure 11:
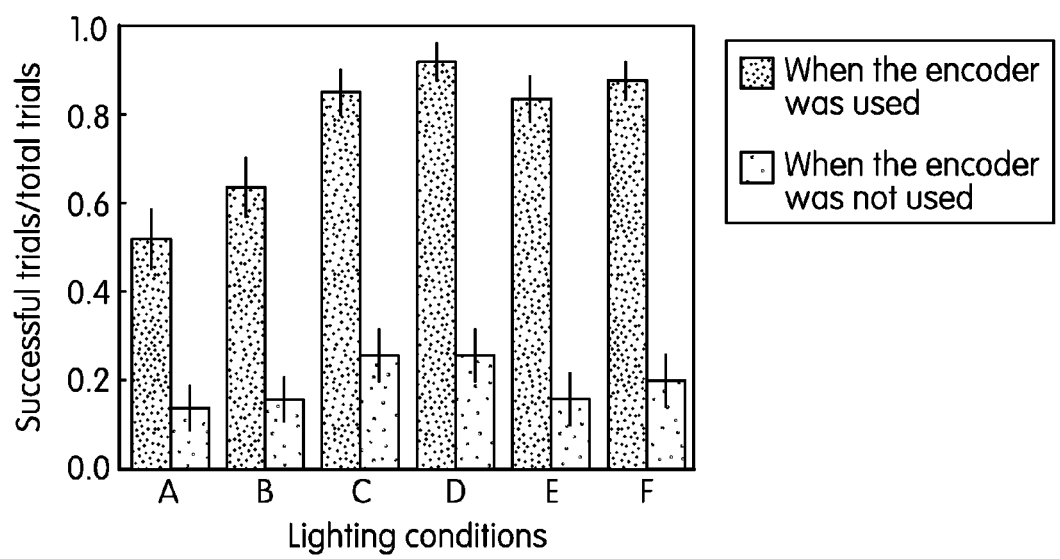
FIG. 11 shows further demonstration of the navigator's high performance; specifically, it shows that the high performance generalizes not just to different environments (from rural environment to suburban environment to playground), but it also generalizes to different lighting conditions within an environment. A through F correspond to different positions of the sun, and therefore, different shadow conditions in the playground environment; the light conditions span sunrise to sunset, i.e., 30 degrees above the horizontal on the left side of the environment to 30 degrees above the horizontal on the right side. Light gray, the performance of the navigator when it was trained on raw image streams (from the rural environment using one lighting condition, as shown in FIG. 8). As shown here, the performance of the navigator is low when it is placed in a new environment, and this remains true across light conditions. The height of each bar corresponds to the fraction of trials in which the navigator successfully stayed within the playground tire course without colliding with one of the tires. Error bars indicate the standard error of the mean (SEM). Dark grey, the performance of the navigator when it was trained on the retinal image streams (same rural environment using same single lighting condition, but this time processed through the encoder). As shown, the performance of the navigator is high, and the high performance holds across light conditions. Thus, training on the retinal image streams (i.e., training on the dimension-reduced images produced by the encoder) leads to high performance that generalizes both to new environments and to multiple lighting conditions (sunrise to sunset, see above).

FIG. 11 shows further demonstration of the navigator's high performance when it uses the retinal image streams as input. Specifically, it shows that the high performance generalizes not just to different environments (from rural to suburban to playground), but it also generalizes to different lighting conditions within an environment. A through F correspond to different positions of the sun, and therefore, different shadow conditions, in the playground environment; the light conditions span sunrise to sunset, i.e., 30 degrees above the horizontal on the left side of the environment to 30 degrees above the horizontal on the right side. As shown in the figure, when the navigator was trained on raw image streams (from the rural environment using one lighting condition), its performance does not generalize: its performance in the playground is low and this is true across light conditions. The height of each bar in the figure corresponds to the fraction of trials in which the navigator successfully stayed within the playground tire course without colliding with one of the tires. The error bars indicate the standard error of the mean (SEM). In contrast, when the navigator when it was trained on the retinal image streams (same rural environment using same single lighting condition, but this time processed through the encoder), its performance is high, and the high performance holds across light conditions. Thus, training on the retinal image streams (i.e., training on the images processed through the encoder) leads to high performance that generalizes both to new environments and to multiple lighting conditions (sunrise to sunset, see above).

Note that the encoders operate in real time, indicating that the processing techniques can be readily applied to non-virtual environments as well, e.g., to control the motion of a robot in a real world environment.

Example

Face Recognition

This example assesses the effectiveness of the approach described in this application to another long-standing problem in machine vision, the recognition of faces in video. Using a learning algorithm commonly used for face recognition and pedestrian detection [see Viola and Jones 2001; Viola, Jones, and Snow 2005], a system was constructed to recognize an individual's face in video, i.e., one that can classify a previously unseen image stream as a "target face" versus another or "non-target" face. The same approach can be used for many other purposes, such as, but not limited to, pedestrian detection, object recognition, object tracking, whole-person recognition, iris detection, etc. The system was implemented using the Python programming language and the NumPy numerical computing package.

Figure 12:
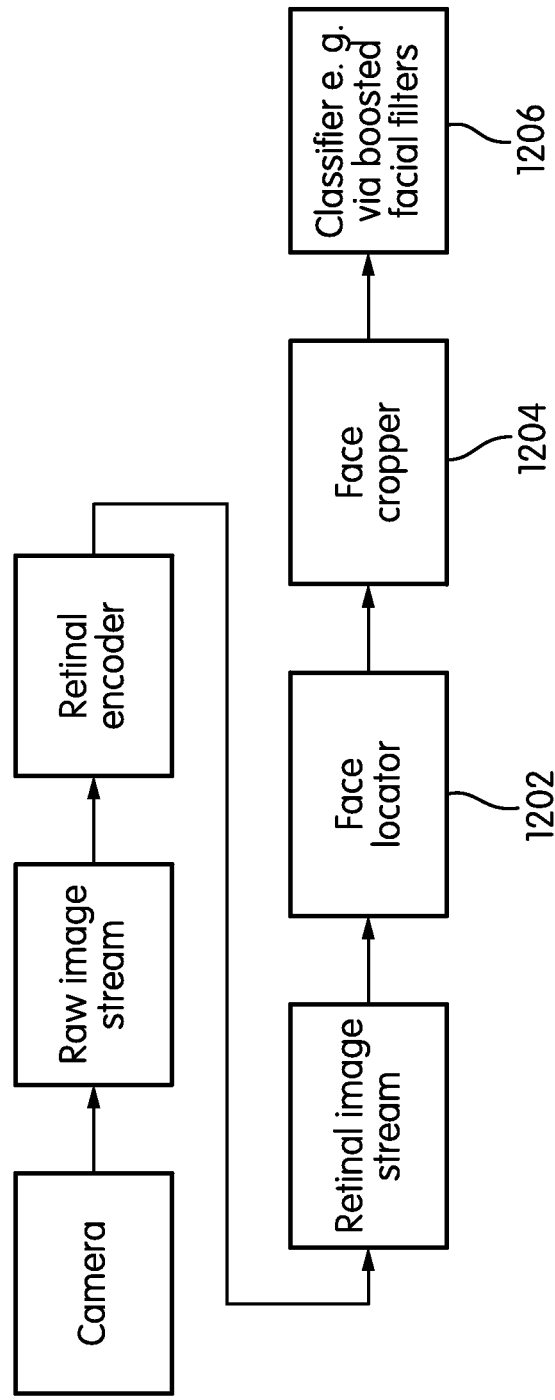
FIG. 12 is a flow chart for one embodiment of a machine vision system used to control a face recognition task.

An embodiment of the approach is described in FIG. 12. An input video (raw image stream) is passed through the retinal encoder 104, producing the retinal image stream. Since the task focuses on faces, the retinal image stream is then cropped to locate a face-containing region 1202. (The cropping is done after the encoder processes the raw stream, so as to avoid edge effects when the encoding is carried out.)

In this example, face-containing regions were selected manually, so as to construct a training and testing set of known face examples. In other embodiments, face-containing regions could be detected in the raw image stream or in the processed image stream using the Viola-Jones algorithm [Viola and Jones, 2001]. The cropped video is then fed through a classifier 1206 (e.g., one based on a boosted cascade of Haar filters, such as in Viola Jones and Snow, 2005). The classifier 1206 designates it either as a "target face" (meaning that it is the face of the target individual) or "non-target face" (meaning that it is the face of a different individual).

Figure 15:
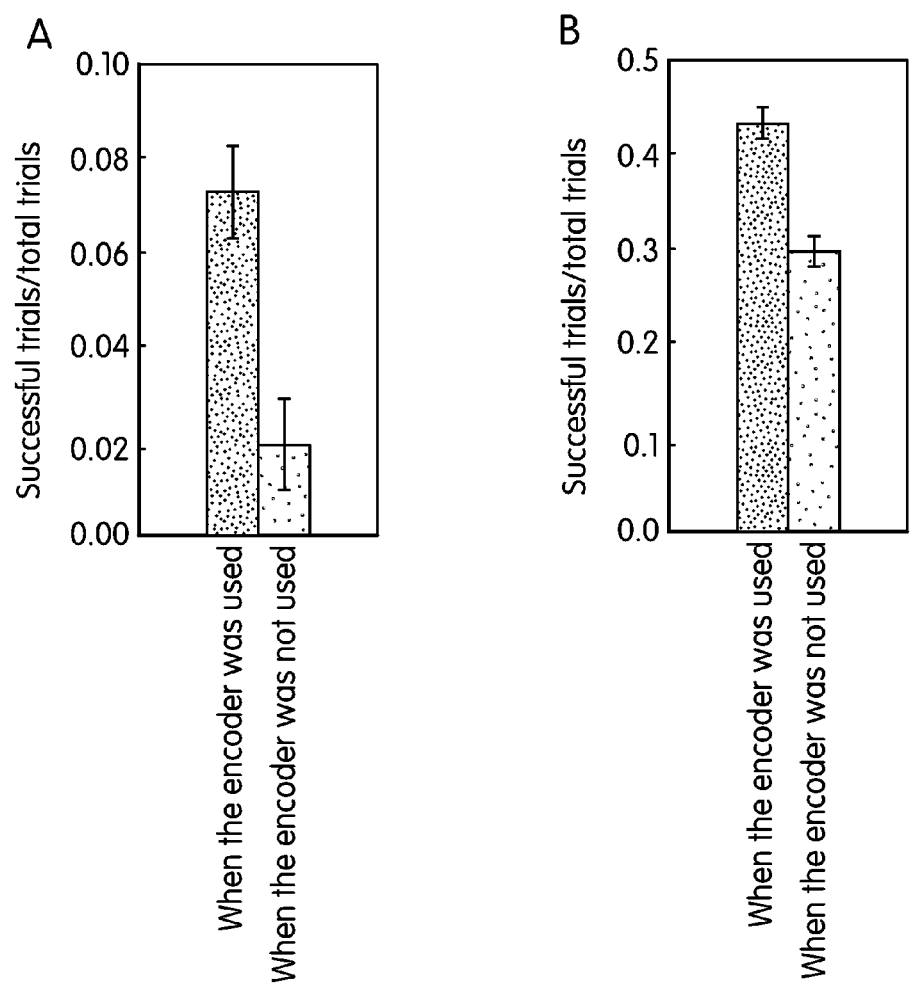
FIG. 15 shows the performance of the face recognition algorithm when it was trained two ways: 1) using the standard approach, i.e., training it with raw image streams, and 2) using the approach described in this application (that is, using the raw image streams processed by the encoder). In both cases, the face recognition algorithm was trained on many image streams (250-800 two-frame image streams from 4-5 videos of the target face and 2000 two-frame image streams from >100 videos of others faces). Performance was then measuring using 50-800 two-frame image streams from a previously unseen video, that is, a video not used in the training set. (See FIGS. 13 and 14 for sample frames from both the training and testing sets.) Performance is shown for two sets of tasks, one where the standard approach performs very weakly, and one where it performs moderately well. The height of the bars indicates the fraction of trials in which the face recognizer successfully recognized the target face. Error bars indicate the standard error of the mean (SEM). As shown, when the task was challenging (A), the approach described in this application, provides a major (4-fold) improvement, over the standard approach. When the task was less challenging, i.e., when the standard approach performs moderately well, the approach described in this application still provides improvement (by a factor of 1.5).

FIG. 15 shows an example of the effectiveness of our approach. For this analysis a data set of faces in video was used from Lior Wolf, Tal Hassner and Itay Maoz. Face Recognition in Unconstrained Videos with Matched Background Similarity. IEEE Conf on Computer Vision and Pattern Recognition (CVPR), 2011.

Using this data set, several face recognition tasks were performed. The general procedure was to train the face recognition algorithm on a "target face". The algorithm was presented with an array of videos showing a person's face, the target face. The algorithm's ability to recognize the face was tested by presenting it with previously unseen videos of the same person's face along with videos of other faces, "non-target faces". The job of the algorithm was to correctly classify the test videos as either target faces or a non-target faces.

Figure 13:
FIG. 13 shows frames from a raw image stream (movie) used to train the face recognition algorithm (the Viola-Jones-Snow algorithm as mentioned in the main text). The image stream was recorded at a rate of 24 frames per second; here, every 12th frame is shown (one frame every half-second).
Figure 14:
FIG. 14 shows frames from a raw image stream (movie) used to test the face recognition algorithm's performance. Note that this is the same person as shown in FIG. 13, but in a different environment with different hairstyle, etc. As indicated in the main text, the goal of the face recognition algorithm is to recognize new image streams as belonging to the target person, even though the algorithm was only trained on other images streams of this person). As in FIG. 13, the image stream was recorded at a rate of 24 frames per second; here, every 12th frame is shown (one frame every half-second).

FIGS. 13 and 14 show images from example videos. FIG. 13 shows frames from a video that was used to train the face recognition algorithm, and FIG. 14 shows frames from a video that was used to test the algorithm. As shown, the person in the test video (FIG. 14) is the same as that in the training video (FIG. 13), but shown in a different environment with a different hairstyle, etc.

The performance of the algorithm was tested under two conditions: when we trained it in the standard way, i.e., using the raw image streams of the faces, and when we trained it using the retinal image streams of the faces (that is, the raw image streams after they were processed by our encoder). In both cases, the training was performed using short (two-frame) movies. The number of two-frame movies used in the training ranged from 250-800 for the target face (taken from 4-5 different videos), and 2000 for the non-target faces (taken from >100 videos). Performance was then measuring using 50-800 two-frame movies taken from previously unseen video, that is, videos not used for the training.

As shown in FIG. 15, the use of the encoder had a clear impact on performance. The results for two kinds of tasks are shown: the first consists of very challenging tasks, defined as ones where the standard approach performs very weakly; the second consists of easier tasks, where the standard approach performs moderately well. As shown, when the task was difficult (FIG. 15A), the approach that incorporates the encoder provides a major (4-fold) improvement, over the standard approach. When the task was less challenging, i.e., when the standard approach performs moderately well, the approach that incorporates the encoder still provides substantial improvement (a factor of 1.5 over the standard method).

In an alternate embodiment, the task is slightly modified, so that the face detection step is bypassed, and instead, cropped videos of the appropriate size for the classifier 1206 are generated in an automated fashion from the input video, whether or not faces are present in a particular part of the video. Then, classification is applied to these new cropped videos as before, or a modified classification is performed, where the output classes are "target face" and "non-target face," or "non-face."

In an alternative embodiment, the analysis could be performed using N frames, where N could be 1, 3 or more frames, as many as the processor can handle, as opposed to the 2-frame videos used for the analysis in FIG. 15.

In addition, these classifications may be used by themselves, for instance to alert a user to the presence of the individual in the video, or they may be combined in some way, for instance by waiting for several positive detections ("target face" classifications) to occur within a specified time window before issuing a signal.

Note that, although a number of exemplary applications of retinal processing to machine vision have been described, embodiments directed to numerous other applications may be used.

In general, the encoder approach is likely to be advantageous for visual tasks that animals (vertebrates) perform well, especially those where animal visual systems are known to perform better than existing machine techniques. As noted above, the encoder approach may be particularly effective in cases where it would be advantageous to reduce the total amount of information from the raw image stream (e.g., to allow or faster processing), while maintaining salient features in the data. For example, as noted above, in some embodiments, the encoder approach will typically be particularly advantageous when used in, e.g., certain types of pattern recognition tasks such as facial recognition, identification of human or other living forms against a complicated background, navigation through a complicated environment, rapid tracking of and reaction to moving objects, etc.

Note that for certain applications where biological systems do not typically perform well, the encoder approach may have limitations. This may particularly be the case in applications that require a high level of detailed information or precision measurement. For example, referring back to retinal images shown FIGS. 3B-F, note that while these images advantageously emphasize the presence and motion of the human figure, the retinal images do not provide a sharp outline of the human figure that would be useful, e.g., in determining precise biometric information such as the human's absolute height or other absolute bodily dimensions. To determine this type of information, it may be better to apply machine vision algorithms to the raw image.

In some embodiments, a hybrid approach may be used to provide the advantages of both the encoder based approach to machine vision and a traditional approach applied to the raw image data.

For example, in some embodiments, a raw image stream may be processed using any of the retinal encoder based techniques described herein. The resulting retinal image data may be processed (e.g., using a machine vision algorithm, such as machine vision algorithm trained using retina images), and the results used to inform subsequent analysis of the corresponding raw images (e.g., using a machine vision algorithm, such as machine vision algorithm trained using raw images).

Figure 16:
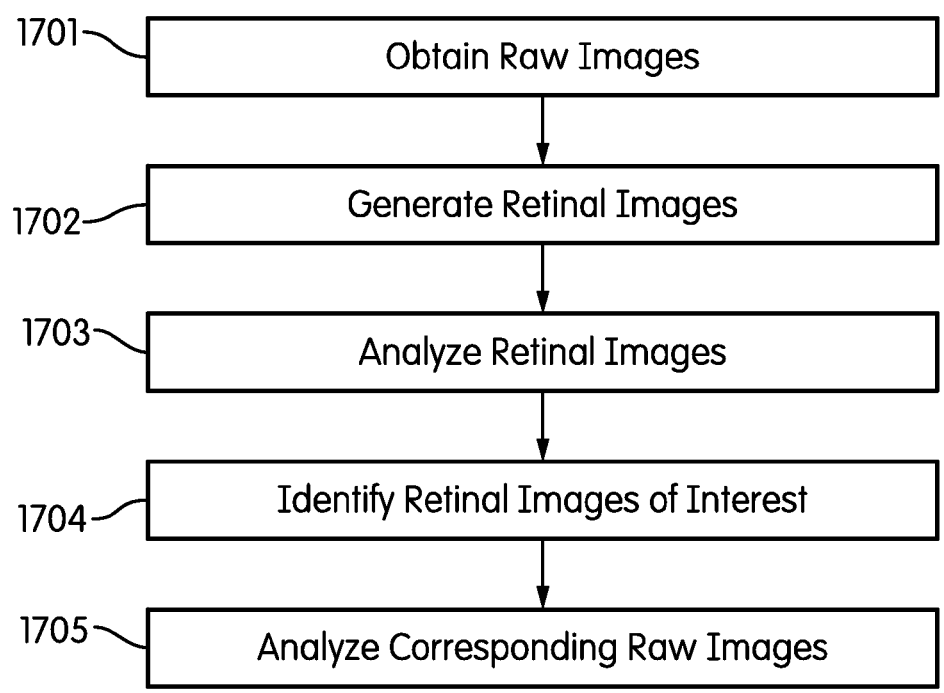
FIG. 16 shown a process flow for an exemplary hybrid image processing method using both a retinal encoder approach and a traditional approach to image processing

FIG. 16 illustrates an exemplary process of this type. In steps 1701 and 1702, raw images are obtained and used to generate a stream of retinal images, using any of the techniques described herein. In step 1703, the retinal images are analyzed, e.g., using a machine vision algorithm.

In step 1704, the results of the analysis of the retinal images are used to identify retinal images (or segments thereof) that are of interest. For example, in a person-recognition task, the encoder approach, which performs dimension reduction on the image in the way that the normal retina does to generate retinal images, can allow rapid identification of body types—by gait, signature gestures, etc. One of its strengths is that it rapidly pulls out motion information, which is particularly useful for this purpose. The encoder approach can thus serve as a prescreening approach to reduce the space of possible matches to the target individual (by excluding candidates with the wrong body type, gait, gestures, etc.)

In step 1705, the raw images (or segments thereof) that correspond to the identified retinal images may are analyzed. For example, in the case of a person recognition-task, an algorithm that uses the raw image (where little or no dimension reduction is used) may be applied to a subset of images to more positively identify the person using more detailed feature analysis (e.g., by extracting detailed biometric information such as an accurate height or other bodily dimensions of the person).

In various embodiments, the method described above may be reversed, with prescreening done on raw images, followed by subsequent analysis using a retinal encoder approach. In some embodiments, an iterative technique may be applied, with multiple rounds of alternative raw and encoder based analysis. In other embodiments, the different types of processing may occur in parallel, and the results synthesized. In general any suitable combination of traditional and encoder based approaches may be used.

As noted above, in various embodiments, the retinal processing operates to reduce the total amount of information from the raw image data (to achieve efficiency, in a way analogous to the way the retina does) while retaining salient features for a given application. For example, in some embodiments, even though the total amount of information in the retinal encoded data is reduced, the machine vision algorithm may exhibit better performance when applied to the encoded data than when applied to corresponding raw image data. This result was seen in both of the examples provided above, where navigation and facial recognition algorithms applied to "compressed" retinal images substantially outperformed the same algorithm applied to raw images.

In various embodiments, the retinal encoded data may be compressed by a factor of at least 1.5, at least 2, at least 3, at least 4, at least 5, or more, e.g., in the range of 1-100 or any subrange thereof. In some embodiments, this compression corresponds to a dimension reduction produced by the encoders. For example, in some embodiments, the bit rates of the retinal encoders may be quantified and can be compared to the entropy of the raw image data used as stimulus by the encoder (also measured in bits per unit time), and the ratio taken to determine a compression ratio. For example, in some cases described in the Prosthesis applications an encoder is described with a bit rate of 2.13 bits/s compared to an input raw data bit rate of 4.9 bits/s. Thus, the data compression produced by the encoders was in this example nearly 7-fold.

Figure 17:
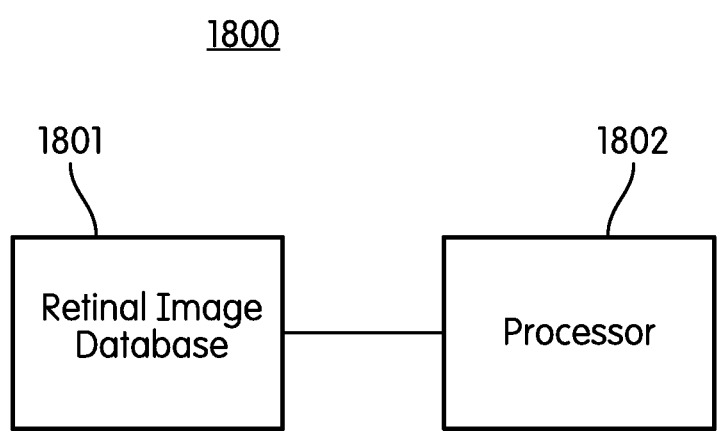
FIG. 17 is a block diagram of a system for digital fingerprinting using retinal encoded data.
Figure 18A:
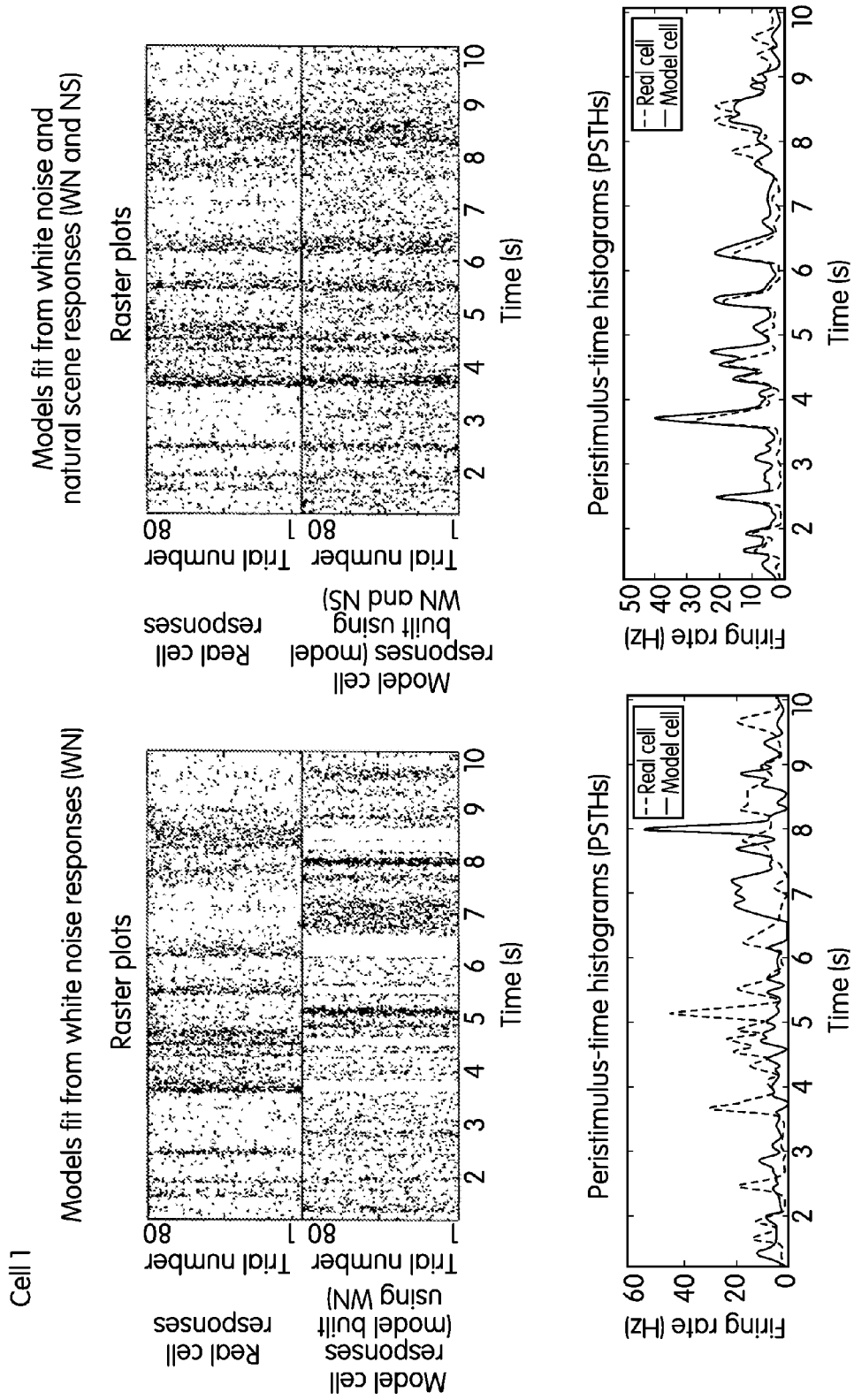
FIGS. 18A-18F illustrate the performance of a retinal encoder models when tested with movies of natural scenes. In each figure, the performance of a conventional linear-nonlinear (LN) model is shown on the left, and the performance of the linear-nonlinear (LN) model of the type described in this application is shown on the right. Performance is shown via raster plots and peri-stimulus time histograms (PSTHs).
Figure 18B:
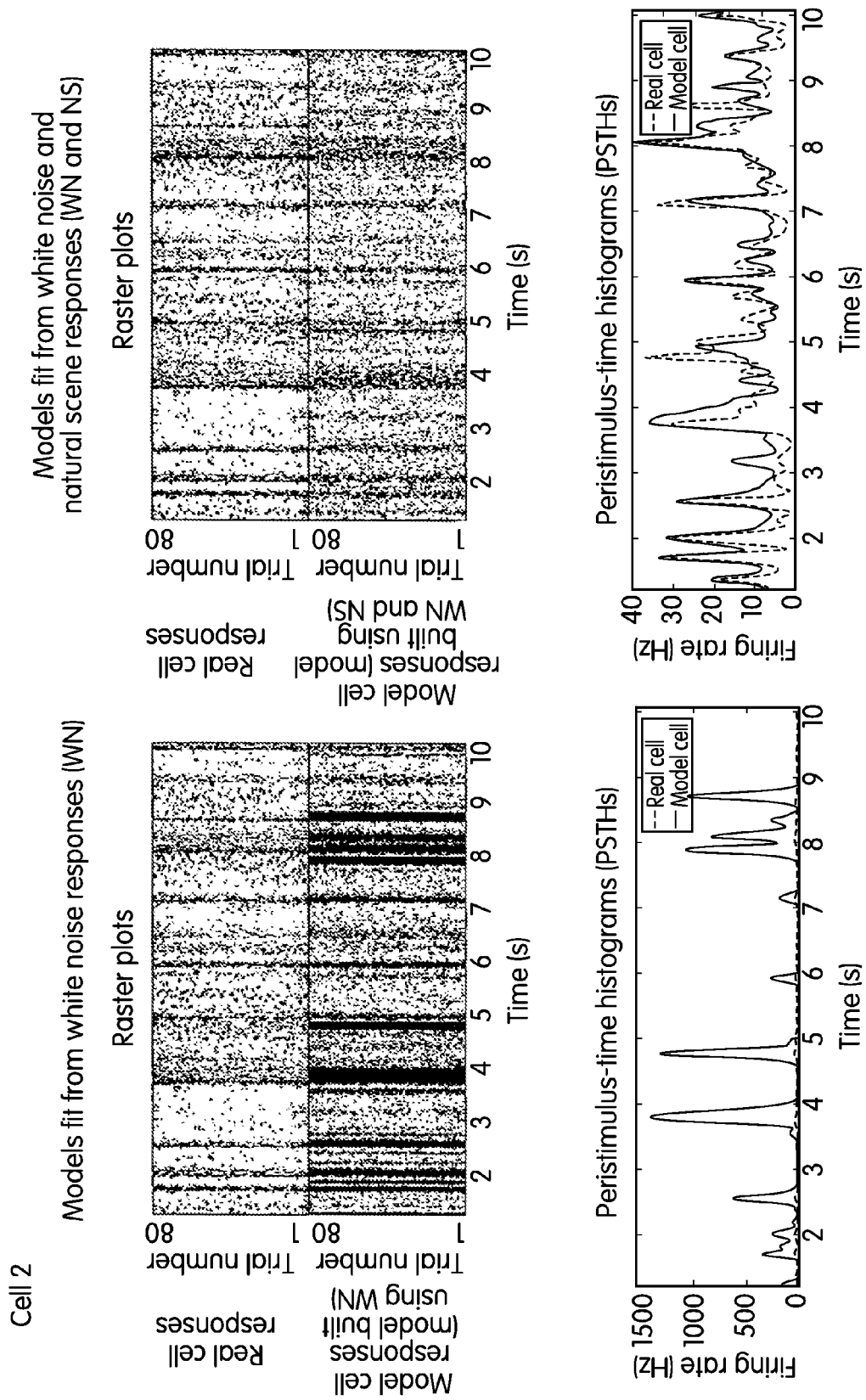
Figure 18C:
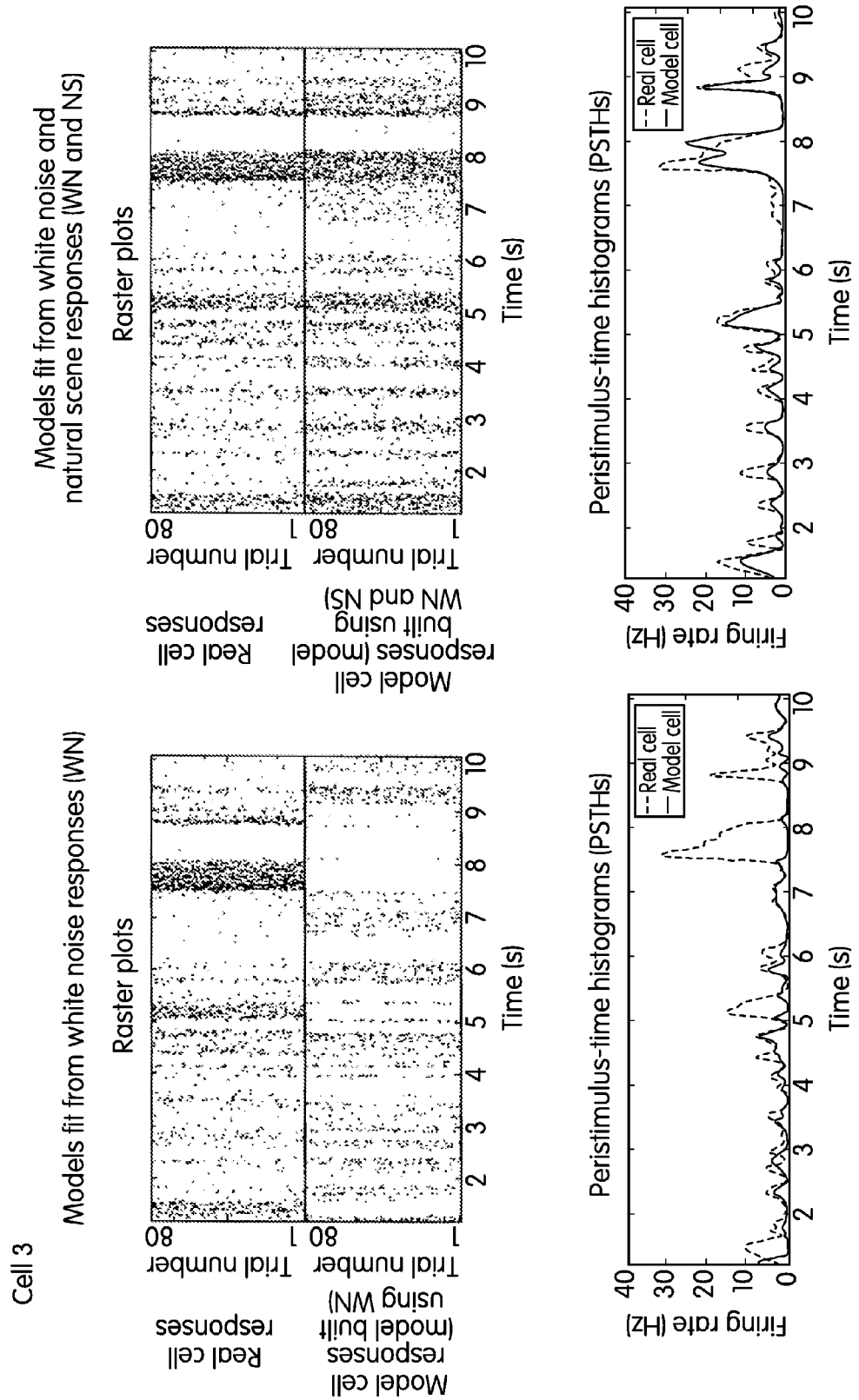
Figure 18D:
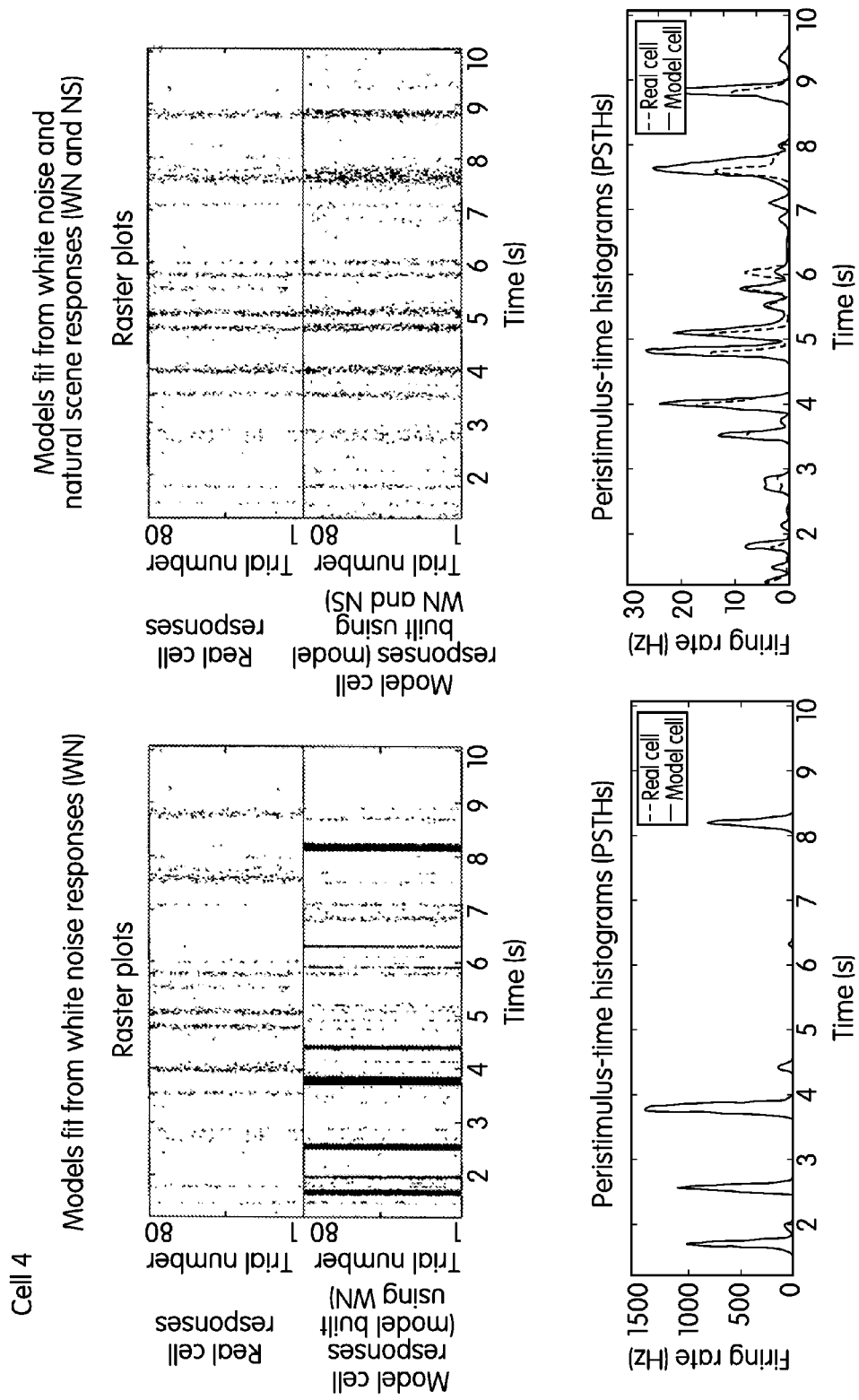
Figure 18E:
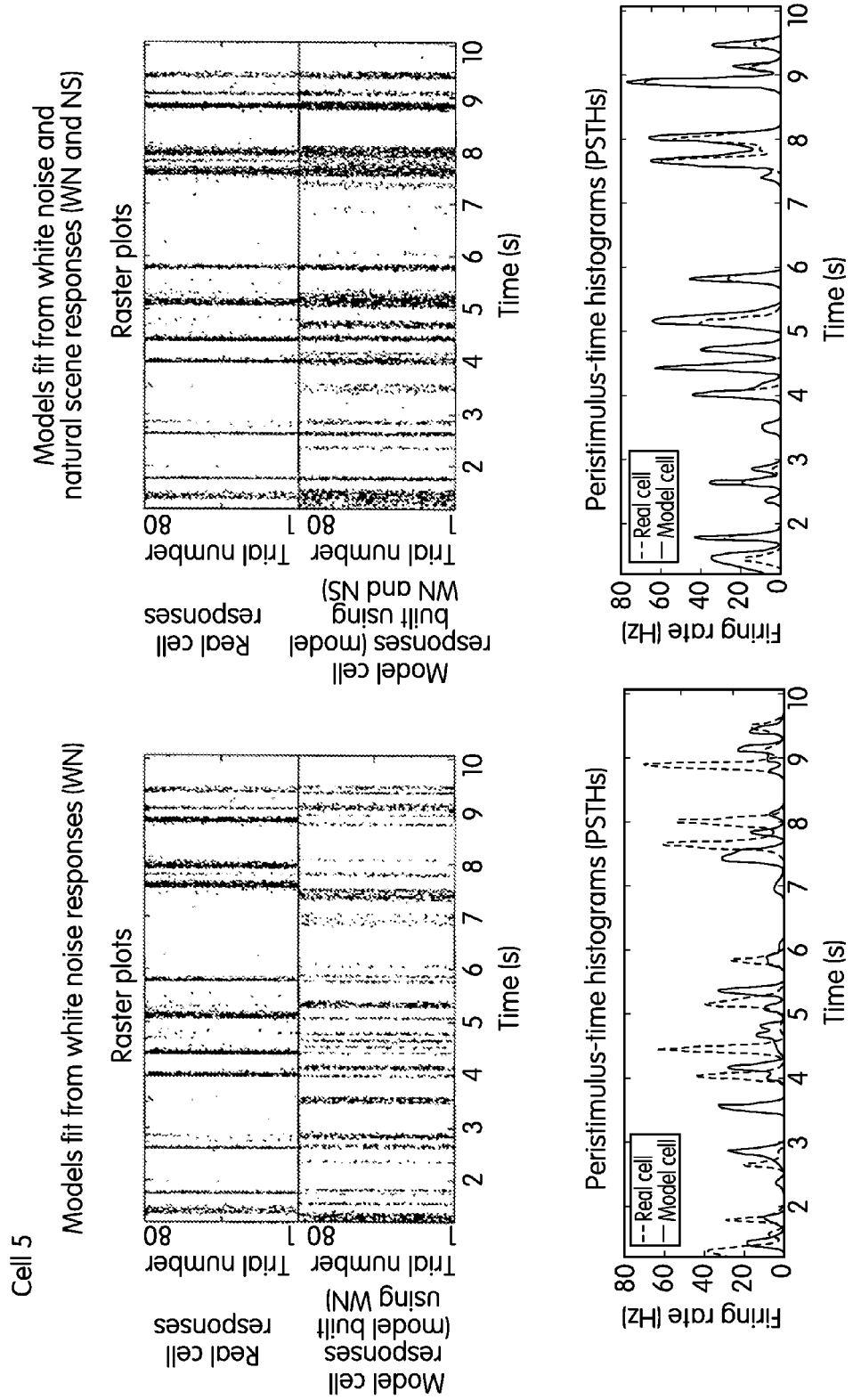
Figure 18F:
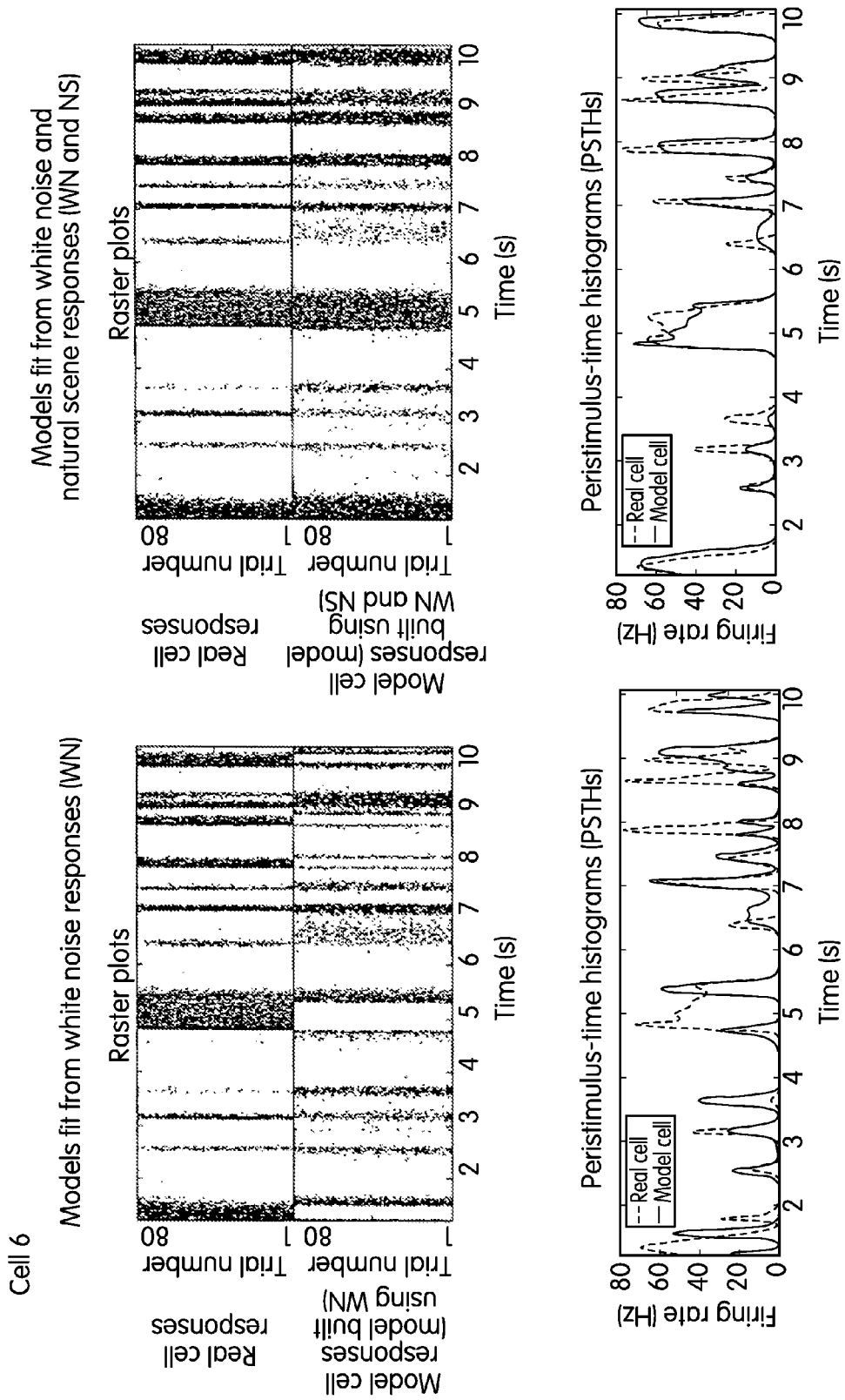

In some embodiments, the processing techniques described herein may be applied in an information storage and retrieval context. Referring to FIG. 17, a system 1800 includes a memory storage device 1801 (e.g., a hard drive or other compute memory) operatively coupled to a processor 1802. The storage device 1801 stores retinal image data that has been generated from raw image data using the techniques described herein. As detailed above, in some embodiments, the retinal image data may be compressed relative to the raw data, while maintaining certain salient features.

Accordingly, the stored retinal data may, in some embodiments, be used as a representation, or "fingerprint" of corresponding raw data. In some embodiments, storage device stores database information indicative of a correspondence between the encoded data and the raw image data. For example, a particular video clip could be used to generate a corresponding retinal image stream, and the retinal image stream stored on the device 1801 with a tag identifying it with the raw video clip.

In some embodiments, the processor 1802 can be used to match incoming data with data stored on the storage device 1801. In some embodiments, the processor 1802 may receive query image data (e.g., a raw video clip) corresponding to a series of query images. The processor 1802 may then process the query image data with a retinal encoder to generate retinal encoded query data. The processor can then compare the retinal encoded query data with retinal encoded data stored on the storage device 1801. If a match is found, the processor can then read the tag on the stored data, and output information associating the query data video clip with the video clip used to generate the matching stored retinal image. In some embodiments, because the retinal encoded data is compressed and/or has had salient features enhanced, the matching of the encoded stored and query data may be faster and/or more accurate than trying to directly match the corresponding raw image clips.

The examples shown in this application and the Prosthetic Application used encoders built from data obtained from the mouse and monkey retina. However, it is to be understood that various embodiments may use encoders built from other species as well, such as, but not limited to birds, cats, snakes, and rabbits, which can be constructed using the procedure described in complete detail in the Prosthetic Applications.

In various embodiments, the overall function of the techniques described here is to utilize the preprocessing (particularly the dimension reduction) performed by the visual system (particularly the retina) to advance machine vision. For some applications, the preprocessing performed by retinas of other species may apply; e.g., encoders constructed from bird retinas may be particularly effective for flying navigators; similarly, encoders constructed from fast moving animals, such as tigers, may be particularly effective for navigators that need to operate at high speeds. In some embodiments, encoders based on multiple species may be used, and the results combined to provide advantageous synergies (e.g., using bird based encoders for basic flight navigation tasks, while using monkey based encoders for object recognition tasks when an object of interest is encountered during the flight).

Similarly, the approach generalizes to encoders built from higher visual areas, such as the lateral geniculate nucleus, superior colliculus, or visual cortex. The Prosthetic Applications describe the construction of encoders for retinal cells; the same method, again described in complete detail, including the mathematical formalism, can be also used to obtain encoders for higher visual areas, which can similarly serve as a preprocessing step for machine vision algorithms.

The invention techniques described herein can be used as front end processing (or filtering) for essentially any machine vision algorithm, as it works in an analogous way to the retina. Just as the retina preprocesses visual information for use by the brain—to allow it to perform a host of visually-guided activities, such as navigation, object and face recognition, figure-ground discrimination, predator detection, food versus non-food detection, among many others—the encoder(s), which together form a "virtual retina", can preprocess visual information for a host of machine algorithms.

What the retina does essentially is take the staggering amount of information in the visual world and reduces it to the essentials, the essentials needed by the brain for the survival of living beings. Because the encoders very accurately mimic the input/output relations of the retina (and do this for essentially any visual input, as shown in the prosthetic application), this means that the encoders reduce the information in the visual world in the same way. Thus, in various embodiments, the techniques described herein may provide front end processing for machine vision algorithms that is the same, or close to the same, as what the retina offers the brain, that is, it has the same speed, efficiency, and qualitative and quantitative filtering.

A corollary of this is that the encoders also impact the way machine vision algorithms are, or can be, constructed. Current algorithms are constructed to use raw images as their input, or images preprocessed in other ways (e.g. using difference of Gaussians filters). When images are processed through retinal encoders as described herein, the result is a new type of input for machine vision algorithms, i.e., input that has never previously been available. In some embodiments, this new input may allow for particular classes of algorithms to be adapted or optimized in a new way. For example, various machine vision algorithms are classified by a set of parameters which may be determined at least partially by on a training set of images, and/or images processed by the algorithm while completing a given task. When retinal image data are used in place of raw images, the resulting parameters of the algorithm will differ from those that would have been obtained using corresponding raw image data. In some cases, this will cause the algorithm to exhibit improved performance for a given task.

In some cases, because the machine vision algorithm is being trained using images that mimic the visual system of a vertebrate, the algorithm may advantageously adapt to acquire some of the performance qualities of the system. For example, because the retinal processing highlights the salience of certain aspects of images, a machine vision algorithm trained on retinal encoded data may "learn" to become more sensitive to these image aspects.

The examples above show two instances of machine vision algorithms—a navigator and a face recognizer—and in both cases, the algorithms changed their structure when applied to retinal processed input. Both algorithms were learning algorithms characterized by a set of weight parameters, and it was found that these parameters were different when the algorithm was applied to retinal image data versus when the images were applied to raw image data. The improved performance of the algorithms in the retinal processed case (relative to the raw image case) was due largely or completely to the change in the weight parameters. Note that this improved performance generalized to navigation and recognition tasks in environments and conditions that differed from the environment and conditions used in the training. This is evidence that, in some embodiments, the structure of a machine vision algorithm trained using retinal image data may fundamentally changes in a way that is beneficial and generalizes beyond the training environment and conditions. Similarly, new algorithm constructions may be developed to utilize this new input data; that is, not just new weights or parameters on current algorithms but new algorithms that more directly match or utilize the new input data described here.

The present methods and devices may process any type of image data. For example, the image data may be generated in response to visible light, but may also be generated by other types of electromagnetic radiation such as infrared, ultraviolet or other wavelengths across the electromagnetic spectrum. In some embodiments, the image data may be artificial or virtual image data (e.g., generated based on a model of a virtual environment). In some embodiments, the artificial image data may be related to the visualization of any kind of suitable data, including for example, medical imaging data (magnetic resonance imaging data, computer aided tomography data, seismic imaging data, etc.).

The image data may be a single image or a plurality of images; additionally, the images may be static or may vary in a spatiotemporal fashion. Simple shapes such as diagrams or comparatively complex stimuli such as natural scenes may be used. Additionally, the images may be grayscale or in color or combinations of grey and color. In one embodiment, the stimuli may comprise white noise ("WN") and/or natural stimuli ("NS") such as a movie of natural scenes or combinations of both.

The scope of the present invention is not limited by what has been specifically shown and described hereinabove. Those skilled in the art will recognize that there are suitable alternatives to the depicted examples of materials, configurations, constructions and dimensions. Numerous references, including patents and various publications, are cited and discussed in the description of this invention and attached reference list. The citation and discussion of such references is provided merely to clarify the description of the present invention and is not an admission that any reference is prior art to the invention described herein. All references cited and discussed in this specification are incorporated herein by reference in their entirety.

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure. The above-described embodiments can be implemented in any of numerous ways. For example, the embodiments may be implemented using hardware, software or a combination thereof. When implemented in software, the software code can be executed on any suitable processor or collection of processors, whether provided in a single computer or distributed among multiple computers.

Further, it should be appreciated that a computer may be embodied in any of a number of forms, such as a rack-mounted computer, a desktop computer, a laptop computer, or a tablet computer. Additionally, a computer may be embedded in a device not generally regarded as a computer but with suitable processing capabilities, including a Personal Digital Assistant (PDA), a smart phone or any other suitable portable or fixed electronic device.

Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers may be interconnected by one or more networks in any suitable form, including a local area network or a wide area network, such as an enterprise network, and intelligent network (IN) or the Internet. Such networks may be based on any suitable technology and may operate according to any suitable protocol and may include wireless networks, wired networks or fiber optic networks.

A computer employed to implement at least a portion of the functionality described herein may include a memory, one or more processing units (also referred to herein simply as "processors"), one or more communication interfaces, one or more display units, and one or more user input devices. The memory may include any computer-readable media, and may store computer instructions (also referred to herein as "processor-executable instructions") for implementing the various functionalities described herein. The processing unit(s) may be used to execute the instructions. The communication interface(s) may be coupled to a wired or wireless network, bus, or other communication means and may therefore allow the computer to transmit communications to and/or receive communications from other devices. The display unit(s) may be provided, for example, to allow a user to view various information in connection with execution of the instructions. The user input device(s) may be provided, for example, to allow the user to make manual adjustments, make selections, enter data or various other information, and/or interact in any of a variety of manners with the processor during execution of the instructions.

The various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, various inventive concepts may be embodied as a computer readable storage medium (or multiple computer readable storage media) (e.g., a computer memory, one or more floppy discs, compact discs, optical discs, magnetic tapes, flash memories, circuit configurations in Field Programmable Gate Arrays or other semiconductor devices, or other non-transitory medium or tangible computer storage medium) encoded with one or more programs that, when executed on one or more computers or other processors, perform methods that implement the various embodiments of the invention discussed above. The computer readable medium or media can be transportable, such that the program or programs stored thereon can be loaded onto one or more different computers or other processors to implement various aspects of the present invention as discussed above.

The terms "program" or "software" are used herein in a generic sense to refer to any type of computer code or set of computer-executable instructions that can be employed to program a computer or other processor to implement various aspects of embodiments as discussed above. Additionally, it should be appreciated that according to one aspect, one or more computer programs that when executed perform methods of the present invention need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that convey relationship between the fields. However, any suitable mechanism may be used to establish a relationship between information in fields of a data structure, including through the use of pointers, tags or other mechanisms that establish relationship between data elements.

Also, various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

As used herein, natural scene is to be understood to refer to an image of a natural environment, e.g., as described in Geisler WS Visual perception and the statistical of properties of natural scenes. Annu Rev. Psychol. 59:167-92 (2008). In some embodiments, natural scenes may be replaced with any suitable complex image, e.g., an image characterized by a spatial and/or temporal frequency power spectrum that generally conforms to a inverse frequency squared law. In some embodiments, e.g., where a short video clip is used, the spectrum of the complex image may deviate somewhat from the inverse square law. For example, in some embodiments, the complex image may have a spatial or temporal a power spectrum of the form $1/f^x$, where f is the frequency and x is in the range of, e.g., 1-3, or any subrange thereof (e.g. 1.5-2.5, 1.75-2.25, 1.9-2.1, etc.)

A white noise image refers to a noise image having a spatial frequency power spectrum that is essentially flat.

As used herein the term "light" and related terms (e.g. "optical", "visual") are to be understood to include electromagnetic radiation both within and outside of the visible spectrum, including, for example, ultraviolet and infrared radiation.

The indefinite articles "a" and "an," as used herein in the specification and in the claims, unless clearly indicated to the contrary, should be understood to mean "at least one."

The phrase "or," as used herein in the specification and in the claims, should be understood to mean "either or both" of the elements so conjoined, i.e., elements that are conjunctively present in some cases and disjunctively present in other cases. Multiple elements listed with "or" should be construed in the same fashion, i.e., "one or more" of the elements so conjoined. Other elements may optionally be present other than the elements specifically identified by the "or" clause, whether related or unrelated to those elements specifically identified. Thus, as a non-limiting example, a reference to "A or B", when used in conjunction with open-ended language such as "including" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "or" as defined above. For example, when separating items in a list, "or" or "or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

In the claims, as well as in the specification above, all transitional phrases such as "including," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

All definitions, as defined and used herein, should be understood to control over dictionary definitions, definitions in documents incorporated by reference, and/or ordinary meanings of the defined terms.

Variations, modifications and other implementations of what is described herein will occur to those of ordinary skill in the art without departing from the spirit and scope of the invention. While certain embodiments of the present invention have been shown and described, it will be obvious to those skilled in the art that changes and modifications may be made without departing from the spirit and scope of the invention. The matter set forth in the foregoing description and accompanying drawings is offered by way of illustration only and not as a limitation.

REFERENCES

Ahuja A, Dorn J, Caspi A, McMahon M, Dagnelie G, Dacruz L, Stanga P, Humayun M, Greenberg R (2010)

Blind subjects implanted with the Argus II retinal prosthesis are able to improve performance in a spatial-motor task. Br J. Ophthalmol.

Arenkiel et al., In vivo light-induced activation of neural circuitry in transgenic mice expressing channelrhodopsin-2. *Neuron* (2007) 54(2): 205-18.

Ausubel et al., Current Protocols in Molecular Biology, John Wiley & Sons, New York, 1989

Bach, M et al (2008) Visual evoked potential-based acuity assessment in normal vision, artificially degraded vision, and in patients. Br J Ophthalmol 92:396-403

Barnstable et al., Thy-1 antigen: a ganglion cell specific marker in rodent retina. *Neuroscience* (1984) 11(4): 847-55.

Bi A, Cui J, Ma Y-P, Olshevskaya E, Pu M, Dizhoor A M, Pan Z-H (2006) Ectopic expression of a microbial-type rhodopsin restores visual responses in mice with photoreceptor degeneration. Neuron 50:23-33.

Bomash I, Roudi Y, Nirenberg S. (2010) A virtual retina that works on a broad array of stimuli including natural scenes: A tool to simplify the problem of population coding. *Society for Neuroscience*. Program No. 891.5.

Bookstein R et al (1990) Promoter deletion and loss of retinoblastoma gene expression in human prostate carcinoma. Proc. Nati. Acad. Sci. USA 87 (19):7762-7766

Busskamp V, et al (2010) Genetic reactivation of cone photoreceptors restores visual responses in retinitis pigmentosa. Science 329:413-417.

Cai et al. (2010) Gene delivery to mitotic and postmitotic photoreceptors via compacted DNA nanoparticles results in improved phenotype in a mouse model of retinitis pigmentosa. *FASEB J.* 24: 1178-1191.

Campagnola L, Wang H, Zylka M J. (2008) Fiber-coupled light-emitting diode for localized photostimulation of neurons expressing channelrhodopsin-2. Journal of Neuroscience Methods. 169:27-33.

Cardin J A, et al (2010) Targeted optogenetic stimulation and recording of neurons in vivo using cell-type-specific expression of Channelrhodopsin-2. Nat Protoc 5(2): 247-54.

Chader G J, Weiland J, Humayun M S (2009) Artificial vision: needs, functioning, and testing of a retinal electronic prosthesis. Prog Brain Res 175:317-332.

Chiappa, K. (1997) Evoked Responses in Clinical Medicine, Third Edition, Lippincott-Raven Chichilnisky E J. (2001) A simple white noise analysis of neuronal light responses. *Network* 12(2): 199-213

Chopdar A, Chakravarthy U, Verma D (2003) Age related macular degeneration. BMJ 326:485-488.

Cover T and Thomas J. (2006) Elements of Information Theory, 2nd Edition. Hoboken, N.J.: Wiley Dann J F, Buhl E H. (1987) Retinal ganglion cells projecting to the accessory optic system in the rat. J Comp Neurol 262(1): 141-58.

Dedek K, et al (2008) Ganglion cell adaptability: does the coupling of horizontal cells play a role? PLoS One. 3(3):e1714.

Douglas R M et al (2005) Independent visual threshold measurements in the two eyes of freely moving rats and mice using a virtual-reality optokinetic system. Vis Neurosci. 22(5):677-84.

Duda R O, Hart P E (2001) Pattern Classification (2nd Edition) Wiley, NY,

Enroth-Cugell et al., (1966) The contrast sensitivity of retinal ganglion cells of the cat. J Physiol 187(3): 517-52.

European Patent Application No. 19891976

Famulare M, Fairhall A. (2010) Feature selection in simple neurons: how coding depends on spiking dynamics. *Neural Comput* 22(3): 581-98

Field et al., (2007) Information processing in the primate retina: circuitry and coding. Annu Rev Neurosci 30: 1-30.

Fitzgerald et al. (1994) Retinal signal transmission in Duchenne muscular dystrophy. *J Clin Invest* 93: 2425-30.

Foley J M, Legge G E (1981) Contrast detection and near-threshold discrimination in human vision. Vision Res. 21(7):1041-53.

Fried S, Werblin F, McMahon M J (2006) US Pat. 2006/0129207 Mimicking neural coding in retinal ganglion cells with short pulse electrical stimulation. In: (US, ed).

Friedman D S, O'Colmain B J, Munoz B, Tomany S C, McCarty C, de Jong P T V M, Nemesure B, Mitchell P, Kempen J, Eye Diseases Prevalence Research Group (2004) Prevalence of age-related macular degeneration in the United States. Arch Ophthalmol 122:564-572.

Geisler W S (200). Visual perception and the statistical properties of natural scenes. Annu Rev. Psychol. 59:167-92 (2008)

Gerding H, Benner F P, Taneri S (2007) Experimental implantation of epiretinal retina implants (EPI-RET) with an IOL-type receiver unit. J Neural Eng 4:S38-49.

Giolli R A, Blanks R H I, Lui F. (2005) The accessory optic system: basic organization with an update on connectivity, neurochemistry, and function. Prog Brain Res 151: 407-40.

Golan L, Reutsky I, Farah N & Shoham S. (2009) Design and characteristics of holographic neural photo-stimulation systems, Journal of Neural Engineering 6 066004, (2009)

Graham-Rowe D (2009) A Brighter Future for Retinal Implants. In: Technology Review, Boston, Mass.: MIT.

Greenberg K P, et al. (2011). Differential Targeting of Optical Neuromodulators to Ganglion Cell Soma and Dendrites Allows Dynamic Control of Center-Surround Antagonism. Neuron 69, 713-720.

Grinstead C M and Snell J L (1997) Introduction to Probability. American Mathematical Society; 2nd Revised edition Grossman N, Poher V, Grubb M S, Kennedy G T, Nikolic K, McGovern B, Palmini R B, Gong Z, Drakakis E M, Neil, M A A, Dawson M D, Burrone J, Degenaar P. (2010) Multi-site optical excitation using ChR2 and micro-LED array. *J. Neural Eng,* 7(1):1-13.

Han et al, (2009), Millisecond-Timescale Optical Control of Neural Dynamics in the Nonhuman Primate Brain, *Neuron* 62, 191-198.

Hand D J. (1981) Discrimination and classification. Wiley Series in Probability and Mathematical Statistics.

Huberman A D, Manu M, Koch S M, Susman M W, Lutz A B, Ullian E M, Baccus S A, Barres B A (2008) Architecture and activity-mediated refinement of axonal projections from a mosaic of genetically identified retinal ganglion cells. Neuron. 2008 Aug. 14; 59(3):425-38.

Huberman A D, Wei W, Elstrott J, Stafford B K, Feller M B, Barres B A (2009) Genetic Identification of an On-Off Direction-Selective Retinal Ganglion Cell Subtype Reveals a Layer-Specific Subcortical Map of Posterior Motion. *Neuron.* 62(3):327-334.

Ivanova E, Pan Z-H (2009) Evaluation of the adeno-associated virus mediated long-term expression of channelrhodopsin-2 in the mouse retina. *Molecular Vision* 15:1680-1689

Izhikevich E M (2007) Dynamical systems in neuroscience: the geometry of excitability and bursting. Cambridge, Mass.: MIT Press Izhikevich E M (2010) Hybrid spiking models. Review. Phil. Trans. R. Soc. A (2010) 368, 5061-5070

Jacobs A L et al (2009), Ruling out and ruling in neural codes. Proc Natl Acad Sci USA. 106(14):5936-41.

Jeffreys, Harold (1961). The Theory of Probability. The Oxford University Press.

Kass R E, Ventura V, Brown E N. (2005) Statistical issues in the analysis of neuronal data. J Neurophysiol 94(1): 8-25.

Kawasaki et al., Variability of the relative afferent pupillary defect. Am J Ophthalmol (1995). 120: 622-633.

Kay M A, Glorioso J C, Naldini L. (2001) Viral vectors for gene therapy: the art of turning infectious agents into vehicles of therapeutics. Nat Med. 7(1):33-40. Review.

Kelly S, Shire D, Chen J, Doyle P, Gingerich M, Drohan W, Theogarajan L, Cogan S, Wyatt J, Rizzo J I (2009) Realization of a 15-channel, hermetically-encased wireless subretinal prosthesis for the blind. In, pp 200-203.

Kibbel S, Harscher A, Wrobel W-G, Zrenner E, Rothermel A (2009) Design and Performance of an improved active subretinal chip. In: World Congress on Medical Physics and Biomedical Engineering, Sep. 7-12, 2009, Munich, Germany (Kim S I, Suh T S, Dössel O, Schlegel W C, eds), pp 192-195: Springer Berlin Heidelberg.

Koilkonda R D, Hauswirth W W, Guy J. (2009) Efficient expression of self-complementary AAV in ganglion cells of the ex vivo primate retina. Mol Vis. 15:2796-802.

Kuffler S W. (1953) Discharge patterns and functional organization of mammalian retina. J Neurophysiol 16(1): 37-68.

Lagali P S, Balya D, Awatramani G B, Münch T A, Kim D S, Busskamp V, Cepko C L, Roska B (2008) Light-activated channels targeted to ON bipolar cells restore visual function in retinal degeneration. Nat Neurosci 11:667-675.

Lesica N A et al. (2007) Adaptation to stimulus contrast and correlations during natural visual stimulation. Neuron 55(3): 479-491.

Lettvin et al., (1959) What the frog's eye tells the frog's brain. Proceedings of the Institute of Radio Engineers 47(11): 1940-51.

Liao et al. (2007) In vivo gene delivery in the retina using polyethylenimine. BioTechniques 2007, 42:285-288.

Loewenstein J I, Montezuma S R, Rizzo J F, III (2004) Outer Retinal Degeneration: An Electronic Retinal Prosthesis as a Treatment Strategy. Arch Ophthalmol 122:587-596.

Maguire et al. Safety and efficacy of gene transfer for Leber's congenital amaurosis. N Engl J Med (2008) 358: 2240-2248.

Mancuso et al., (2009) Gene therapy for red-green colour blindness in adult primates. Nature 461(7265): 784-7.

Martin et al. 2002. Gene delivery to the eye using adeno-associated viral vectors. Methods 28:267-275.

McGowan M H et al (1998) Characterization of the Mouse Aldose Reductase Gene and Promoter in a Lens Epithelial Cell Line. Mol Vis 1998; 4:2

McLaughlin S K, Collis P, Hermonat P L, Muzyczka N. (1988) Adeno-associated virus general transduction vectors: analysis of proviral structures. J. Virol. 62(6):1963-73.

Meytlis M, Bomash I, Pillow J W, Nirenberg S. (2009) Assessing the importance of correlated firing using large populations of neurons. Society for Neuroscience. Program No. 165.3.

Morgans C W, et al (2009) TRPM1 is required for the depolarizing light response in retinal ON-bipolar cells. Proc Natl Acad Sci USA 106(45): 19174-8.

Nanduri D, Humayun M, Greenberg R, McMahon M, Weiland J (2008) Retinal prosthesis phosphene shape analysis. In: 30th Annual International Conference of the IEEE Engineering in Medicine and Biology Society, pp 1785-1788. Vancouver, BC.

Nichols Z, Meytlis M, Nirenberg S. (2010) Correlations play a negligible role in coding white noise and natural scene stimuli in complete retinal populations. Submitted.

Nirenberg S (2000) Photoablation of cells expressing beta-galactosidase. Methods Mol Biol. 135:475-80

Nirenberg S and Cepko, C (1993). Targeted ablation of diverse cell classes in the nervous system in vivo. J Neurosci. 13(8):3238-51.

Nirenberg S and Latham P E. (1998) Population coding in the retina. Curr. Opin. Neurobiol. 8(4):488-493

Nirenberg S and Meister M. (1997). The light response of retinal ganglion cells is truncated by a displaced amacrine circuit. Neuron 18:637-650

Nirenberg S et al (2001) Retinal ganglion cells act largely as independent encoders. Nature 411(6838):698-701.

Nirenberg S et al. (2010) Heterogeneous response dynamics in retinal ganglion cells: the interplay of predictive coding and adaptation. J Neurophysiol 103(6): 3184-94

Norcia, A M, and Tyler, C W (1985) Spatial frequency sweep VEP: visual acuity during the first year of life. Vision Res. 25(10):1399-408

Norcia, A M, et al (1989). Measurement of spatial contrast sensitivity with the swept contrast VEP. Vision Res. 1989; 29(5):627-37.

Okuyama et al. (1993). Binocular infrared optometer for measuring accommodation in both eyes simultaneously in natural-viewing conditions Applied Optics, Vol. 32. No 22, p. 4147

Pandarinath et al (2010a) A novel mechanism for switching a neural system from one state to another. Front Comput Neurosci. 31; 4:2.

Pandarinath et al (2010b) Symmetry breakdown in the ON and OFF pathways of the retina at night: functional implications. J Neurosci 30(30): 10006-14.

Paninski L, Pillow J, Lewi J. (2007) Statistical models for neural encoding, decoding, and optimal stimulus design. Prog Brain Res. 165:493-507.

Paninski L (2004) Maximum likelihood estimation of cascade point-process neural encoding models. Network 15(4): 243-62

Panzeri S, et al (2007) Correcting for the sampling bias problem in spike train information measures. J. Neurophysiol. 98(3):1064-72. Review.

Pelli D G, Robson J G, & Wilkins A J (1988) The design of a new letter chart for measuring contrast sensitivity. Clinical Vision Sciences 2, 187-199

Perry V H, Silveira L C. (1988) Functional lamination in the ganglion cell layer of the macaque's retina. Neuroscience. 25(1):217-23.

Petrs-Silva et al., (2009) High-efficiency transduction of the mouse retina by tyrosine-mutant AAV serotype vectors. Mol Ther 17(3): 463-71.

Petersen-Jones et al., (2009) AAV retinal transduction in a large animal model species: comparison of a self-complementary AAV2/5 with a single-stranded AAV2/5 vector. Mol Vis 15: 1835-42.

Pillow J W, Shlens J, Paninski L, Sher A, Litke A M, Chichilnisky E J, Simoncelli E P. (2008) Spatio-temporal correlations and visual signalling in a complete neuronal population. *Nature* 454(7207): 995-9

Prusky G T, et al (2004) Rapid quantification of adult and developing mouse spatial vision using a virtual optomotor system. Invest Ophthalmol Vis Sci. 45(12):4611-6.

Published PCT Application WO1996013598
Published PCT application WO1998048027
Published PCT Application WO2000015822
Published PCT application WO2001094605
Published PCT application WO2002082904
Published PCT application WO2003047525
Published PCT application WO2003080648
Published PCT application WO2003093479
Published PCT application WO2003104413
Published PCT application WO2005080573
Published PCT application WO2007127428
Published PCT application WO2010011404

Pun L (1969), *Introduction to Optimization Practice*, ISBN 471-70233-1

Purpura K, Tranchina D, Kaplan E, Shapley R M. (1990) Light adaptation in the primate retina: analysis of changes in gain and dynamics of monkey retinal ganglion cells. Vis Neurosci 4(1): 75-93.

Rolls E T, Baylis G C, Leonard C M. Role of low and high spatial frequencies in the face-selective responses of neurons in the cortex in the superior temporal sulcus in the monkey. Vision Res. 1985; 25(8):1021-35.

Sambrook et al, "Molecular Cloning. A Laboratory Manual", 2d ed., Cold Spring Harbor Laboratory, New York (1989)

Sauer B. (1987) Functional expression of the cre-lox site-specific recombination system in the yeast Saccharomyces cerevisiae. Mol Cell Biol. 7(6):2087-96.

Shapley R M, Victor J D. (1981) How the contrast gain control modifies the frequency responses of cat retinal ganglion cells. J. Physiol. 318:161-79.

Sharpee T O et al. (2008) On the Importance of Static Nonlinearity in Estimating Spatiotemporal Neural Filters With Natural Stimuli. J Neurophysiol 99(5): 2496-509

Sheridan C (2011) Gene Therapy finds its niche Nature Biotechnology 29(2):121-128

Siegert S, Scherf B G, Punta K D, Didkovsky N, Heintz N, Roska B (2009). Genetic address book for retinal cell types. *Nature Neuroscience.* 12:1197-1204.

Simoncelli et al. (2004) Characterization of neural responses with stochastic stimuli. The cognitive neurosciences: 327-38

Simonelli et al. (2010) Gene Therapy for Leber's Congenital Amaurosis is Safe and Effective Through 1.5 Years After Vector Administration, *Molecular Therapy* 18 3, 643-650.

Sinclair J R, et al (2004). Selective ablation of a class of amacrine cells alters spatial processing in the retina. J. Neurosci. 24(6):1459-67.

Sjostrand et al. (1999). Morphometric study of the displacement of retinal ganglion cells subserving cones within the human fovea. Graefe's Arch Clin Exp Ophthalmol 237: 1014-1023.

Soucy E R et al. (1998) A novel signaling pathway from rod photoreceptors to ganglion cells in mammalian retina. *Neuron* 21:481-493

Stone et al., (1993) Response properties of ganglion cells in the isolated mouse retina. Vis Neurosci 10(1): 31-9.

Strong S P, et al (1998) On the application of information theory to neural spike trains. Pac Symp Biocomput. 621-32.

Thyagarajan S, van Wyk M, Lehmann K, Lowel S, Feng G, Wässle H (2010) Visual function in mice with photoreceptor degeneration and transgenic expression of channelrhodopsin 2 in ganglion cells. J Neurosci 30:8745-8758.

Tomita H, Sugano E, Isago H, Hiroi T, Wang Z, Ohta E, Tamai M (2010) Channelrhodopsin-2 gene transduced into retinal ganglion cells restores functional vision in genetically blind rats. Exp Eye Res 90:429-436.

Troy J B, Bohnsack D L, Chen J, Guo X, Passaglia C L. (2005) Spatiotemporal integration of light by the cat X-cell center under photopic and scotopic conditions. Vis Neurosci 22(4): 493-500.

Troy J B, Bohnsack D L, Diller L C. (1999) Spatial properties of the cat X-cell receptive field as a function of mean light level. Vis Neurosci 16(6): 1089-104.

Turchinovich et al. (2010) Non-viral siRNA delivery into the mouse retina in vivo. *BMC Ophthalmology* 10:25.

U.S. Pat. No. 7,149,586
U.S. Pat. No. 5,856,152
U.S. Pat. No. 5,871,982
U.S. Pat. No. 6,533,798
U.S. Patent Publication 20080221653
U.S. Patent Publication 20080249588
U.S. Patent Publication 20090088399
U.S. Patent Publication 20090326623,
U.S. Patent Publication 20100272688
U.S. Patent Publication Nos. 20070261127

Ueda et al, (1997) The mGluR6 5' upstream transgene sequence directs a cell-specific and developmentally regulated expression in retinal rod and ON-type cone bipolar cells. *J. Neurosci.* 17(9):3014-23.

van Adel et al. (2003) Delivery of ciliary neurotrophic factor via lentiviral-mediated transfer protects axotomized retinal ganglion cells for an extended period of time. *Hum. Gene Ther.* 14:103-115.

Victor J D, Shapley R M. (1979) The nonlinear pathway of Y ganglion cells in the cat retina. J Gen Physiol. 74(6): 671-89.

Victor J D. (1987) The dynamics of the cat retinal X cell centre. *The Journal of Physiology* 386(1): 219.

Volgyi B, Deans M R, Paul D L, Bloomfield S A (2004) Convergence and Segregation of the Multiple Rod Pathways in Mammalian Retina. J Neurosci 24(49):11182-11192.

Walther W, Stein U. (2000) Viral vectors for gene transfer: a review of their use in the treatment of human diseases. Drugs. 60(2):249-71. Review.

Wassle H. (2004) Parallel processing in the mammalian retina. Nat Rev Neurosci 5(10): 747-57.

Wells et al. (2005) Optical stimulation of neural tissue in vivo. Optics Letters 30(5):504-506, Winter J O, Cogan S F, Rizzo J F I (2007) Retinal prostheses: current challenges and future outlook. J Biomater Sci Polym Ed 18:1031-1055.

Wright A F. (1997) Gene therapy for the eye. Br J Ophthalmol 81(8): 620-623 Review.

Yonehara K, Ishikane H, Sakuta H, Shintani T, Nakamura-Yonehara K, et al. (2009) Identification of Retinal Ganglion Cells and Their Projections Involved in Central Transmission of Information about Upward and Downward Image Motion. PLoS ONE 4(1): e4320.

Yonehara K, Shintani T, Suzuki R, Sakuta H, Takeuchi Y, et al. (2008) Expression of SPIG1 Reveals Development of a Retinal Ganglion Cell Subtype Projecting to the Medial Terminal Nucleus in the Mouse. PLoS ONE 3(2): e1533.

Zhang Y, Ivanova E, Bi A, Pan Z-H (2009) Ectopic expression of multiple microbial rhodopsins restores ON and OFF light responses in retinas with photoreceptor degeneration. *J Neurosci* 29:9186-9196.

Zrenner E, et al (2009) Subretinal Microelectrode Arrays Allow Blind Retinitis Pigmentosa Patients to Recognize Letters and Combine them to Words. BMEI '09. 2nd International Conference on Biomedical Engineering and Informatics. Issue Date: 17-19 Oct. 2009. ISBN: 978-1-4244-4132-7. Pages 1-4.

Ballard D H et al. (1982) *Computer Vision*, Prentice-Hall Inc New Jersey, 1982

Chichilnisky E J. (2001) A simple white noise analysis of neuronal light responses. *Network* 12(2): 199-213

Forsyth D A et al. (2003) *Computer Vision: A Modern Approach*, Prentice Hall, Nirenberg S et al. (2010) Heterogeneous response dynamics in retinal ganglion cells: the interplay of predictive coding and adaptation. *J Neurophysiol* 103(6): 3184-94.

Freund Y et al. (1995) A Decision-Theoretic Generalization of on-Line Learning and an Application to Boosting *Journal of Computer and System Sciences* 55, 119-139

Pillow J W, Shlens J, Paninski L, Sher A, Litke A M, Chichilnisky E J, Simoncelli E P. (2008) Spatio-temporal correlations and visual signalling in a complete neuronal population. *Nature* 454(7207): 995-9

Simonelli et al. (2010) Gene Therapy for Leber's Congenital Amaurosis is Safe and Effective Through 1.5 Years After Vector Administration, *Molecular Therapy* 18 3, 643-650

Nichols Z, Meytlis M, Nirenberg S. (2010) Correlations play a negligible role in coding white noise and natural scene stimuli in complete retinal populations. Submitted.

Nirenberg S et al. (2010) Heterogeneous response dynamics in retinal ganglion cells: the interplay of predictive coding and adaptation. *J Neurophysiol* 103(6): 3184-94

What is claimed is:

1. A method including:
   receiving, by a processing device, raw image data corresponding to a series of raw images;
   processing, by the processing device, the raw image data with an encoder to generate encoded data, where the encoder is characterized by an input/output transformation that mimics the input/output transformation of a vertebrate retina, and wherein processing the raw image data comprises:
   applying a spatiotemporal transformation to the raw image data to generate retinal output cell response values; and
   generating the encoded data based on the retinal output cell response values,
   wherein applying the spatiotemporal transformation comprises applying a single stage spatiotemporal transformation that comprises a set of weights that are determined directly from experimental data, and wherein the experimental data is generated using a stimulus that includes natural scenes; and
   applying, by the processing device, a first machine vision algorithm to data generated based at least in part on the encoded data.

2. The method of claim 1, further including generating a series of retinal images based on the encoded data.

3. The method of claim 2, including determining pixel values in the retinal images based on the encoded data, where determining pixel values in the retinal images based on the encoded data includes determining a pixel intensity or color based on encoded data indicative of a retinal cell response, and where the data indicative of a retinal cell response is indicative of at least one from the list consisting of: a retinal cell firing rate, a retinal cell output pulse train, and a generator potential.

4. The method of claim 2, wherein the encoded data comprises a matrix of firing rates, and wherein an intensity of each pixel in the series of retinal images corresponds to a firing rate value of a corresponding element in the matrix of firing rates.

5. The method of claim 2, further including applying the first machine vision algorithm to the series of retinal images.

6. The method of claim 1, further including applying the first machine vision algorithm to the encoded data, where the machine vision algorithm includes at least one selected from the list consisting of: an object recognition algorithm, an image classification algorithm, a facial recognition algorithm, an optical character recognition algorithm, a content-based image retrieval algorithm, a pose estimation algorithm, a motion analysis algorithm, an egomotion determination algorithm, a movement tracking algorithm, an optical flow determination algorithm, a scene reconstruction algorithm, a 3D volume recognition algorithm, and a navigation algorithm.

7. The method of claim 6, where:
   processing the raw image data with an encoder to generate encoded data includes generating encoded data that contains a reduced amount of information relative to the corresponding raw image data;
   where the machine vision algorithm more accurately models a scene when applied to the series of retinal images than when applied to a corresponding set of raw images that have not been processed using the encoder, and where the amount of information contained in the encoded data is compressed by a factor of at least 2 relative to the corresponding raw image data.

8. The method claim 7, where the amount of information contained in the encoded data is compressed by a factor of at least 5 relative to the corresponding raw image data.

9. The method claim 7, where the amount of information contained in the encoded data is compressed by a factor of at least 10 relative to the corresponding raw image data.

10. The method of claim 1, where the machine vision algorithm exhibits better detection or identification accuracy when applied to the encoded data than when applied to a corresponding set of raw images that have not been processed using the encoder, where the machine vision algorithm exhibits better detection or identification accuracy when applied to the encoded data including natural scenes than when applied to a corresponding series of raw images that have not been processed using the encoder.

11. The method of claim 10, where the machine vision algorithm includes an algorithm for the detection or identification of a human within a series of images; and where the machine vision algorithm exhibits better detection or identification accuracy when applied to a range of retinal images including the human than when applied to a corresponding set of raw images that have not been processed using the encoder, where the series of images including the human includes images of the human located in a natural scene, and where the series of images including the human includes images of the human located in a natural scene that is different from any natural scenes used to train the machine vision algorithm.

12. The method of claim 10, where the machine vision algorithm includes an algorithm for navigation through a real or virtual environment, where the machine vision algorithm exhibits fewer unwanted collision events during navigation when applied to a series of retinal images including a natural scene than when applied to a corresponding set of raw images that have not been processed using the encoder, and where the series of retinal images correspond to an environment that was not used to train the machine vision algorithm.

13. The method of claim 10, wherein the encoded data comprises a matrix of firing rates, pulse trains or generator potentials.

14. The method of claim 1, further including:
applying a machine imaging algorithm to the series of retinal images to identify one or more retinal images of interest;
identifying one or more raw images of interest corresponding to the retinal images of interest; and
processing the raw images of interest, where the processing the raw images of interest includes applying a second machine vision algorithm to the raw images of interest.

15. The method of claim 14, where:
the first machine vision algorithm includes an algorithm that has been trained on a set of retinal images; and
the second machine vision algorithm includes an algorithm that has been trained on a set of raw images.

16. The method of claim 1, where applying the first machine vision algorithm includes applying a navigation algorithm, where applying the navigation algorithm includes:
processing the series of retinal images to determine motion information indicative of motion at a plurality of image locations in the series of images;
classifying spatial regions in the series of images based on the motion information; and
generating a navigation decision based on the classification of the spatial regions.

17. The method of claim 16, where motion information is indicative of an optical flow in the series of images, the method further including:
using a convolutional neural network to classify the spatial regions; and
controlling the motion of a robotic apparatus based on results from the navigation algorithm.

18. The method of claim 16, further including controlling the motion of a virtual object in a virtual space based on results from the navigation algorithm, wherein the navigation algorithm was trained based on image data representative of a virtual space.

19. The method of claim 1, further including training a machine vision algorithm based on the retinal images, where training the machine vision algorithm includes:
(i) applying the machine vision algorithm to a set of retinal images to generate an output;
(ii) determining performance information indicative of the performance of the machine vision algorithm based on the output;
(iii) modifying one or more characteristics of the machine vision algorithm based on the performance information; and
iteratively repeating steps (i) through (iii) until a selected performance criteria is reached; and
where the trained machine vision algorithm is characterized by a set of parameters, and where the parameters differ from the corresponding parameters that would be obtained by equivalent training of the machine vision algorithm using raw images corresponding to the retinal images.

20. The method of claim 1, where the encoder is characterized by an input/output transformation that mimics the input/output transformation of one or more retinal cells of the vertebrate retina over a range of input that includes spatio-temporally varying images.

21. The method of claim 20, where the vertebrate includes at least one selected from the list consisting of: a mouse, and a monkey, where the retinal cells include ganglion cells, where the retinal cells include at least two classes of cells, and where the at least two classes of cells includes ON cells and OFF cells.

22. The method of claim 1, wherein processing the raw image data comprises applying a combination of linear and nonlinear functions to the raw image data to generate the retinal response values.

23. The method of claim 1, wherein processing the raw image data comprises convolving the raw image data with one or more linear filters.

24. The method of claim 1, wherein applying the spatiotemporal transformation further comprises:
applying a spatiotemporal kernel to the raw image data to generate spatially-temporally transformed images; and
applying a nonlinear function to the spatially-temporally transformed images to generate the retinal response values.

25. The method of claim 1, wherein applying the spatiotemporal transformation comprises:
applying a spatiotemporal kernel to the raw image data to generate spatially-temporally transformed images; and
applying a linear function to the spatially-temporally transformed images to generate the retinal response values.

26. An apparatus including:
at least one memory storage device configured to store raw image data; and
at least one processor operably coupled with the memory and programmed to:
receive the raw image data corresponding to a series of raw images;
process the raw image data with an encoder to generate encoded data, where the encoder is characterized by an input/output transformation that mimics the input/output transformation of one or more retinal cells of a vertebrate retina, and wherein processing the raw image data comprises:
applying a spatiotemporal transformation to the raw image data to generate retinal output cell response values; and
generating the encoded data based on the retinal output cell response values,
wherein applying the spatiotemporal transformation comprises applying a single stage spatiotemporal transformation that comprises a set of weights that are determined directly from experimental data, and wherein the experimental data is generated using a stimulus that includes natural scenes; and
apply a first machine vision algorithm to data generated based at least in part on the encoded data.

27. The apparatus of claim 26, wherein the apparatus comprises a machine vision system further including a camera configured to capture the raw image data, and wherein the processor is further configured to control one or more systems based on the data generated upon application of the first machine vision algorithm.

28. A non-transitory computer-readable medium having computer-executable instructions for implementing operations comprising receiving raw image data corresponding to a series of raw images;

processing the raw image data with an encoder to generate encoded data, where the encoder is characterized by an input/output transformation that mimics the input/output transformation of a vertebrate retina, and wherein processing the raw image data comprises:

applying a spatiotemporal transformation to the raw image data to generate retinal output cell response values; and generating the encoded data based on the retinal output cell response values, wherein applying the spatiotemporal transformation comprises applying a single stage spatiotemporal transformation that comprises a set of weights that are determined directly from experimental data, and wherein the experimental data is generated using a stimulus that includes natural scenes; and applying a first machine vision algorithm to data generated based at least in part on the encoded data.

* * * * *

UNITED STATES PATENT AND TRADEMARK OFFICE
CERTIFICATE OF CORRECTION

PATENT NO. : 9,547,804 B2  
APPLICATION NO. : 14/239828  
DATED : January 17, 2017  
INVENTOR(S) : Sheila Nirenberg and Illya Bomash Page 1 of 1

It is certified that error appears in the above-identified patent and that said Letters Patent is hereby corrected as shown below:

In the Specification

Column 1, Lines 26-29 delete the paragraph:
"This invention was made with U.S. Government support under is R01 EY12978 awarded by the National Eye Institute of the National Institute of Health (NIH). The U.S. Government has certain rights in the invention."

And replace as shown:
This invention was made with government support under grant number EY012978 awarded by the National Institutes of Health. The government has certain rights in the invention.

Signed and Sealed this
Twenty-second Day of August, 2017

Joseph Matal
*Performing the Functions and Duties of the*
*Under Secretary of Commerce for Intellectual Property and*
*Director of the United States Patent and Trademark Office*